US011184602B2

(12) United States Patent
Fukuyasu

(10) Patent No.: US 11,184,602 B2
(45) Date of Patent: Nov. 23, 2021

(54) IMAGE PROCESSING APPARATUS AND IMAGE PROCESSING METHOD

(71) Applicant: SONY CORPORATION, Tokyo (JP)

(72) Inventor: Tetsuya Fukuyasu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 99 days.

(21) Appl. No.: 16/481,649

(22) PCT Filed: Jan. 30, 2018

(86) PCT No.: PCT/JP2018/002848
§ 371 (c)(1),
(2) Date: Jul. 29, 2019

(87) PCT Pub. No.: WO2018/147123
PCT Pub. Date: Aug. 16, 2018

(65) Prior Publication Data
US 2020/0007845 A1  Jan. 2, 2020

(30) Foreign Application Priority Data

Feb. 13, 2017  (JP) .............................. JP2017-023789

(51) Int. Cl.
*G06T 15/00* (2011.01)
*H04N 13/178* (2018.01)
(Continued)

(52) U.S. Cl.
CPC ........... *H04N 13/178* (2018.05); *H04N 13/15* (2018.05); *H04N 19/186* (2014.11); *H04N 19/46* (2014.11); *H04N 19/597* (2014.11)

(58) Field of Classification Search
CPC ............. H04N 5/23238; H04N 19/186; H04N 13/178; H04N 5/247; H04N 19/46;
(Continued)

(56) References Cited

U.S. PATENT DOCUMENTS 7,508,448 B1 * 3/2009 Lew .................... H04N 7/01
348/441
9,363,535 B2 * 6/2016 Chen .................... H04N 19/85
(Continued)

FOREIGN PATENT DOCUMENTS

| CA | 2584765 A1 * | 5/2006 | ............ G06T 15/04 |
| JP | 2016-524373 A | 8/2016 | |
| WO | 2014/181220 A1 | 11/2014 | |

OTHER PUBLICATIONS

Yang JF, Lee KT, Chen GC, Yang WJ, Yu L. A YCbCr color depth packing method and its extension for 3D video broadcasting services. IEEE Transactions on Circuits and Systems for Video Technology. Aug. 12, 2019;30(9):3043-53. (Year: 2019).*

(Continued)

*Primary Examiner* — Phu K Nguyen
(74) *Attorney, Agent, or Firm* — Chip Law Group

(57) ABSTRACT

The present disclosure relates to an image processing apparatus and an image processing method capable of storing auxiliary information in CbCr components in a YCbCr format. The image processing apparatus includes a receiving section that receives depth image data in which a depth image transmitted together with a texture image is stored in a Y component in a YCbCr format and auxiliary information is stored in CbCr components in the YCbCr format, and an auxiliary information utilization section that executes a predetermined image process using the auxiliary information on at least one of the texture image or the depth image. A value that can be taken on by the auxiliary information for each pixel of the texture image has N patterns, and a gradation value out of N×N gradation values into which a combination of the auxiliary information regarding two pixels is converted is stored in the CbCr components.

18 Claims, 58 Drawing Sheets

(51) Int. Cl.
  *H04N 19/186* (2014.01)
  *H04N 19/46* (2014.01)
  *H04N 19/597* (2014.01)
  *H04N 13/15* (2018.01)

(58) Field of Classification Search
  CPC ...... H04N 13/15; H04N 19/597; G06T 19/00; G06T 1/00
  USPC .......................................................... 345/418
  See application file for complete search history.

(56) References Cited

U.S. PATENT DOCUMENTS

| | | | | |
|---|---|---|---|---|
| 9,565,449 | B2* | 2/2017 | Chen | H04N 19/597 |
| 9,980,013 | B2* | 5/2018 | Hwang | H04N 13/128 |
| 10,567,635 | B2* | 2/2020 | Christopher | H04N 13/257 |
| 10,771,767 | B2* | 9/2020 | Grunnet-Jepsen | G03B 17/54 |
| 10,887,571 | B2* | 1/2021 | Furukawa | H04N 13/117 |
| 10,943,373 | B2* | 3/2021 | Izumi | G06T 19/00 |
| 2016/0088281 | A1 | 3/2016 | Newton et al. | |

OTHER PUBLICATIONS

Shimobaba T, Kakue T, Ito T. Acceleration of color computer-generated hologram from three-dimensional scenes with texture and depth information. InThree-Dimensional Imaging, Visualization, and Display 2014 Jun. 5, 2014 (vol. 9117, p. 91170B). International Society for Optics and Photonics. (Year: 2014).*

Wang G, Zhang Y, Fan R, Zhou M, Yang J. A DCT-domain multi-channel CM-JND model in YCbCr space. In2016 2nd IEEE International Conference on Computer and Communications (ICCC) Oct. 14, 2016 (pp. 594-598). IEEE. (Year: 2016).*

Mary, J.S. and Magneta, M.S.C., Content Based Image Retrieval using Color, Multi-Dimensional Texture and Edge Orientation.; International Journal of Science Technology & Engineering | vol. 2 | Issue 10 | Apr. 2016 (Year: 2016).*

Reddy RV, Raju KP, Kumar LR, Kumar MJ. Grey level to RGB using YCbCr color space Technique. International Journal of Computer Applications. Jan. 1, 2016;147(7). (Year: 2016).*

Lei L, Peng J, Yang B. Image retrieval based on YCbCr color histogram. In2013 IEEE 12th International Conference on Cognitive Informatics and Cognitive Computing Jul. 16, 2013 (pp. 483-488). IEEE. (Year: 2013).*

Chang TA, Yang JF. Enhancement of depth map using texture and depth consistency. In2016 IEEE Region 10 Conference (TENCON) Nov. 22, 2016 (pp. 1139-1142). IEEE. (Year: 2016).*

Maceira Duch, M., 2013. Depth map coding based on a hierarchical region representation combining color and depth information (Master's thesis, Universitat Politècnica de Catalunya). (Year: 2013).*

International Search Report and Written Opinion of PCT Application No. PCT/JP2018/002848, dated Apr. 17, 2018, 06 pages of ISRWO.

* cited by examiner

F I G. 9

| FILE NAME | AZIMUTH ANGLE | ELEVATION ANGLE | ROTATIONAL ANGLE | VISUAL LINE VECTOR (X,Y,Z) | | | VIEWPOINT LOCATION INFORMATION (X,Y,Z) | | | LATERAL ANGLE OF VIEW | LONGITUDINAL ANGLE OF VIEW | NUMBER OF LATERAL PIXELS | NUMBER OF LONGITUDINAL PIXELS |
|---|---|---|---|---|---|---|---|---|---|---|---|---|---|
| posZ | 0° | 0° | 0° | 0 | 0 | +1 | 0 | 0 | 0 | 100° | 100° | 1024 | 1024 |
| negZ | −180° | 0° | 0° | 0 | 0 | −1 | 0 | 0 | 0 | 100° | 100° | 1024 | 1024 |
| posX | +90° | 0° | 0° | +1 | 0 | 0 | 0 | 0 | 0 | 100° | 100° | 1024 | 1024 |
| negX | −90° | 0° | 0° | −1 | 0 | 0 | 0 | 0 | 0 | 100° | 100° | 1024 | 1024 |
| posY | 0° | +90° | 0° | 0 | +1 | 0 | 0 | 0 | 0 | 100° | 100° | 1024 | 1024 |
| negY | 0° | −90° | 0° | 0 | −1 | 0 | 0 | 0 | 0 | 100° | 100° | 1024 | 1024 |

TEXTURE IMAGE OF FIRST LAYER

TEXTURE IMAGE OF SECOND LAYER

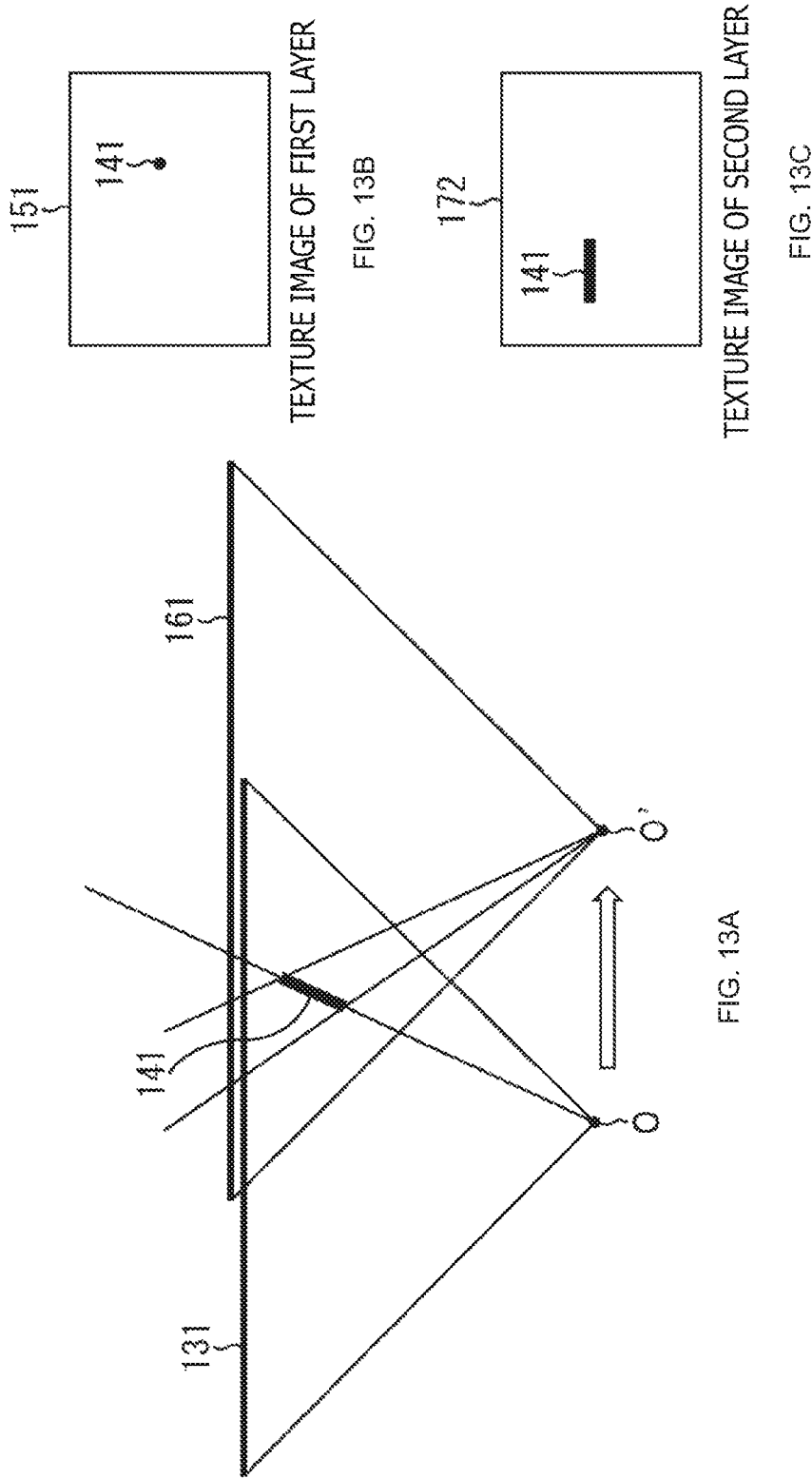

FIG. 15

| FILE NAME | AZIMUTH ANGLE | ELEVATION ANGLE | ROTATIONAL ANGLE | VISUAL LINE VECTOR (X,Y,Z) | | | VIEWPOINT LOCATION INFORMATION (X,Y,Z) | | | LATERAL ANGLE OF VIEW | LONGITUDINAL ANGLE OF VIEW | NUMBER OF LATERAL PIXELS | NUMBER OF LONGITUDINAL PIXELS |
|---|---|---|---|---|---|---|---|---|---|---|---|---|---|
| posZ2 | 0° | 0° | 0° | 0 | 0 | +1 | 0 | 0 | 0 | 100° | 100° | 1024 | 1024 |
| negZ2 | −180° | 0° | 0° | 0 | 0 | −1 | 0 | 0 | 0 | 100° | 100° | 1024 | 1024 |
| posX2 | +90° | 0° | 0° | +1 | 0 | 0 | 0 | +a | 0 | 100° | 100° | 1024 | 1024 |
| negX2 | −90° | 0° | 0° | −1 | 0 | 0 | 0 | −a | 0 | 100° | 100° | 1024 | 1024 |
| posY2 | 0° | +90° | 0° | 0 | +1 | 0 | 0 | 0 | +a | 100° | 100° | 1024 | 1024 |
| negY2 | 0° | −90° | 0° | 0 | −1 | 0 | 0 | 0 | −a | 100° | 100° | 1024 | 1024 |

F I G. 17

| FILE NAME | AZIMUTH ANGLE | ELEVATION ANGLE | ROTATIONAL ANGLE | VISUAL LINE VECTOR (X,Y,Z) | | | VIEWPOINT LOCATION INFORMATION (X,Y,Z) | | | LATERAL ANGLE OF VIEW | LONGITUDINAL ANGLE OF VIEW | NUMBER OF LATERAL PIXELS | NUMBER OF LONGITUDINAL PIXELS |
|---|---|---|---|---|---|---|---|---|---|---|---|---|---|
| posZ2 | 0° | 0° | 0° | 0 | 0 | +1 | +a | −a | 0 | 100° | 100° | 1024 | 1024 |
| negZ2 | −180° | 0° | 0° | 0 | 0 | −1 | −a | +a | 0 | 100° | 100° | 1024 | 1024 |
| posX2 | +90° | 0° | 0° | +1 | 0 | 0 | 0 | +a | −a | 100° | 100° | 1024 | 1024 |
| negX2 | −90° | 0° | 0° | −1 | 0 | 0 | 0 | −a | +a | 100° | 100° | 1024 | 1024 |
| posY2 | 0° | +90° | 0° | 0 | +1 | 0 | −a | 0 | +a | 100° | 100° | 1024 | 1024 |
| negY2 | 0° | −90° | 0° | 0 | −1 | 0 | +a | 0 | −a | 100° | 100° | 1024 | 1024 |

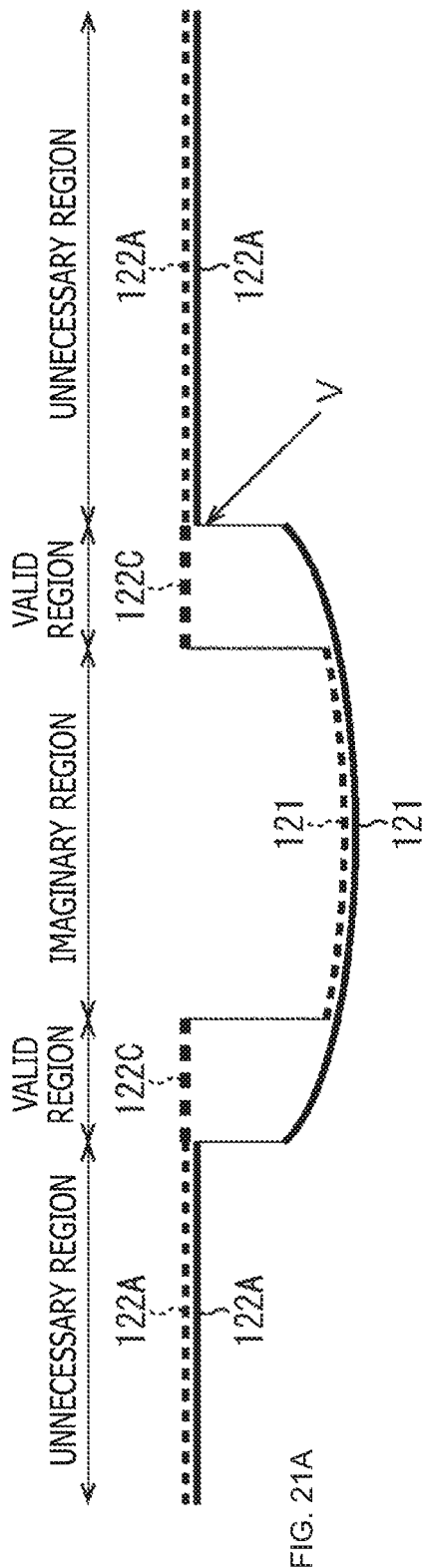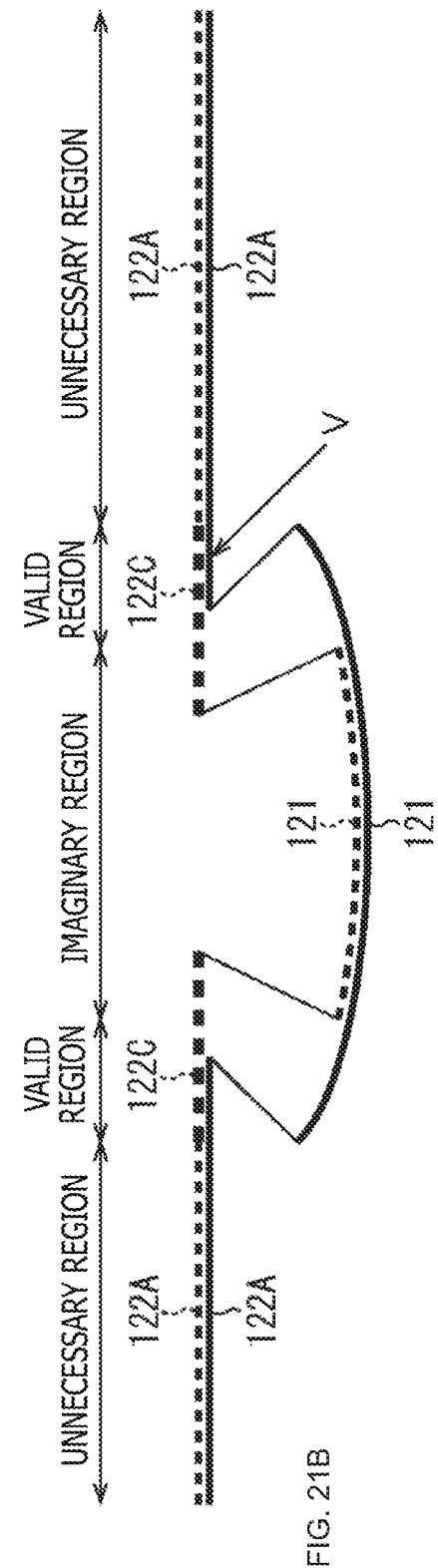

FIG. 30A
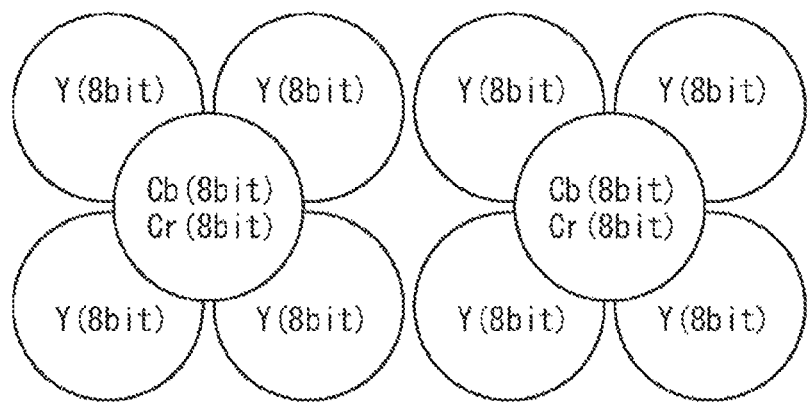
FIG. 30B
4:4:4
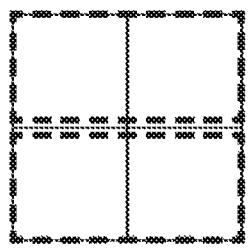 ⇨ EXPRESSED BY (N×N) GRADATION VALUES (Cb)
⇨ EXPRESSED BY (N×N) GRADATION VALUES (Cr)
4:2:0
 ⇨ Cb: (0, δ, 2×δ, 3×δ, ⋯, 255)   δ=256/(N×N−1)
 ⇨ Cr: (0, δ, 2×δ, 3×δ, ⋯, 255)   δ=256/(N×N−1)

FIG. 31
EXAMPLE OF N = 2 (FOREGROUND OR BACKGROUND)
4:4:4
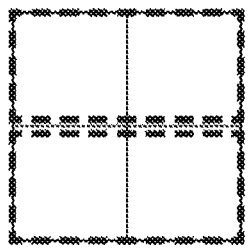
⇨ EXPRESSED BY 4 GRADATION VALUES (Cb)
(2 (FOREGROUNDS OR BACKGROUNDS) × 2)
⇨ EXPRESSED BY 4 GRADATION VALUES (Cr)
(2 (FOREGROUNDS OR BACKGROUNDS) × 2)
4:2:0
⇨ Cb : (0, 85, 170, 255)
⇨ Cr : (0, 85, 170, 255)

FIG. 32

| 4 GRADATION VALUES | | THRESHOLD |
|---|---|---|
| FOREGROUND / FOREGROUND | 0 | |
| | | 42.5 |
| FOREGROUND / BACKGROUND | 85 | |
| | | 127.5 |
| BACKGROUND / FOREGROUND | 170 | |
| | | 212.5 |
| BACKGROUND / BACKGROUND | 255 | |

FIG. 35

| 9 GRADATION VALUES | | THRESHOLD |
|---|---|---|
| 0 | 0 | 0 |
| | | 16 |
| 0 | 1 | 32 |
| | | 48 |
| 0 | 2 | 64 |
| | | 80 |
| 1 | 0 | 96 |
| | | 112 |
| 1 | 1 | 128 |
| | | 144 |
| 1 | 2 | 160 |
| | | 176 |
| 2 | 0 | 192 |
| | | 208 |
| 2 | 1 | 224 |
| | | 240 |
| 2 | 2 | 255 |

FIG. 45
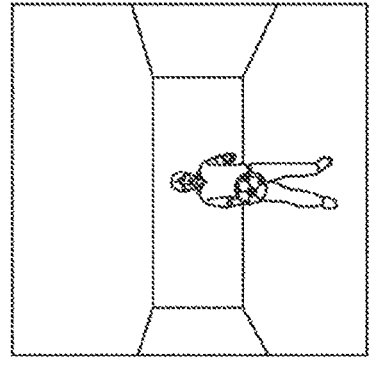
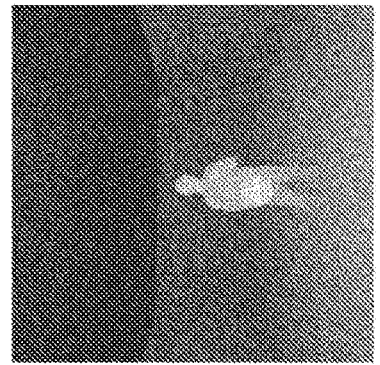
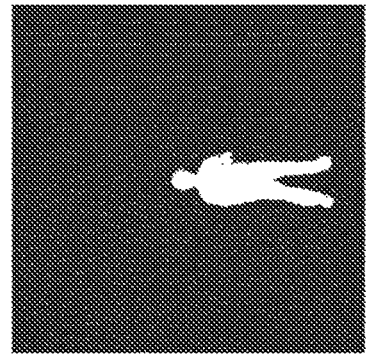

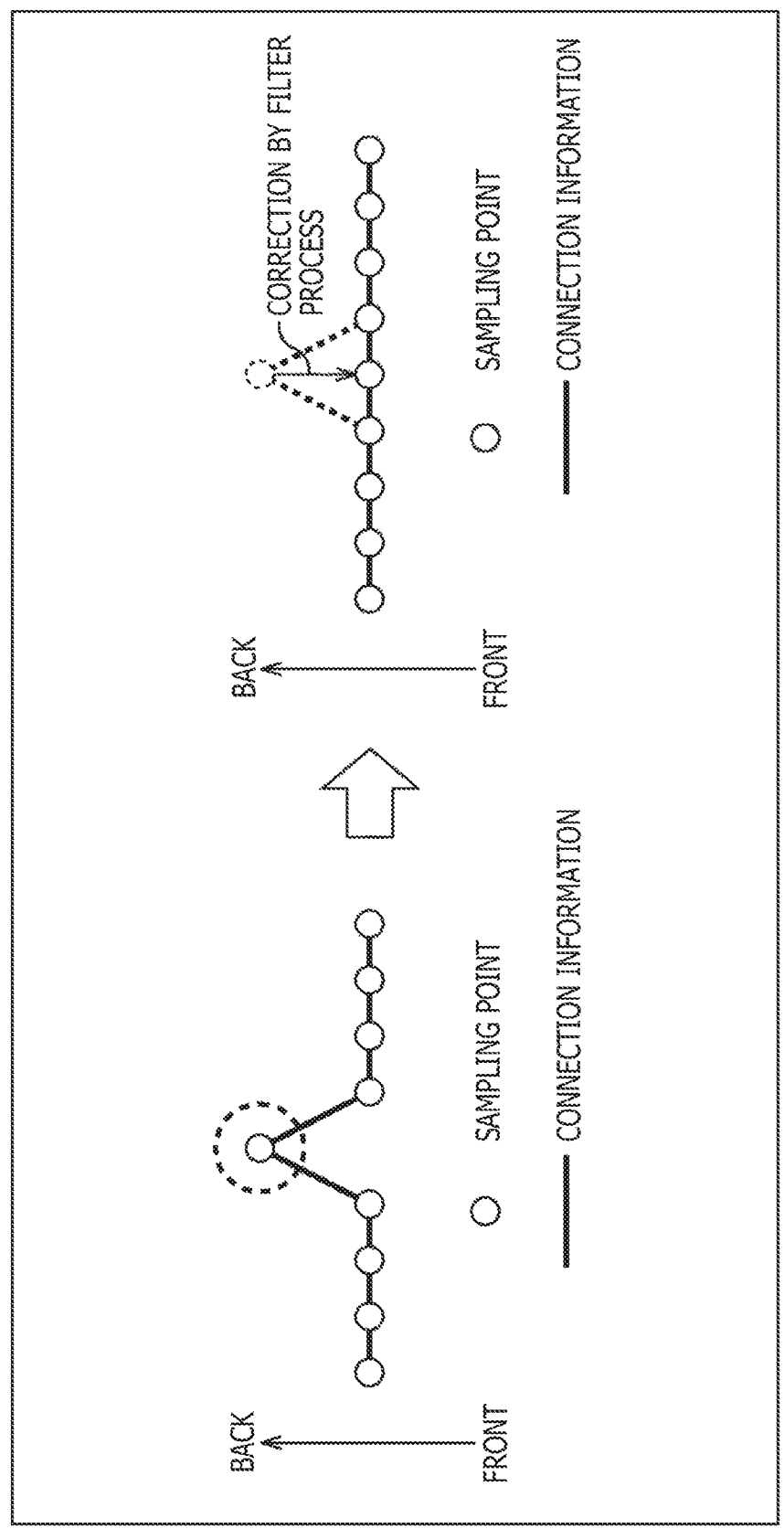
F I G. 4 7

EXAMPLE OF ASSUMING EDGE INFORMATION AS AUXILIARY INFORMATION

EXAMPLE OF ASSUMING REGION INFORMATION (ROI) AS AUXILIARY INFORMATION

FIG. 49

EXAMPLE OF ASSUMING FILTER FACTOR AS AUXILIARY INFORMATION

AVERAGE FILTER EFFECT

| 1.0 | 1.0 | 1.0 |
|---|---|---|
| 1.0 | 1.0 | 1.0 |
| 1.0 | 1.0 | 1.0 |

GAUSSIAN FILTER EFFECT
* DIFFER IN BLUR INTENSITY DEPENDING ON FACTOR

| 1.0 | 1.5 | 1.0 |
|---|---|---|
| 1.5 | 3.0 | 1.5 |
| 1.0 | 1.5 | 1.0 |

| 1.0 | 2.0 | 1.0 |
|---|---|---|
| 2.0 | 4.0 | 2.0 |
| 1.0 | 2.0 | 1.0 |

FIG. 50

| AUXILIARY INFORMATION | GRANULARITY | VALUE OF AUXILIARY INFORMATION (VALUE BEFORE CONVERSION INTO NxN GRADATION IN YCbCr420 FORMAT) | EFFECT |
|---|---|---|---|
| SEGMENTATION INFORMATION | PER PIXEL | SEGMENT ID (0, 1, 2, ..., N) | • CAN ACCURATELY SEPARATE FOREGROUND (OBJECT) FROM BACKGROUND<br>• CAN CORRECT MISMATCH BETWEEN TEXTURE AND DEPTH<br>• CAN CORRECT ERROR DATA REGARDING DEPTH VALUE IN SEGMENT<br>→ IMPROVE PRECISION OF THREE-DIMENSIONAL MODEL |
| REGION INFORMATION | PER PIXEL | ROI_ID (ROI_ID=1, 2, ..., N, ROI_ID=0: REMAINING REGIONS) | • CAN APPLY DIFFERENT PROCESSES AMONG REGIONS (CHANGE DISCONTINUOUS PIXEL DETECTION THRESHOLDS, PERFORM FILTER PROCESS ONLY ON PREDETERMINED REGION, OR THE LIKE)<br>→ IMPROVE PRECISION OF THREE-DIMENSIONAL MODEL |
| EDGE INFORMATION | PER PIXEL | NOT EDGE : 0<br>EDGE: 1 | • CAN EXECUTE PROCESS LIMITED ONLY TO SURROUNDINGS OF EDGES<br>→ PERFORM FILTER PROCESS (SHADING, ALPHA BLENDING, OR THE LIKE) ONLY ON SURROUNDINGS OF EDGES<br>→ IMPROVE PRECISION OF THREE-DIMENSIONAL MODEL |
| ALPHA VALUE INFORMATION | PER PIXEL | ALPHA VALUE (0-255) | • CAN PERFORM ALPHA BLENDING ON EACH PIXEL<br>→ EFFECT OF ANTIALIASING<br>→ CAN EXPRESS FADE-IN/FADE-OUT VIDEO |
| FILTER FACTOR INFORMATION | PER PIXEL | FILTER FACTOR (0-255) | • CAN CHANGE TYPE OR DEGREE OF FILTER PROCESS<br>→ CAN PERFORM APPROPRIATE FILTER PROCESS ON EACH PART |
| FACE REGION INFORMATION | PER PIXEL | NOT FACE REGION: 0<br>FACE REGION: 1 | • UNNECESSARY FOR REPRODUCING SIDE TO PERFORM FACE REGION DETECTION PROCESS<br>• UNNECESSARY TO SEPARATELY SEND FACE REGION INFORMATION AND CAN LESSEN BAND BURDEN |

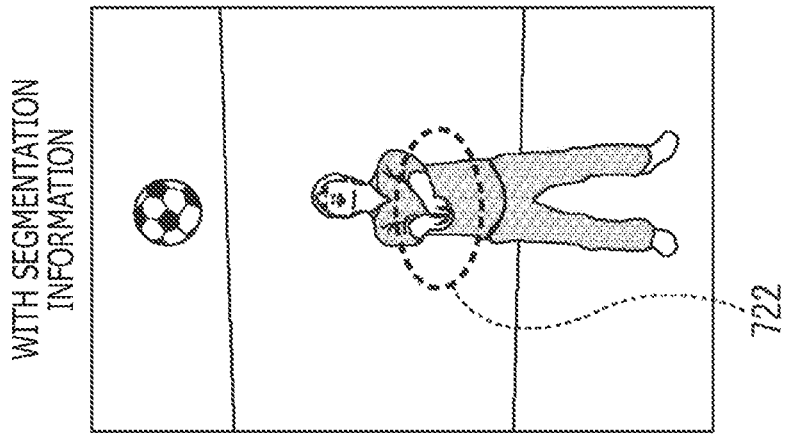
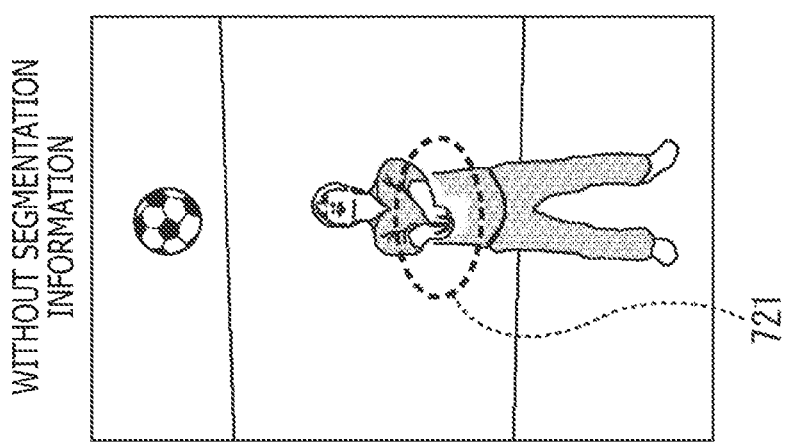
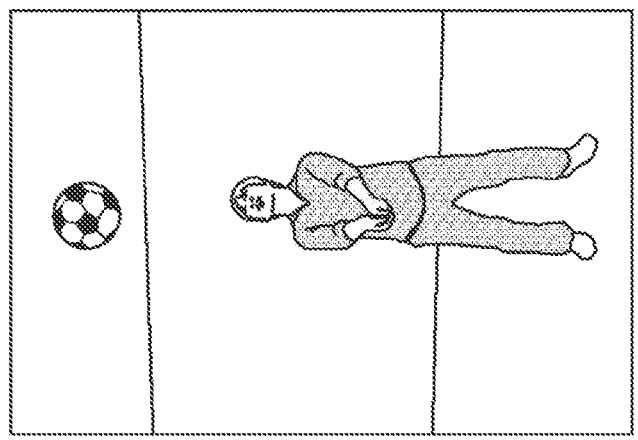

F I G. 5 3
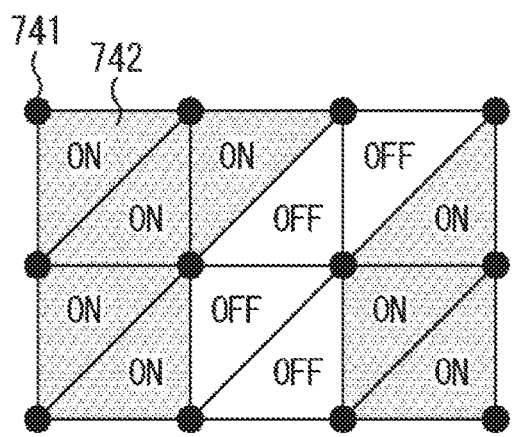

FIG. 54

| AUXILIARY INFORMATION | GRANULARITY | VALUE OF AUXILIARY INFORMATION (VALUE BEFORE CONVERSION INTO N×N GRADATION IN YCbCr420 FORMAT) | EFFECT |
|---|---|---|---|
| SEGMENTATION INFORMATION | PER PIXEL | SEGMENT ID (0, 1, 2, ..., N) | · CAN PERFORM APPROPRIATE INPAINTING IN OCCLUSION PROCESS |
| LAYER IDENTIFICATION INFORMATION | PER PIXEL OR PER PLURALITY OF PIXELS | LAYER NUMBER (1, 2, ..., N) | · CAN MAKE OFFSET ADJUSTMENT TO PREVENT LAYERS FROM INVERTING RELATION BETWEEN FOREGROUND AND BACKGROUND |
| TRIANGLE VALID/INVALID INFORMATION | PER PIXEL | TRIANGLE PATCH VALID: 0(ON) TRIANGLE PATCH INVALID: 1(OFF) | · CAN DELETE UNNECESSARY PATCHES SUCH THAT SECOND LAYER IS VISIBLE FROM FIRST LAYER |

IMAGE PROCESSING APPARATUS AND IMAGE PROCESSING METHOD

CROSS REFERENCE TO RELATED APPLICATIONS

This application is a U.S. National Phase of International Patent Application No. PCT/JP2018/002848 filed on Jan. 30, 2018, which claims priority benefit of Japanese Patent Application No. JP 2017-023789 filed in the Japan Patent Office on Feb. 13, 2017. Each of the above-referenced applications is hereby incorporated herein by reference in its entirety.

TECHNICAL FIELD

The present disclosure relates to an image processing apparatus and an image processing method, and particularly relates to an image processing apparatus and an image processing method capable of storing auxiliary information in CbCr components in a YCbCr format so as to prevent deterioration by a codec distortion.

BACKGROUND ART

PTL 1 discloses an encoder encoding first video data and first depth data associated with a first viewpoint (for example, a right viewpoint) and second video data and second depth data associated with a second viewpoint (a left viewpoint), and transmitting the encoded first video data and first depth data and the encoded second video data and second depth data to a multi-view rendering device.

Furthermore, PTL 1 discloses that the encoder stores auxiliary information (metadata) in a chromaticity component of depth data.

CITATION LIST

Patent Literature

[PTL 1]
JP-T-2016-524373

SUMMARY

Technical Problem

In a case of storing the auxiliary information in the chromaticity component and encoding the auxiliary information, there is a possible case in which a codec distortion occurs and the auxiliary information cannot be decoded correctly; however, PTL 1 does not mention a solution to this problem.

The present disclosure has been achieved in the light of such circumstances, and an object of the present disclosure is to store auxiliary information in CbCr components in a YCbCr format so as to prevent deterioration by a codec distortion.

Solution to Problem

An image processing apparatus according to a first aspect of the present disclosure includes a receiving section that receives depth image data in which a depth image transmitted together with a texture image is stored in a Y component in a YCbCr format and auxiliary information is stored in CbCr components in the YCbCr format, and an auxiliary information utilization section that executes a predetermined image process using the auxiliary information on at least one of the texture image or the depth image. A value that can be taken on by the auxiliary information for each pixel of the texture image has N patterns, and a gradation value out of N×N gradation values into which a combination of the auxiliary information regarding two pixels is converted is stored in the CbCr components.

An image processing method according to the first aspect of the present disclosure includes steps of causing an image processing apparatus to receive depth image data in which a depth image transmitted together with a texture image is stored in a Y component in a YCbCr format and auxiliary information is stored in CbCr components in the YCbCr format, and causing an image processing apparatus to execute a predetermined image process using the auxiliary information on at least one of the texture image or the depth image. A value that can be taken on by the auxiliary information for each pixel of the texture image has N patterns, and a gradation value out of N×N gradation values into which a combination of the auxiliary information regarding two pixels is converted is stored in the CbCr components.

According to the first aspect of the present disclosure, the depth image data in which the depth image transmitted together with the texture image is stored in the Y component in the YCbCr format and the auxiliary information is stored in the CbCr components in the YCbCr format is received, and the predetermined image process using the auxiliary information is executed on at least one of the texture image or the depth image. The value that can be taken on by the auxiliary information for each pixel of the texture image has N patterns, and the gradation value out of the N×N gradation values into which the combination of the auxiliary information regarding two pixels is converted is stored in the CbCr components.

An image processing apparatus according to a second aspect of the present disclosure includes an image data generation section that generates depth image data in which a depth image transmitted together with a texture image is stored in a Y component in a YCbCr format and auxiliary information utilized in a process of at least one of the texture image or the depth image is stored in CbCr components in the YCbCr format. A value that can be taken on by the auxiliary information for each pixel of the texture image has N patterns, and the image data generation section stores a gradation value out of N×N gradation values into which a combination of the auxiliary information regarding two pixels is converted in the CbCr components.

An image processing method according to the second aspect of the present disclosure includes a step of causing an image processing apparatus to generate depth image data in which a depth image transmitted together with a texture image is stored in a Y component in a YCbCr format and auxiliary information utilized in a process of at least one of the texture image or the depth image is stored in CbCr components in the YCbCr format. A value that can be taken on by the auxiliary information for each pixel of the texture image has N patterns, and a gradation value out of N×N gradation values into which a combination of the auxiliary information regarding two pixels is converted is stored in the CbCr components.

According to the second aspect of the present disclosure, the depth image data in which the depth image transmitted together with the texture image is stored in the Y component in the YCbCr format and the auxiliary information utilized in the process of at least one of the texture image or the depth image is stored in the CbCr components in the YCbCr format is generated. The value that can be taken on by the auxiliary information for each pixel of the texture image has N patterns, and the gradation value out of the N×N gradation values into which the combination of the auxiliary information regarding two pixels is converted is stored in the CbCr components.

The image processing apparatus may be an independent apparatus or may be an internal block that configures one apparatus.

It is noted that the image processing apparatuses according to the first and second aspects of the present disclosure can be each realized by causing a computer to execute a program.

Furthermore, to realize each of the image processing apparatuses according to the first and second aspects of the present disclosure, the program executed by the computer can be provided by being transmitted via a transmission medium or by being recorded in a storage medium.

Advantageous Effects of Invention

According to the first aspect of the present disclosure, it is possible to use the auxiliary information stored in the CbCr components in the YCbCr format so as to prevent deterioration by the codec distortion.

According to the second aspect of the present disclosure, it is possible to store the auxiliary information in the CbCr components in the YCbCr format so as to prevent deterioration by the codec distortion.

It is noted that effects are not always limited to those described herein but may be any of the effects described in the present disclosure.

BRIEF DESCRIPTION OF DRAWINGS

FIG. 9 is a diagram depicting an example of a configuration of a table of viewpoint location information and face information regarding the first layer.

FIGS. 13A, 13B, and 13C represent explanatory diagrams of another example of the texture images of the first layer and the second layer.

FIG. 15 is a diagram depicting a first example of a configuration of a table of viewpoint location information and face information regarding the second layer.

FIG. 17 is a diagram depicting a second example of the configuration of the table of the viewpoint location information and the face information regarding the second layer.

FIGS. 21A and 21B represent explanatory diagrams of an example of connection information.

FIGS. 30A and 30B represent explanatory diagrams of a 420 conversion process executed by a YCbCr420 conversion section.

FIG. 31 is an explanatory diagram of the 420 conversion process in a case of N=2.

FIG. 32 is an explanatory diagram of the 420 conversion process in the case of N=2.

FIG. 35 is an explanatory diagram of the 420 conversion process in the case of N=3.

FIG. 45 is an explanatory diagram of an example of storing segmentation information as the auxiliary information.

FIG. 47 is an explanatory diagram of an example of storing the segmentation information as the auxiliary information.

FIG. 49 is an explanatory diagram of an example of storing filter factor information as the auxiliary information.

FIG. 50 is a diagram of a summary of various information that can be obtained as the auxiliary information in one layer and effects thereof.

FIGS. 51A, 51B, and 51C represent explanatory diagrams of an example of storing the segmentation information as the auxiliary information.

FIG. 53 is an explanatory diagram of an example of storing triangle valid/invalid information as the auxiliary information.

FIG. 54 is a diagram of a summary of various information that can be obtained as the auxiliary information in a plurality of layers and effects thereof.

DESCRIPTION OF EMBODIMENTS

Modes for carrying out the present disclosure (hereinafter, referred to as "embodiments") will be described hereinafter. It is noted that description will be given in the following order.

1. First embodiment: image display system (FIGS. 1, 2, 3, 4A, 4B, 5, 6A, 6B, 7, 8A, 8B, 9, 10, 11, 12A, 12B, 12C, 13A, 13B, 13C, 14A, 14B, 15, 16A, 16B, 17, 18, 19, 20, 21A, 21B, 22, 23A, 23B, 24A, 24B, 25A, 25B, 26, and 27)

2. Second embodiment: image display system (FIGS. 28, 29, 30A, 30B, 31, 32, 33, 34, 35, 36, 37, 38, 39, 40, 41, 42, 43, 44, 45, 46, 47, 48A, 48B, 49, 50, 51A, 51B, 51C, 52, 53, and 54)

Figure 55:
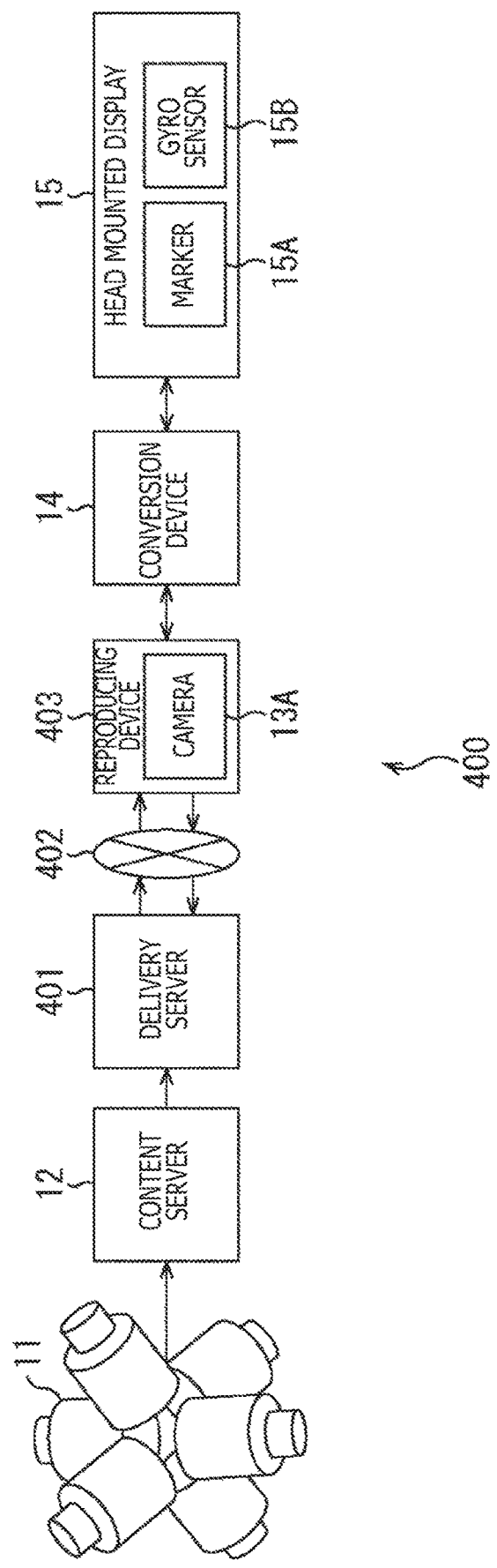
FIG. 55 is a block diagram depicting an example of a configuration of a third embodiment of an image display system to which the present disclosure is applied.

3. Third embodiment: image display system (FIG. 55)

Figure 56A:
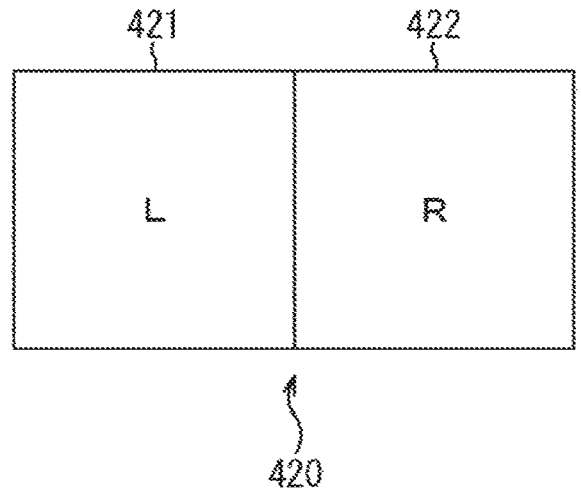
FIGS. 56A and 56B represent explanatory diagrams of other examples of texture images of the first layer.
Figure 56B:
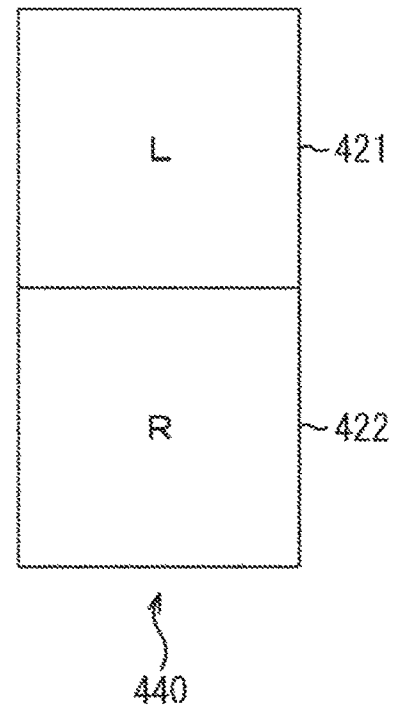

4. Other examples of texture images (FIGS. 56A and 56B)

Figure 57:
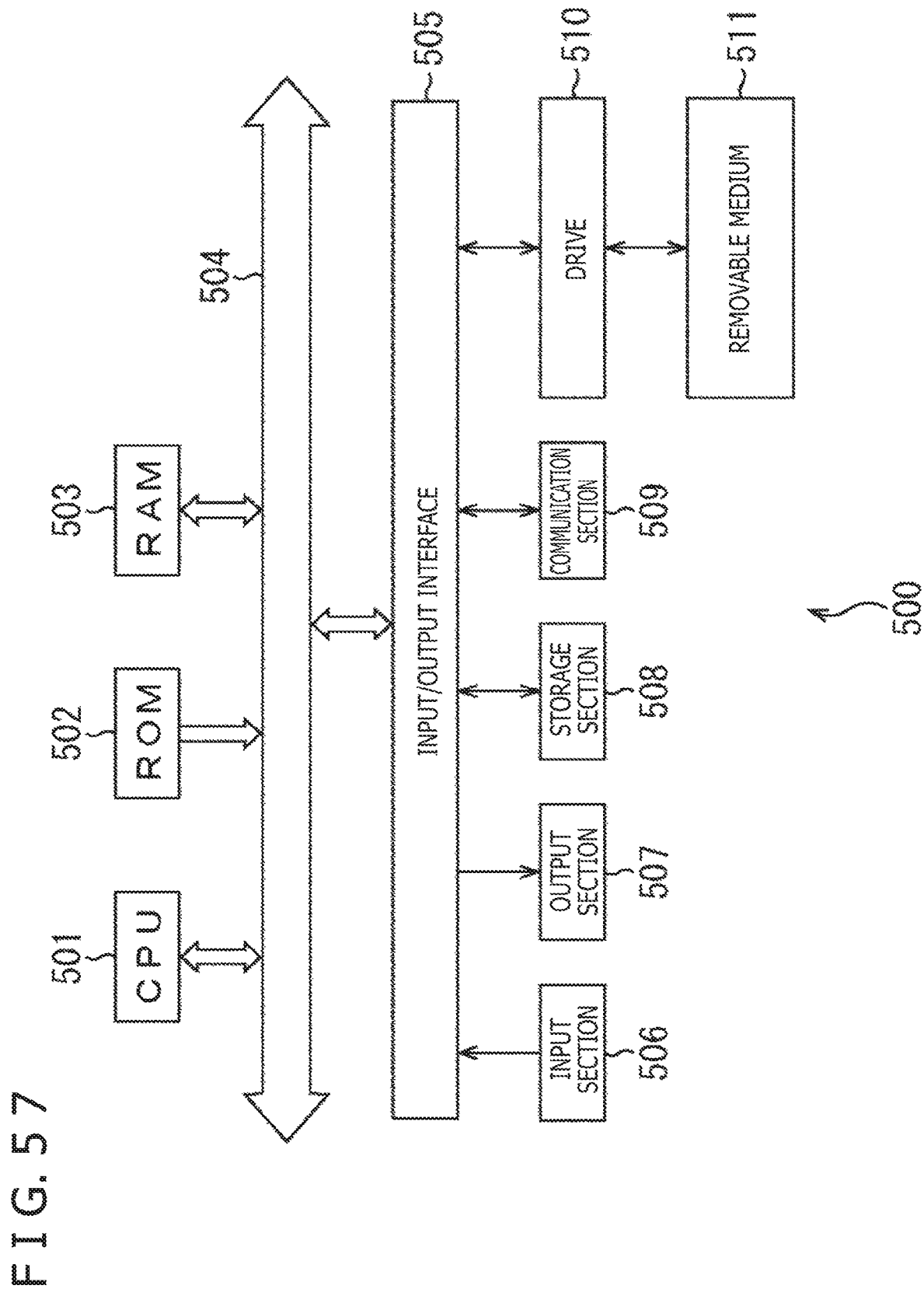
FIG. 57 is a block diagram illustrating an example of a configuration of computer hardware.

5. Fourth embodiment: computer (FIG. 57)

Figure 58:
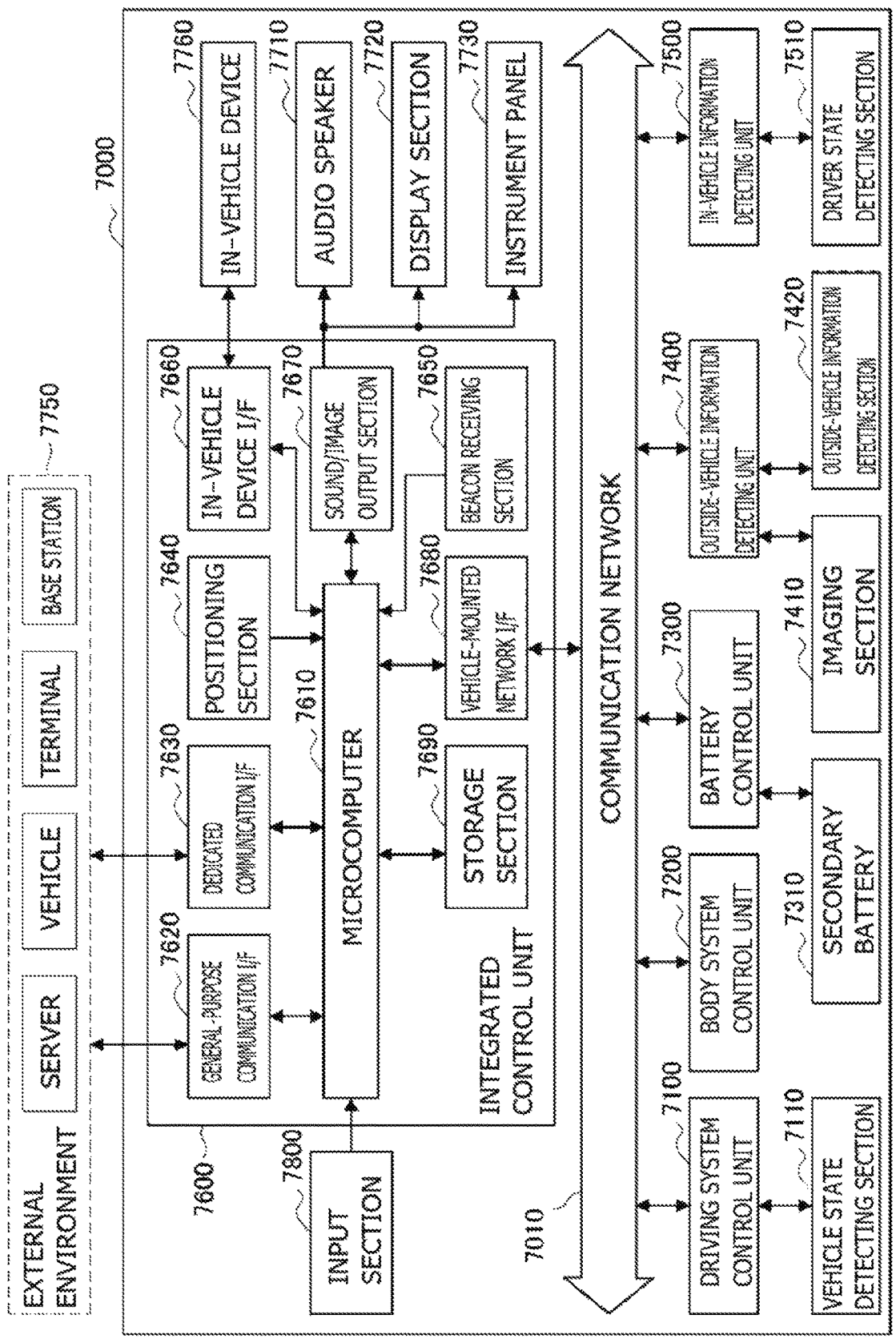
FIG. 58 is a block diagram depicting an example of schematic configuration of a vehicle control system.
Figure 59:
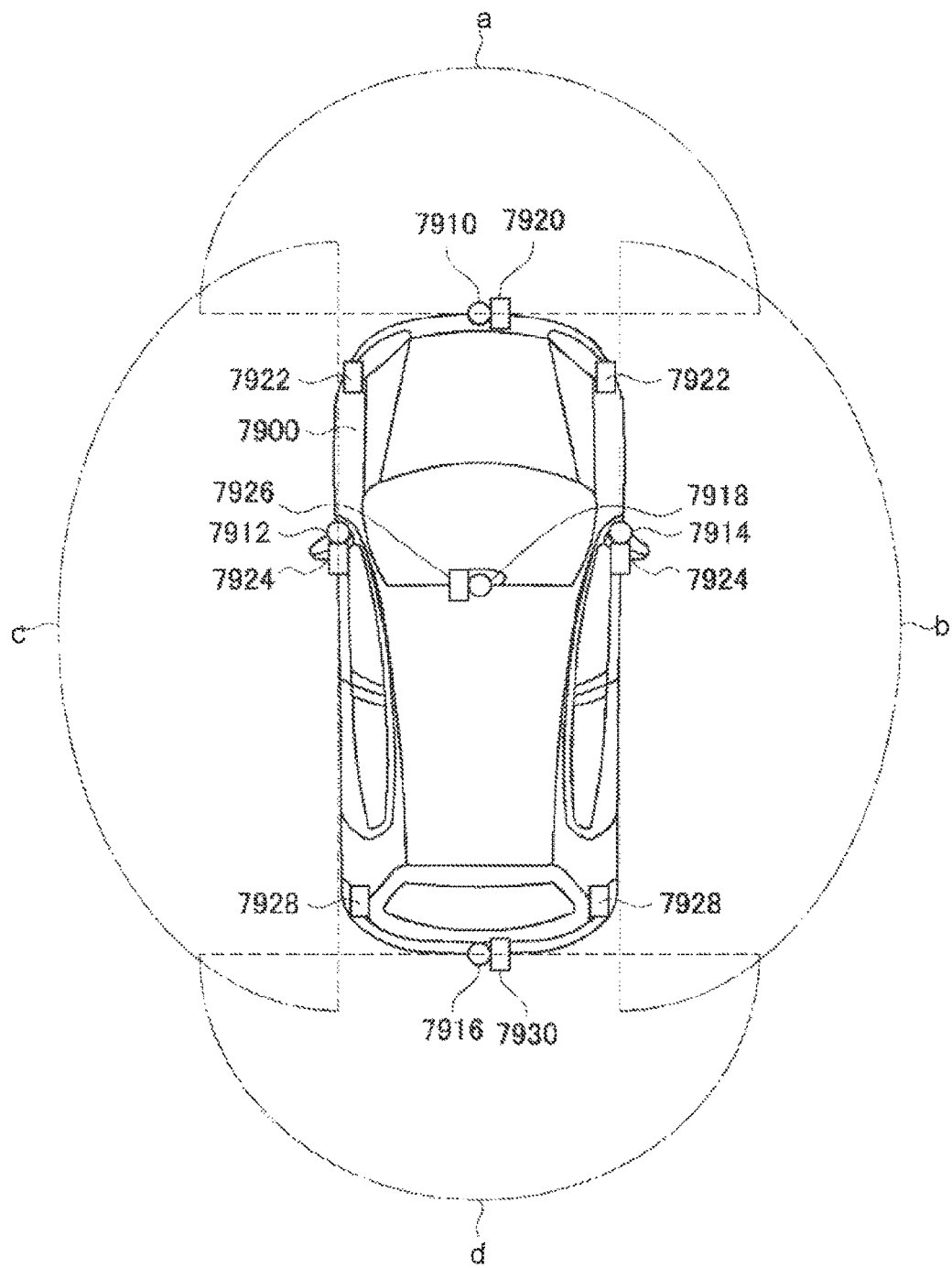
FIG. 59 is a diagram of assistance in explaining an example of installation positions of an outside-vehicle information detecting section and an imaging section.

6. Application example (FIGS. 58 and 59)

1. First Embodiment (Example of Configuration of First Embodiment of Image Display System)

Figure 1:
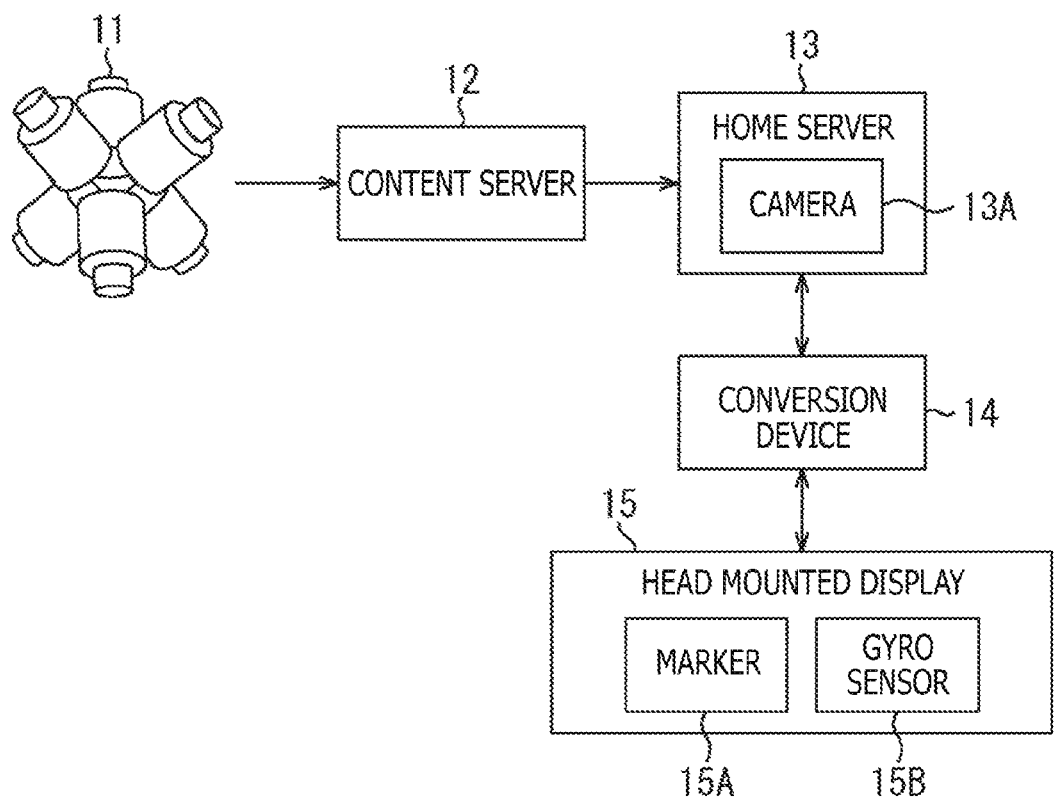
FIG. 1 is a block diagram depicting an example of a configuration of a first embodiment of an image display system to which the present disclosure is applied.

FIG. 1 is a block diagram depicting an example of a configuration of a first embodiment of an image display system to which the present disclosure is applied.

An image display system 10 of FIG. 1 is configured with a multi-camera 11, a content server 12, a home server 13, a conversion device 14, and a head mounted display 15. The image display system 10 generates an omnidirectional image from captured images that are YCbCr images (YUV images) captured by the multi-camera 11 and displays an image in a visual field range of a viewer out of the omnidirectional image.

Specifically, the multi-camera 11 in the image display system 10 is configured with a plurality of (six in the example of FIG. 1) cameras having a 360-degree visual field in a horizontal direction and a 180-degree visual field in a perpendicular direction as a photographing range and disposed outward. Photographing is performed by each camera and the camera generates a captured image per frame. The multi-camera 11 supplies the captured images by the cameras to the content server 12.

The content server 12 (image processing apparatus) generates a texture image and a depth image of the omnidirectional image at a predetermined viewpoint from the captured image by each camera supplied from the multi-camera 11. In the first embodiment, the depth image is an image having, as a pixel value, a reciprocal 1/r of a distance r, which is distance r of a straight line from the predetermined viewpoint to a subject in each pixel and which is an eight-bit value.

The content server 12 reduces resolutions of the texture image and the depth image of the omnidirectional image to generate a low resolution texture image and a low resolution depth image. The content server 12 compresses and encodes the low resolution texture image and the low resolution depth image by an encoding scheme such as H.264/MPEG (Moving Picture Experts Group)-4 AVC (Advanced Video Coding), H.265/HEVC (High Efficiency Video Coding), MPEG2, or DV. The content server 12 stores an encoded stream of the low resolution texture images (hereinafter, referred to as "low resolution texture stream") and an encoded stream of the low resolution depth images (hereinafter, referred to as "low resolution depth stream") obtained as a result of the compression and encoding.

Furthermore, the content server 12 hierarchizes and generates texture images and depth images corresponding to six faces that configure a cube about a viewpoint of the omnidirectional image assumed as a center thereof, using the captured images by the cameras. Specifically, the content server 12 generates texture images and depth images of a first layer and a second layer on the sixth faces. It is noted that the viewpoint in the omnidirectional image may differ from the center of the cube.

The content server 12 compresses and encodes first layer images each including the texture image and the depth image of the first layer on each face and second layer images each including the texture image and the depth image of the second layer on each face per face, per image type, and per layer by the encoding scheme such as H.264/MPEG-4 AVC, H.265/HEVC, MPEG2, or DV. The content server 12 stores an encoded stream of the texture images of the first layer on each face (hereinafter, referred to as "first layer texture stream"), an encoded stream of the depth images of the first layer on each face (hereinafter, referred to as "first layer depth stream"), an encoded stream of the texture images of the second layer on each face (hereinafter, referred to as "second layer texture stream"), and an encoded stream of the depth images of the second layer on each face (hereinafter, referred to as "second layer depth stream") obtained as a result of the compression and encoding. It is noted that the encoding scheme of the first layer images and the second layer images may be MVC (Multiview Video Coding), 3D-HEVC, or the like.

Moreover, the content server 12 generates information and the like related to each face of the first layer and the second layer as metadata and stores the metadata. The content server 12 transmits the low resolution texture stream and the low resolution depth stream, the first layer texture streams, the first layer depth streams, the second layer texture streams, and the second layer depth streams on the six faces, and the metadata, all of which are stored in the content server 12, to the home server 13 via a network that is not depicted.

It is noted that the content server 12 can reconfigure (to be described later in detail) the first layer texture streams, the first layer depth streams, the second layer texture streams, and the second layer depth streams of the six faces. In this case, the content server 12 can transmit the first layer texture streams, the first layer depth streams, the second layer texture streams, and the second layer depth streams after reconfiguration as well as metadata corresponding thereto to the home server 13. For the sake of convenience, however, it is assumed hereinafter that the first layer texture streams, the first layer depth streams, the second layer texture streams, and the second layer depth streams of the six faces before reconfiguration are transmitted to the content server 12 even in the case in which reconfiguration is performed.

The home server 13 (image processing apparatus) receives the low resolution texture stream, the low resolution depth stream, the first layer texture streams, the first layer depth streams, the second layer texture streams, and the second layer depth streams of the six faces, and the metadata all of which are transmitted from the content server 12.

Furthermore, the home server 13 incorporates therein a camera 13A and captures an image of a marker 15A affixed to the head mounted display 15 attached to the viewer's head. The home server 13 then detects a viewing location on the basis of the captured image of the marker 15A. Moreover, the home server 13 receives a detection result of a gyro sensor 15B in the head mounted display 15 from the head mounted display 15 via the conversion device 14. The home server 13 determines a visual line direction of the viewer on the basis of the detection result of the gyro sensor 15B and determines a visual field range of the viewer on the basis of the viewing location and the visual line direction.

The home server 13 selects the three faces corresponding to the visual line direction of the viewer from among the six faces of the first layer. In addition, the home server 13 decodes the first layer texture streams, the first layer depth streams, the second layer texture streams, and the second layer depth streams corresponding to the selected three faces. The home server 13 thereby generates texture images and depth images of the first layer and the second layer corresponding to the selected three faces.

Moreover, the home server 13 decodes the low resolution texture stream and the low resolution depth stream and generates low resolution texture images and low resolution depth images. The home server 13 generates images in the visual field range of the viewer as a display image using the texture images and the depth images of the first layer and the second layer corresponding to the selected three faces, the low resolution texture images, and the low resolution depth images. The home server 13 transmits the display image to the conversion device 14 via an HDMI (registered trademark) (High-Definition Multimedia Interface) cable that is not depicted.

The conversion device 14 converts coordinates in the display image transmitted from the home server 13 into coordinates in the head mounted display 15. The conversion device 14 supplies the coordinate-converted display image to the head mounted display 15.

The head mounted display 15 has the marker 15A and the gyro sensor 15B and is attached to the viewer's head. The head mounted display 15 displays the display image supplied from the conversion device 14. Furthermore, the gyro sensor 15B incorporated in the head mounted display 15 detects an inclination of the head mounted display 15 and transmits a detection result of the inclination to the home server 13 via the conversion device 14.

(Example of Configuration of Content Server)

Figure 2:
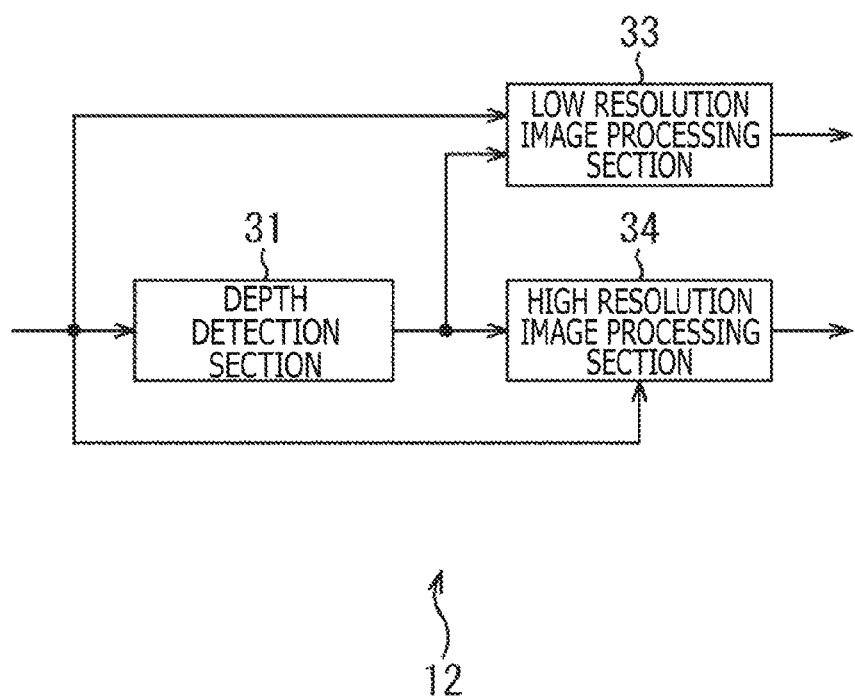
FIG. 2 is a block diagram depicting an example of a configuration of a content server.

FIG. 2 is a block diagram depicting an example of a configuration of the content server 12 of FIG. 1.

The content server 12 of FIG. 2 is configured with a depth detection section 31, a low resolution image processing section 33, and a high resolution image processing section 34.

The depth detection section 31 in the content server 12 detects, per pixel of the captured image by each camera supplied from the multi-camera 11 of FIG. 1, a reciprocal $1/z$ of a distance z in a depth direction between a depth plane, which contains a subject in the pixel and which is perpendicular to the depth direction, and the camera. The depth detection section 31 supplies a z image having, as a pixel value, the reciprocal $1/z$ of each pixel of the captured image by each camera obtained as a result of detection to the low resolution image processing section 33 and the high resolution image processing section 34.

The low resolution image processing section 33 generates the texture image of the omnidirectional image by mapping (perspectively projecting) the captured image by each camera supplied from the multi-camera 11 onto a regular octahedron about a predetermined three-dimensional location in a three-dimensional coordinate system of the multi-camera 11 (hereinafter, referred to as "camera coordinate system") assumed as the viewpoint. Furthermore, the low resolution image processing section 33 generates the z image of the omnidirectional image by mapping the z image by each camera supplied from the depth detection section 31 onto the regular octahedron similarly to the captured image.

The low resolution image processing section 33 converts the reciprocal $1/z$ of each pixel of the z image of the omnidirectional image into the reciprocal $1/r$. The low resolution image processing section 33 then performs 8-bit quantization on the reciprocal $1/r$ by the following Equation (1).

[Math. 1]

$$I_d(r) = \text{round}\left[255\left(\frac{1}{r} - \frac{1}{r_{max}}\right) \Big/ \left(\frac{1}{r_{min}} - \frac{1}{r_{max}}\right)\right] \quad (1)$$

It is noted that $I_d(r)$ denotes an 8-bit quantized value of the reciprocal $1/r$ of the distance r. In addition, $r_{max}$ and $r_{min}$ denote a maximum value and a minimum value of the distance r in the omnidirectional image, respectively.

The low resolution image processing section 33 generates the depth image of the omnidirectional image by using the 8-bit quantized value of the reciprocal $1/r$ of each pixel of the omnidirectional image as a pixel value.

The low resolution image processing section 33 reduces the resolutions of the texture images and the depth images of the omnidirectional image to generate the low resolution texture images and the low resolution depth images. The low resolution image processing section 33 compresses and encodes the low resolution texture images and the low resolution depth images, and stores the low resolution texture stream and the low resolution depth stream obtained as a result of the compression and encoding. The low resolution image processing section 33 transmits the low resolution texture stream and low resolution depth stream stored therein to the home server 13 of FIG. 1.

The high resolution image processing section 34 generates the texture images of the first layer and the second layer corresponding to the six faces configuring the cube identical in center to the regular octahedron used in the low resolution image processing section 33 using the captured images by the cameras supplied from the multi-camera 11. The high resolution image processing section 34 generates the depth images of the first layer and the second layer corresponding to the six faces using the z images of the cameras supplied from the depth detection section 31 similarly to the captured images.

The high resolution image processing section 34 compresses and encodes the texture images and the depth images of the first layer and the second layer on the faces per face, per image type, and per layer. The content server 12 stores the first layer texture streams, the first layer depth streams, the second layer texture streams, and the second layer depth streams obtained as a result of the compression and encoding.

Furthermore, the high resolution image processing section 34 generates and stores the metadata. The content server 12 transmits the first layer texture streams, the first layer depth streams, the second layer texture streams, and the second layer depth streams of the six faces and the metadata, all of which are stored therein, to the home server 13 via the network that is not depicted.

(Example of Configuration of High Resolution Image Processing Section)

Figure 3:
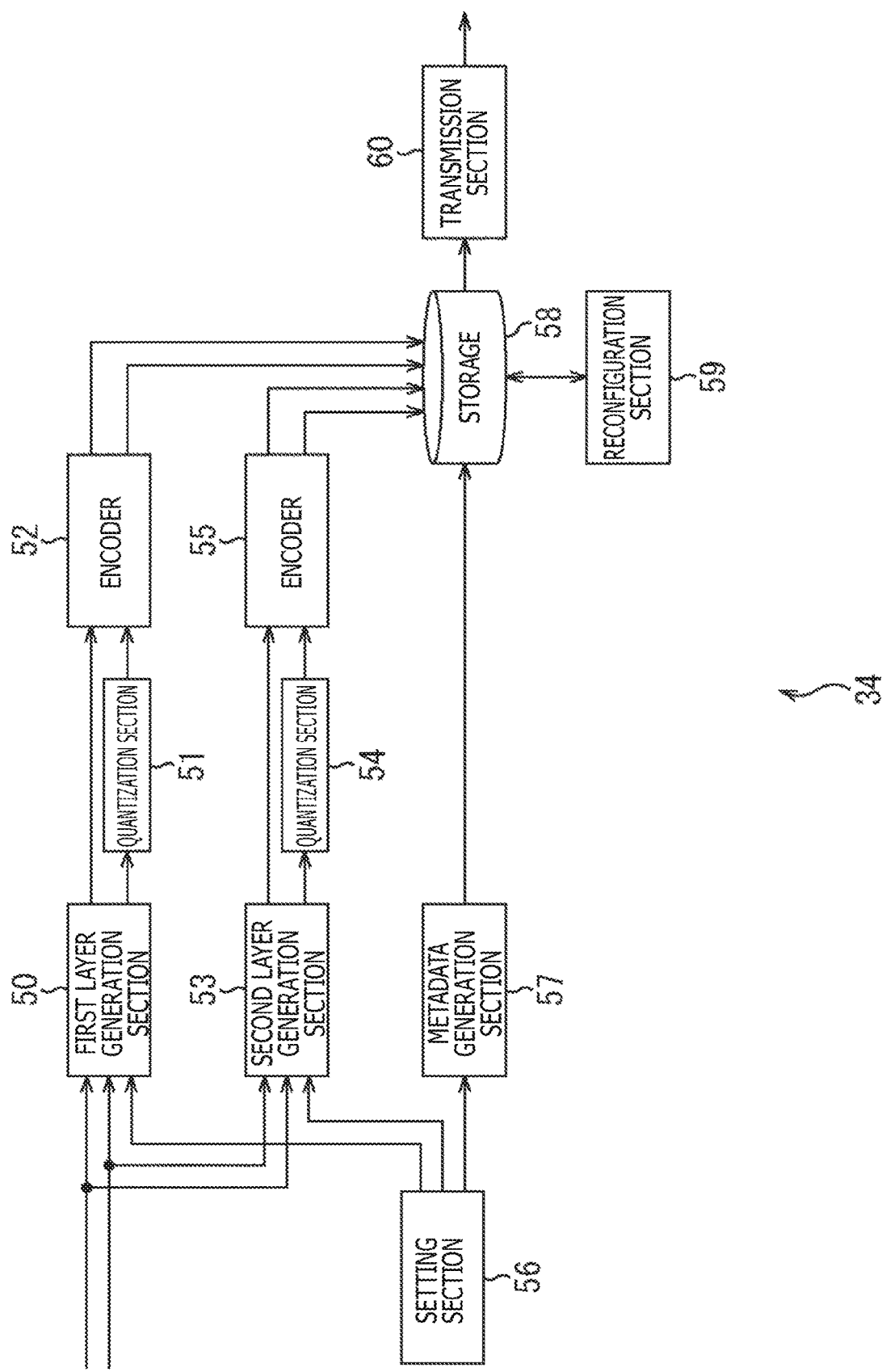
FIG. 3 is a block diagram depicting an example of a configuration of a high resolution image processing section.

FIG. 3 is a block diagram depicting an example of a configuration of the high resolution image processing section 34 of FIG. 2.

The high resolution image processing section 34 of FIG. 3 is configured with a first layer generation section 50, a quantization section 51, an encoder 52, a second layer generation section 53, a quantization section 54, an encoder 55, a setting section 56, a metadata generation section 57, a storage 58, a reconfiguration section 59, and a transmission section 60.

Viewpoint location information that indicates an origin as a three-dimensional location of a viewpoint of the first layer in a three-dimensional coordinate system (hereinafter, referred to as "3D model coordinate system") having a viewpoint of the omnidirectional image in the camera coordinate system assumed as the origin is supplied from the setting section 56 to the first layer generation section 50. Face information that indicates a three-dimensional position and a size, in the 3D model coordinate system, of each of six faces that contain the six faces configuring the cube about the origin in the 3D model coordinate system as the center thereof is also supplied to the first layer generation section 50.

The first layer generation section 50 sets the origin indicated by the viewpoint location information to the viewpoint of the first layer (first viewpoint). The first layer generation section 50 (image generation section) maps the captured images supplied from the multi-camera 11 of FIG. 1 onto the faces at the three-dimensional locations and the sizes indicated by the face information regarding the six faces, from the viewpoint of the first layer with the viewpoint of the omnidirectional image in the camera coordinate system assumed as the origin. The first layer generation section 50 thereby generates the texture images of the six faces of the first layer.

Furthermore, the first layer generation section 50 (image generation section) maps the z images supplied from the depth detection section 31 of FIG. 2 onto the faces at the three-dimensional locations and the sizes indicated by the face information regarding the six faces, from the viewpoint of the first layer with the viewpoint of the omnidirectional image in the camera coordinate system assumed as the origin. The first layer generation section 50 thereby generates the z images of the six faces of the first layer.

Since viewpoints corresponding to the six faces of the first layer are identical, the texture images of the six faces of the first layer may be regarded as images obtained by mapping the omnidirectional image, which is mapped onto the 3D model about the viewpoint of the first layer as a center, onto the six faces. Likewise, the z images of the six faces of the first layer may be regarded as images obtained by mapping the z image of the omnidirectional image, which is mapped onto the 3D model about the viewpoint of the first layer as the center, onto the six faces. The first layer generation section 50 supplies the texture images of the six faces of the first layer to the encoder 52, and supplies the z images of the six faces of the first layer to the quantization section 51.

The quantization section 51 converts the reciprocal 1/z of each pixel of each of the z images of the six faces of the first layer supplied from the first layer generation section 50 into the reciprocal 1/r. The quantization section 51 then performs 8-bit quantization on the reciprocal 1/r by Equation (1) described above. In Equation (1), $r_{max}$ and $r_{min}$ denote the maximum value and the minimum value of the distance r, respectively on all of the six faces. Setting $r_{max}$ and $r_{min}$ as the maximum value and the minimum value of the distance r on all of the six faces makes it possible to prevent a quantization step from changing depending on the faces, compared with a case of setting the maximum value and the minimum value of the distance r on each face. The quantization section 51 sets the 8-bit quantized value of the reciprocal 1/r of each pixel of the z images of the six faces of the first layer as a pixel value, thereby generating the depth images of the six faces of the first layer and supplying the depth images to the encoder 52.

The encoder 52 compresses and encodes the texture images and the depth images of the six faces of the first layer per face and per image type to generate the first layer texture streams and the first layer depth streams. The encoder 52 supplies the first layer texture streams and the first layer depth streams to the storage 58.

Viewpoint location information regarding a viewpoint (second viewpoint), which differs from the viewpoint of the first layer, of each face of the second layer corresponding to each face of the first layer and face information regarding each face of the second layer corresponding to each face of the first layer are supplied from the setting section 56 to the second layer generation section 53. The second layer generation section 53 sets a three-dimensional location indicated by the viewpoint location information corresponding to each face of the second layer to the viewpoint of the second layer per face.

The second layer generation section 53 (image generation section) maps an occlusion region at the viewpoint of the first layer among the captured image supplied from the multi-camera 11 onto each face of the second layer from the viewpoint of the second layer corresponding to the face of the second layer. The second layer generation section 53 thereby generates the texture images of the six faces of the second layer.

Furthermore, the second layer generation section 53 (image generation section) maps an occlusion region at the viewpoint of the first layer among the z image supplied from the depth detection section 31 onto each face of the second layer from the viewpoint of the second layer corresponding to the face of the second layer. The second layer generation section 53 thereby generates the z images of the six faces of the second layer.

In other words, the cameras are at different locations in the multi-camera 11; thus, when one three-dimensional location in the camera coordinate system is assumed as the viewpoint, each captured image contains an occlusion region at the viewpoint. However, since the texture images of the first layer are generated by mapping the omnidirectional image at one viewpoint, the texture images of the first layer do not contain the captured images of the occlusion region at the viewpoint. Thus, the second layer generation section 53 contains the captured images of the occlusion regions as the texture images of the second layer. This similarly applies to the z images. The second layer generation section 53 supplies the texture images of the six faces of the second layer to the encoder 55 and supplies the z images of the six faces of the second layer to the quantization section 54.

The quantization section 54 converts the reciprocal 1/z of each pixel of each of the z image of the six faces of the second layer supplied from the second layer generation section 53 into the reciprocal 1/r. The quantization section 54, like the quantization section 51, then performs 8-bit quantization on the reciprocal 1/r by Equation (1) described above. The quantization section 54 sets the 8-bit quantized value of the reciprocal 1/r of each pixel of the z images of the six faces of the second layer as a pixel value, thereby generating the depth images of the six faces of the second layer and supplying the depth images to the encoder 55.

The encoder 55 compresses and encodes the texture images and the depth images of the six faces of the second layer per face and per image type to generate the second layer texture streams and the second layer depth streams. The encoder 55 supplies the second layer texture streams and the second layer depth streams to the storage 58.

The setting section 56 sets the origin in the 3D model coordinate system as the viewpoint of the first layer. The setting section 56 sets the six faces containing the six rectangular faces configuring the cube about the viewpoint of the first layer assumed as the center thereof, as the faces of the first layer. In addition, the setting section 56 sets the viewpoint of the second layer and the rectangular face per face of the first layer.

The setting section 56 supplies one viewpoint location information and the six pieces of face information regarding the first layer to the first layer generation section 50 and the metadata generation section 57. In addition, the setting section 56 supplies six pieces of viewpoint location information and six pieces of face information regarding the second layer corresponding to the six faces of the first layer to the second layer generation section 53 and the metadata generation section 57.

The metadata generation section 57 generates tables containing the viewpoint location information and the face information regarding the first layer and the viewpoint location information and the face information regarding the second layer supplied from the setting section 56 as the metadata, and supplies the metadata to the storage 58.

The storage 58 stores therein the first layer texture streams and the first layer depth streams supplied from the encoder 52 and the second layer texture streams and the second layer depth streams supplied from the encoder 55. The storage 58 also stores therein the metadata supplied from the metadata generation section 57.

Moreover, the storage 58 stores therein the first layer texture streams, the first layer depth streams, the second layer texture streams, and the second layer depth streams after reconfiguration supplied from the reconfiguration section 59 as well as the metadata.

The reconfiguration section 59 reads and reconfigures the first layer texture streams, the first layer depth streams, the second layer texture streams, and the second layer depth streams of the six faces stored in the storage 58 as needed.

Specifically, the reconfiguration section 59 changes the number of faces and angles of view thereof corresponding to the first layer texture streams using the first layer texture streams before reconfiguration, and changes the number of faces and angles of view thereof corresponding to the first layer depth streams using the first layer depth streams before reconfiguration. For example, the reconfiguration section 59 changes the six faces of the first layer containing the six faces configuring the cube, respectively to 18 faces by adding, to the six faces, 12 faces for which normals passing through centers of the six faces are lines passing through midpoints of 12 sides of the cube and the viewpoint.

Alternatively, the reconfiguration section 59 changes face-to-face intervals (densities) corresponding to the first layer texture streams using the first layer texture streams before reconfiguration, and changes face-to-face intervals corresponding to the first layer depth streams using the first layer depth streams before reconfiguration. For example, the reconfiguration section 59 changes the six faces of the first layer containing the six faces configuring the cube, respectively and for which intervals of normals passing through centers are 90 degrees to 18 faces for which intervals of normals passing through centers are 45 degrees.

If the face-to-face interval of the first layer is narrower, the number of faces increases and a total data capacity increases; however, the home server 13 can generate a display image using the texture images and the depth images corresponding to the faces of the first layer closer to a visual field range of the viewer. As a result, the number of high resolution regions generated using the texture images and the depth images of the first layer or the second layer increases in the display image and an image quality of the display image improves.

It is noted that the reconfiguration section 59 may perform reconfiguration by changing locations of the faces corresponding to the first layer texture streams using the first layer texture streams before reconfiguration and changing locations of the faces corresponding to the first layer depth streams using the first layer depth streams before reconfiguration. In this case, when a principal subject is present, for example, on a boundary between the faces of the first layer, the reconfiguration section 59 performs reconfiguration by rotating the cube corresponding to the six faces of the first layer such that the principal subject is present at a location (for example, at a center) other than the boundary between the faces of the first layer.

Furthermore, the reconfiguration section 59 may perform reconfiguration by changing inclinations of the faces corresponding to the first layer texture streams using the first layer texture streams before reconfiguration and changing inclinations of the faces corresponding to the first layer depth streams using the first layer depth streams before reconfiguration. In this case, the reconfiguration section 59 performs reconfiguration by, for example, rotating the cube corresponding to the six faces of the first layer such that an inclination of the principal subject in the texture images of the first layer is eliminated when the principal subject therein is inclined.

The reconfiguration section 59 sets a viewpoint and a face of the second layer after reconfiguration for each face of the first layer changed as described so far. The reconfiguration section 59 then changes the viewpoints and the faces corresponding to the second layer texture streams to the set viewpoints and the set faces of the second layer after reconfiguration using the second layer texture streams before reconfiguration. Furthermore, the reconfiguration section 59 changes the viewpoints and the faces corresponding to the second layer depth streams to the set viewpoints and the set faces of the second layer after reconfiguration using the second layer depth streams before reconfiguration.

The reconfiguration section 59 supplies the first layer texture streams, the first layer depth streams, the second layer texture streams, and the second layer depth streams after reconfiguration to the storage 58. In addition, the reconfiguration section 59 generates the tables containing the viewpoint location information and the face information regarding the first layer and the viewpoint location information and the face information regarding the second layer after reconfiguration as the metadata, and supplies the metadata to the storage 58.

The transmission section 60 reads the first layer texture streams, the first layer depth streams, the second layer texture streams, and the second layer depth streams of the six faces as well as the metadata from the storage 58, and transmits the first layer texture streams, the first layer depth streams, the second layer texture streams, the second layer depth streams of the six faces, and the metadata to the home server 13 of FIG. 1.

As described so far, the high resolution image processing section 34 of FIG. 3 generates first layer images and second layer images by perspective projection. The home server 13 can, therefore, perform a normal image process on the first layer images and the second layer images. Moreover, the high resolution image processing section 34 can transmit the first layer texture streams, the first layer depth streams, the second layer texture streams, and the second layer depth streams by a normal image encoded stream transmission method.

(Explanation of Distances z and r)

Figure 4B:
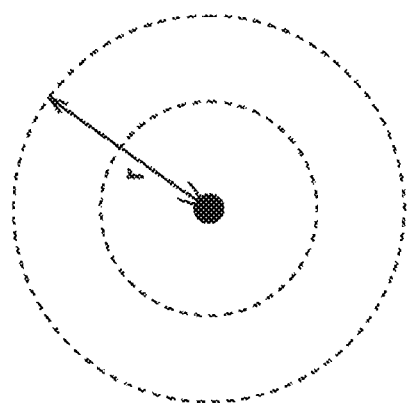
FIGS. 4A and 4B represent explanatory diagrams of distances z and r.
Figure 4A:
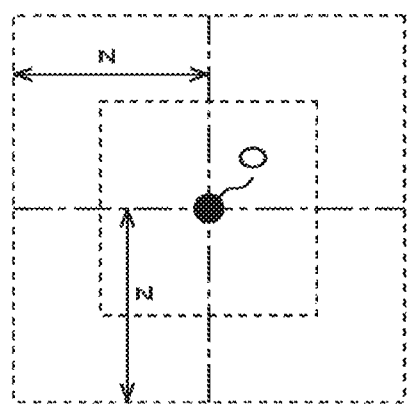

FIGS. 4A and 4B represent explanatory diagrams of the distances z and r.

It is noted that FIGS. 4A and 4B represent views of a predetermined face of the cube corresponding to the first layer from above.

The distance z is a distance from the viewpoint to the depth plane which contains the subject and which is perpendicular to the depth direction in each pixel. Furthermore, the depth direction of each face of the first layer is a direction perpendicular to the face of the first layer. Therefore, each face of the first layer is parallel to the depth plane. Thus, equidistant z faces that are the depth planes identical in distance z on the faces of the first layer are shaped into a cube about a viewpoint O of the first layer as a center. Therefore, a shape of the equidistant z face, when viewed from above the predetermined face of the cube corresponding to the first layer, is a square as indicated by dotted lines of FIG. 4A.

On the other hand, the distance r is a distance of a straight line from a viewpoint to the subject in each pixel. Furthermore, a direction of the straight line from the viewpoint O of each face of the first layer to the subject is a radial direction of a circle about the viewpoint O as a center regardless of the face. Therefore, equidistant r faces that are identical in distance r on the faces of the first layer are shaped into a sphere about the viewpoint O of the first layer as a center. Thus, a shape of the equidistant r face, when viewed from the predetermined face of the cube corresponding to the first layer, is a circle as indicated by dotted lines of FIG. 4B.

(Explanation of Effects of Depth Image)

It is assumed hereinafter that three normal vectors orthogonal to one another among normal vectors of the six faces passing through the viewpoint O of the first layer and centers of the six faces configuring a cube 80 corresponding to the first layer are in positive directions of an X-axis, a Y-axis, and a Z-axis of the 3D model coordinate system and that three normal vectors in opposite directions to the former three normal vectors are in negative directions of the X-axis, the Y-axis, and the Z-axis of the 3D model coordinate system.

Figure 5:
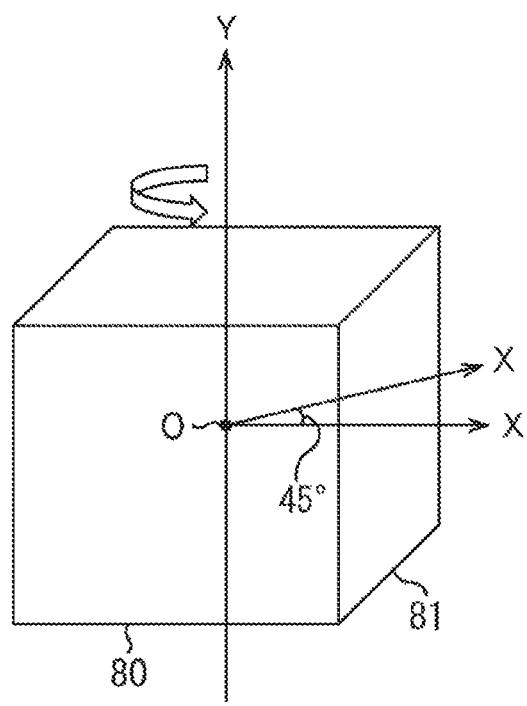
FIG. 5 is a diagram depicting a change in an X-axis of a 3D model coordinate system.
Figure 6:
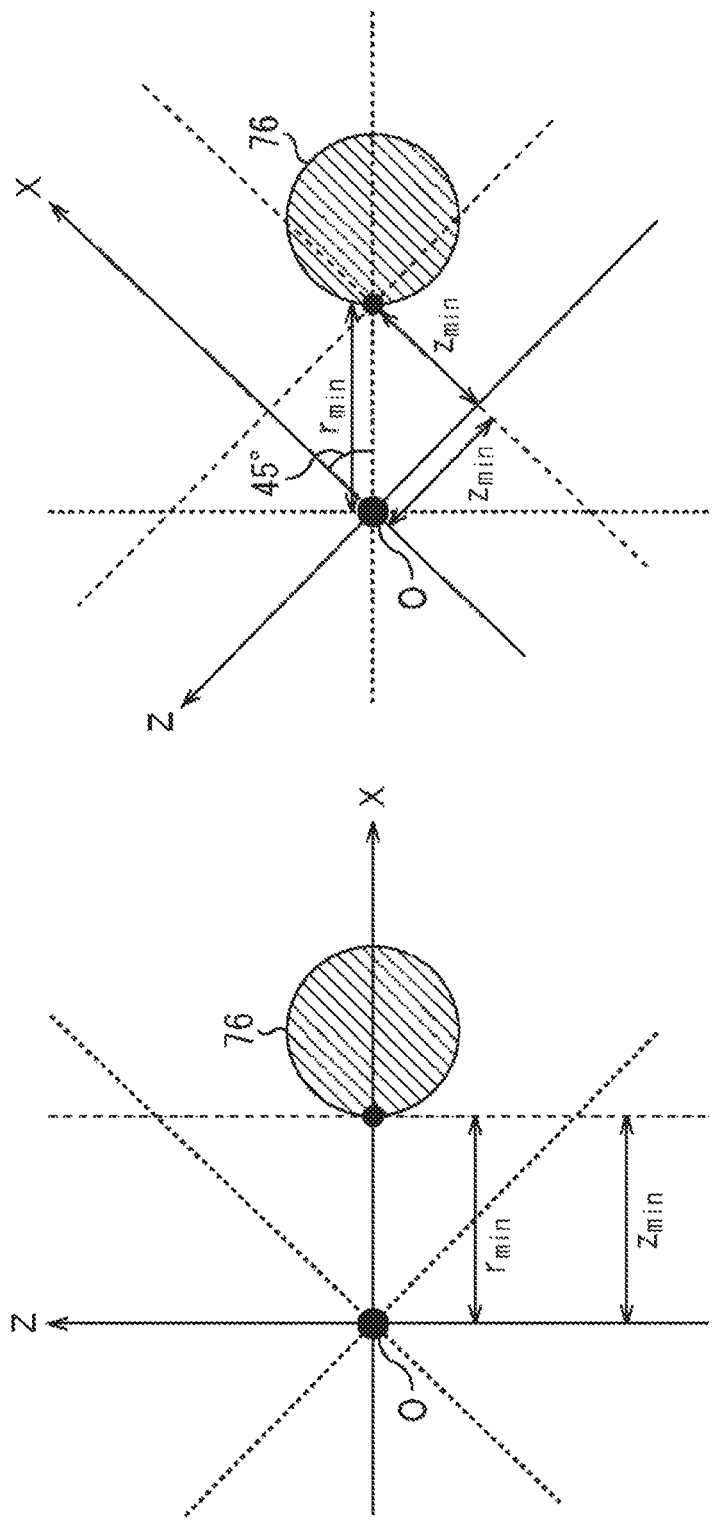
FIGS. 6A and 6B represent explanatory diagrams of changes in minimum values zmin and rmin accompanying the change in the X-axis of the 3D model coordinate system.

FIG. 5 is a diagram depicting a change in an X-axis of the 3D model coordinate system, and FIGS. 6A and 6B represent explanatory diagrams of changes in minimum values zmin and rmin accompanying the change in the X-axis of the 3D model coordinate system.

In an example of FIGS. 5, 6A, and 6B, it is assumed that the angle of view of each face of the first layer is 90 degrees.

As depicted in FIG. 5, in a case in which the cube 80 corresponding to the first layer is rotated 45 degrees on an XZ plane about the Y-axis as an axis and locations of the faces of the first layer are changed, the X-axis is rotated 45 degrees on the XZ plane. The depth direction of a face 81 of the first layer with the normal vector in the positive direction of the X-axis is rotated 45 degrees on the XZ plane.

Therefore, as depicted in FIGS. 6A and 6B, when a sphere 76 about a location having a positive value as an X coordinate and 0 as a Z coordinate is present within the angle of view of the face 81 as the subject, the minimum value zmin on the face 81 before rotation is a minimum value of the distance between the viewpoint O and the positive direction of the X-axis of the sphere 76 of FIG. 6A as depicted in FIG. 6A. However, the minimum value zmin on the face 81 after rotation is a minimum value of the distance between the viewpoint O and the positive direction of the X-axis of FIG. 6B of the sphere 76 within the angle of view (upper half of the sphere 76 of FIG. 6B) as depicted in FIG. 6B.

Furthermore, in a case of the example of FIGS. 6A and 6B, a maximum value zmax on the face 81 before rotation is infinite and the maximum value zmax on the face 81 after rotation is, therefore, infinite; however, in a case in which the maximum value zmax is not infinite, the maximum value zmax changes on the face 81 before and after rotation for the similar reason to that of the minimum value zmin. Likewise, on the other faces of the first layer, the minimum value zmin and the maximum value zmax change.

Moreover, although explanation is omitted, even in a case in which the angles of view of the faces of the first layer, the number of faces thereof, or the intervals are changed, the minimum value $z_{min}$ and the maximum value $z_{max}$ change on all the faces of the first layer.

Therefore, in a case of using the reciprocal 1/z of the distance z as a y value (luminance value) of each pixel of the depth image of the first layer, it is necessary to re-calculate the minimum value $z_{min}$ and the maximum value $z_{max}$ on each face and to re-determine the minimum value $z_{min}$ and the maximum value $z_{max}$ on all faces at the time of reconfiguration by the reconfiguration section 59. As a result, it is necessary to perform 8-bit quantization on the depth image again.

On the other hand, the direction of the straight line from the viewpoint O to the subject remain unchanged regardless of the location of the face of the first layer. Therefore, even in a case in which the cube 80 is rotated 45 degrees on the XZ plane about the Y-axis as the axis as depicted in FIG. 5, the minimum value $r_{min}$ and the maximum value $r_{max}$ remain unchanged.

In other words, as depicted in FIG. 6B, even if the X-axis of FIG. 6B is rotated 45 degrees on the XZ plane, the direction of the straight line from the viewpoint O to the subject is a direction extending radially from the viewpoint O similarly to a case before rotation. Therefore, the minimum value rmin on all faces of the first layer is the minimum value of the distance of the straight line from the viewpoint O to the sphere 76 regardless of the rotation of the X-axis. The maximum value rmax on all faces of the first layer remains unchanged before and after rotation for the similar reason to that of the minimum value rmin.

Moreover, although explanation is omitted, even in the case in which the angles of view of the faces of the first layer, the number of faces thereof, or the intervals thereof are changed, the direction of the straight line from the viewpoint O to the subject does not change and the minimum value $r_{min}$ and the maximum value $r_{max}$, therefore, remain unchanged.

Therefore, using not the reciprocal 1/z but the quantized value of the reciprocal 1/r as the y value of each pixel of the depth image of the first layer makes it possible to dispense with a process for performing the 8-bit quantization on the depth image again at the time of reconfiguration by the reconfiguration section 59.

While it has been described above that the low resolution texture stream and the low resolution depth stream are not reconfigured, the low resolution texture stream and the low resolution depth stream may be reconfigured. In this case, similarly to the above, the y value of each pixel of the low resolution depth image is the quantized value of the reciprocal 1/r; thus, it is possible to dispense with the process for performing the 8-bit quantization on the low resolution depth image again at the time of reconfiguration similarly to the time of reconfiguration of the depth image of the first layer.

Moreover, the low resolution texture stream and the low resolution depth stream may be reconfigured by changing a mapping scheme of the low resolution texture stream and the low resolution depth stream. In this case, similarly to the above, using the quantized value of the reciprocal 1/r as the y value of each pixel of the low resolution depth image makes it possible to dispense with the process for performing the 8-bit quantization on the low resolution depth image again at the time of reconfiguration.

(Example of Locations of Pixels of Depth Images of Six Faces of First Layer on Sphere)

Figure 7:
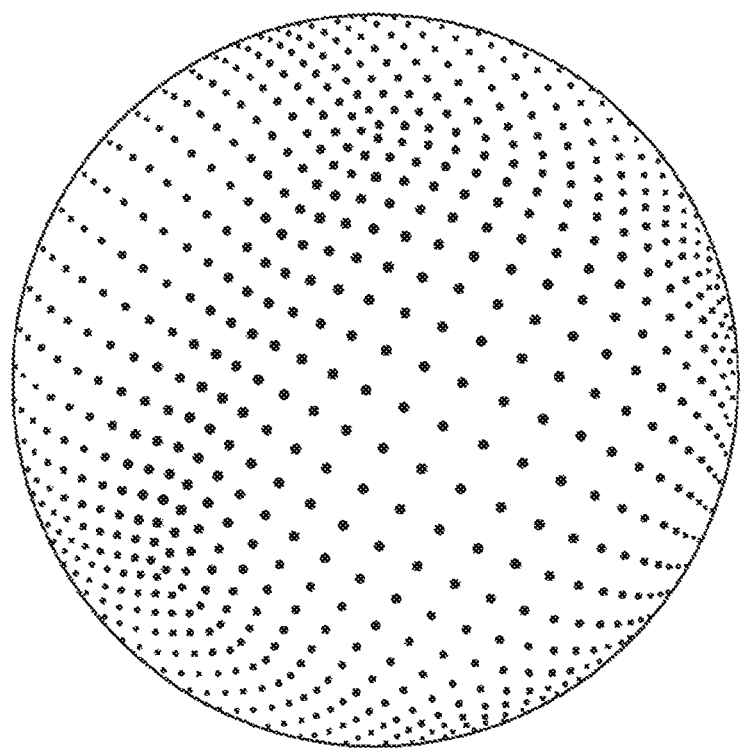
FIG. 7 is a diagram depicting an example of locations of pixels on a sphere at a time of mapping depth images of a first layer corresponding to six faces onto the sphere.

FIG. 7 is a diagram depicting an example of locations of pixels on a sphere at a time of mapping the depth images of the six faces of the first layer onto the sphere.

It is noted that the locations of the pixels on the sphere at the time of mapping the depth images of the six faces of the first layer onto the sphere are represented by dots in FIG. 7.

The pixels of each depth image of each face of the first layer on the depth image are located at equal intervals. However, as depicted in FIG. 7, the pixels on the sphere at the time of mapping the depth images of the six faces of the first layer onto the sphere are not located at equal intervals. In other words, densities of the locations of the pixels on the sphere at the time of mapping the depth images of the six faces of the first layer onto the sphere are not constant.

(Example of Faces of First Layer)

Figure 8B:
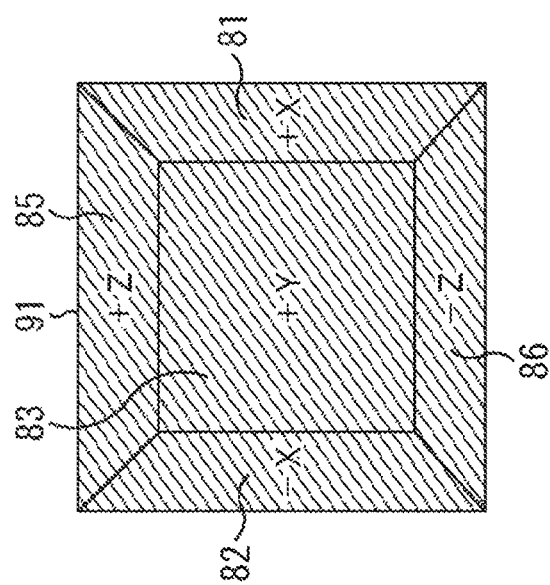
FIGS. 8A and 8B represent diagrams depicting an example of faces of the first layer.
Figure 8A:
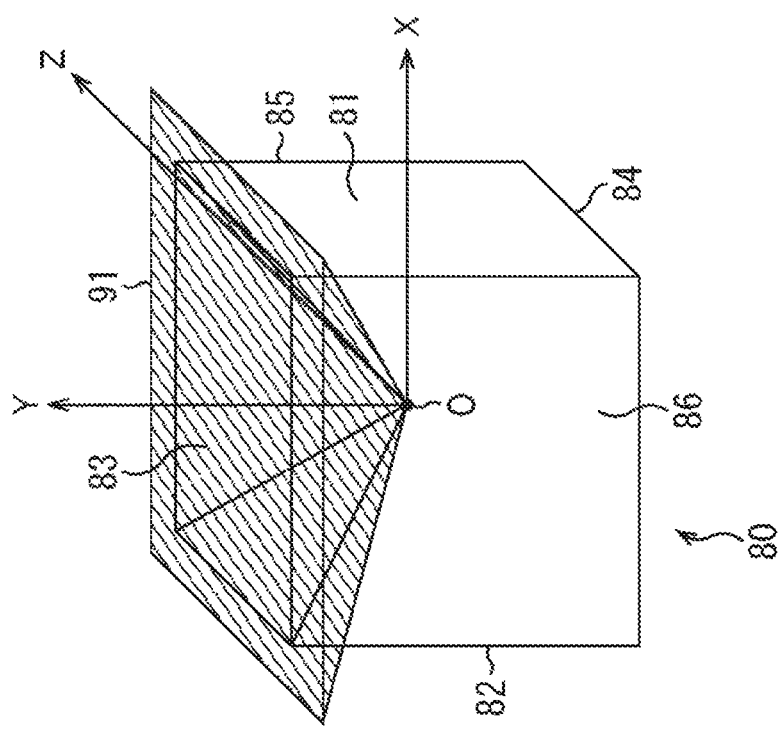

FIGS. 8A and 8B represent diagrams depicting an example of the faces of the first layer.

It is noted that when distances between the viewpoint O and the six faces are each assumed as R, a face at X=R will be also referred to as "+X face" and a face at X=−R will be also referred to as "−X face," as appropriate. Likewise, a face at Y=R, a face at Y=−r, a face at Z=R, and a face at Z=−R will be also referred to as "+Y face," "−Y face," "+Z face," and "−Z face," as appropriate.

Furthermore, FIG. 8A is a perspective view of the cube 80 corresponding to the first layer, and FIG. 8B depicts the cube 80 corresponding to the first layer viewed in the negative direction of the Y-axis.

As depicted in FIG. 8A, one face 91 of the first layer is a face that contains a +Y face 83 among six faces 81 to 86 that configure the cube 80 about the viewpoint O as the center. More specifically, the face 91 is the face the location of which is set identical to that of the +Y face 83 and an angle of view of which in a lateral direction and a longitudinal direction is greater than 90 degrees that is the angle of view of the +Y face 83 and smaller than 180 degrees.

Therefore, as depicted in FIG. 8B, the texture image of the face 91 contains not only the texture image mapped onto the +Y face 83 but also part of the texture images mapped onto the +X face 81, the −X face 82, the +Z face 85, and the −Z face 86 adjacent to the +Y face 83. This similarly applies to the depth image of the face 91 as with the texture image of the face 91.

While FIGS. 8A and 8B depict only one face 91 of the first layer, the five other faces of the first layer are the faces the locations of which are set identical to those of the +X face 81, the −X face 82, the −Y face 84, the +Z face 85, and the −Z face 86 and angles of view of which in the lateral direction and the longitudinal direction are greater than 90 degrees and smaller than 180 degrees similarly to the face 91.

As described so far, each of the six faces of the first layer contains the six faces 81 to 86 configuring the cube, respectively; thus, the omnidirectional image is always mapped onto any of the six faces of the first layer. Therefore, using the three adjacent faces at most among the six faces of the first layer enables the home server 13 to generate a display image in an arbitrary direction in the 360-degree visual field in the horizontal direction and the 180-degree visual field in the perpendicular direction with the viewpoint O assumed as the viewing location.

(Example of Configuration of Table of Viewpoint Location Information and Face Information Regarding First Layer)

FIG. 9 is a diagram depicting an example of a configuration of a table of viewpoint location information and face information regarding the first layer among the metadata generated by the metadata generation section 57 of FIG. 3.

In the example of FIG. 9, information indicating the three-dimensional location of each face in the 3D model coordinate system is an azimuth angle, an elevation angle, a rotational angle, and a visual line vector among the face information, and information indicating a size is a lateral angle of view and a longitudinal angle of view.

The azimuth angle is an angle formed between a line connecting the viewpoint to a center of each face and the Z-axis in an XZ plane direction, and the elevation angle is an angle formed between a line connecting the viewpoint to the center of each face and the XZ plane. It is assumed herein that a clockwise direction of the azimuth angle is a positive direction and a counterclockwise direction of the elevation angle is a positive direction. A line obtained by rotating the line extending from the viewpoint in the Z-axis direction horizontally by the azimuth angle on the XZ plane and then rotating the line vertically by the elevation angle in the Y-axis direction is a normal passing through the center of each face.

The rotational angle is an angle of each face in a rotation direction about the line connecting the viewpoint to the center of the face assumed as an axis. It is assumed herein that a clockwise direction of the rotational angle is a positive direction. The visual line vector is a vector at a length of 1 from the viewpoint as a starting point to the center of each face, that is, a normal vector passing through the center of each face. The lateral angle of view is an angle formed between lines connecting two end portions of each face in the lateral direction to the viewpoint, and the longitudinal angle of view is an angle formed between lines connecting two end portions of each face in the longitudinal direction to the viewpoint.

As depicted in FIG. 9, common parts to file names of files storing the first layer texture stream and the first layer depth stream of each face in the storage 58 of FIG. 3 are registered in the table of the viewpoint location information and the face information regarding the first layer.

Specifically, in the example of FIG. 9, the file names of the first layer texture streams of the faces containing the +Z face 85, the −Z face 86, +X face 81, the −X face 82, +Y face 83, and the −Y face 84 are posZ_texture, negZ_texture, posX_texture, negX_texture, posY_texture, and negY_texture, respectively. Furthermore, the file names of the first layer depth streams of the faces containing the +Z face 85, the −Z face 86, +X face 81, the −X face 82, +Y face 83, and the −Y face 84 are posZ_depth, negZ_depth, posX_depth, negX_depth, posY_depth, and negY_depth, respectively. Therefore, posZ, negZ, posX, negX, posY, and negY are registered in the table of FIG. 9 as the common parts to the file names of the faces of the first layer.

Moreover, the face information, the viewpoint location information, and the number of lateral pixels and the number of longitudinal pixels of the texture image and the depth image regarding each face corresponding to the common parts to the file names are registered in the table of the viewpoint location information and the face information regarding the first layer to correspond to the common parts to the file names.

Specifically, angles between the lines connecting the centers of the faces of the first layer containing +Z face 85, −Z face 86, +X face 81, −X face 82, +Y face 83, and −Y face 84 to the viewpoint O and the Z-axis in the XZ plane direction are 0, −180, 90, −90, 0, and 0 degrees, respectively, and the angles between the lines and the XZ plane are 0, 0, 0, 0, 90, and −90 degrees, respectively. Therefore, the azimuth angles "0 degrees," "−180 degrees," "90 degrees," "−90 degrees," "0 degrees," and "0 degrees" are registered to correspond to the common parts to the file names "posZ," "negZ," "posX," "negX," "posY," and "negY," respectively, and the elevation angles "0 degrees," "0 degrees," "0 degrees," "0 degrees," "90 degrees," and "−90 degrees" are registered to correspond thereto, respectively.

Moreover, in the example of FIG. 9, the rotational angles of all faces of the first layer are 0 degrees. Therefore, the rotational angle "0 degrees" is registered to correspond to the common parts to the file names "posZ," "negZ," "posX," "negX," "posY," and "negY." Furthermore, coordinates of the origin (0,0,0) are registered as the viewpoint location information to correspond to the common parts to the file names "posZ," "negZ," "posX," "negX," "posY," and "negY."

Moreover, visual line vectors of the faces of the first layer containing the +Z face 85, the −Z face 86, the +X face 81, the −X face 82, the +Y face 83, and the −Y face 84 from the viewpoint O are (0,0,1), (0,0,−1), (1,0,0), (−1,0,0), (0,1,0), and (0,−1,0), respectively. Therefore, the visual line vectors (0,0,1), (0,0,−1), (1,0,0), (−1,0,0), (0,1,0), and (0,−1,0) are registered to correspond to the common parts to the file names "posZ," "negZ," "posX," "negX," "posY," and "negY," respectively.

Furthermore, in the example of FIG. 9, the lateral angles of view and the longitudinal angles of view of all faces of the first layer are 100 degrees greater than 90 degrees, and the number of lateral pixels that is the number of pixels of each of the texture image and the depth image in the lateral direction and the number of longitudinal pixels that is the number of pixels of each of the texture image and the depth image in the longitudinal direction are 1024. Therefore, the lateral angle of view "100 degrees," the longitudinal angle of view "100 degrees," the number of lateral pixels "1024," and the number of longitudinal pixels "1024" are registered to correspond to the common parts to the file names "posZ," "negZ," "posX," "negX," "posY," and "negY."

(Explanation of Hierarchization)

Figure 10:
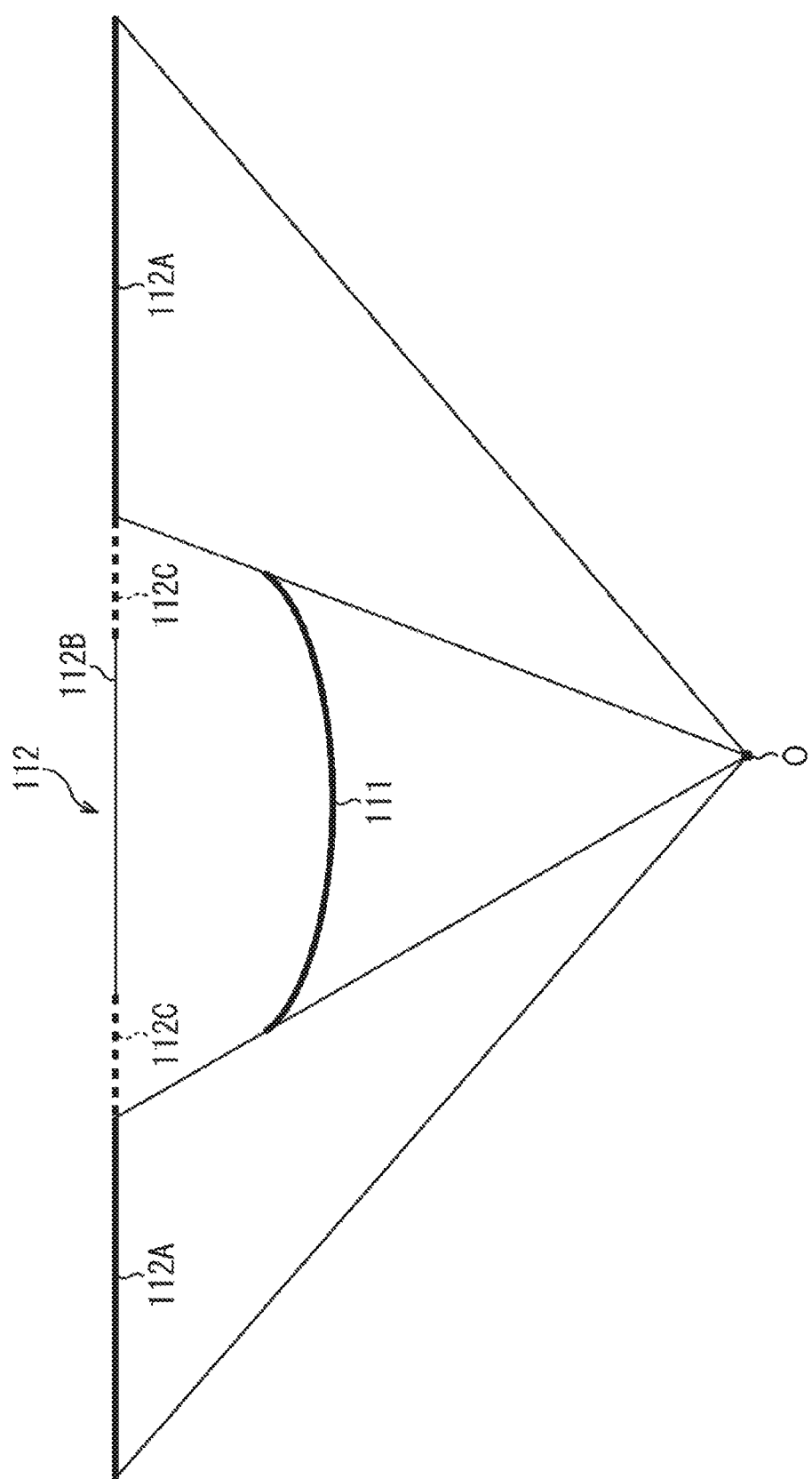
FIG. 10 is a diagram depicting locations of subjects in a depth direction corresponding to a predetermined face of the first layer.
Figure 11:
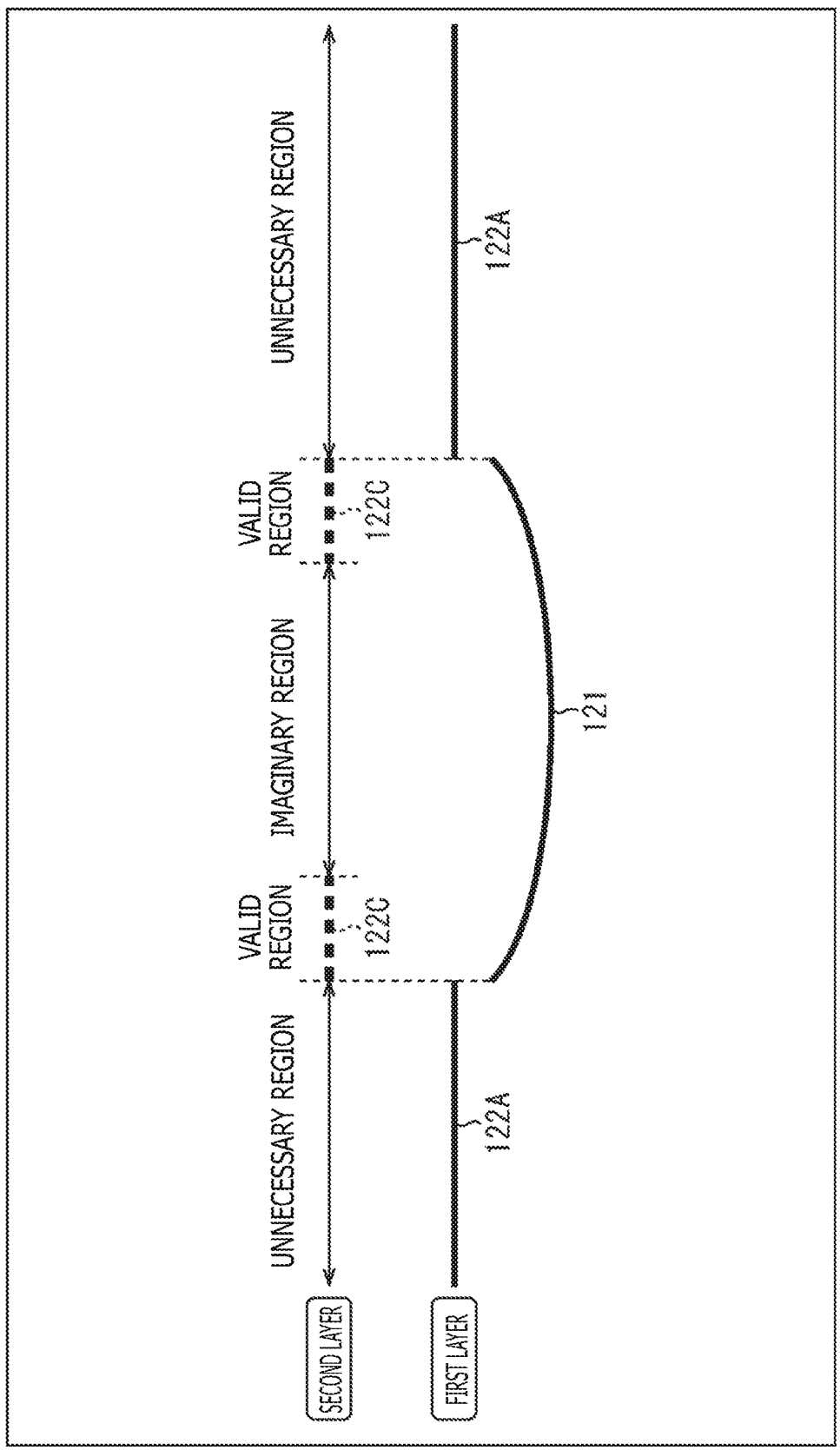
FIG. 11 is a diagram depicting an example of configurations of texture images of the first layer and a second layer.

FIG. 10 is a diagram depicting locations of subjects in the depth direction corresponding to a predetermined face of the first layer, and FIG. 11 is a diagram depicting an example of configurations of texture images of the first layer and the second layer of the subjects of FIG. 10 in a case in which the viewpoint of the first layer is identical to that of the second layer.

It is noted that FIG. 10 depicts the viewpoint O of the first layer and the subjects viewed from above and the vertical direction of FIG. 10 is the depth direction of the predetermined face of the first layer containing this subjects within the angle of view. Furthermore, in FIG. 11, the horizontal direction and the vertical direction represent the lateral direction and the depth direction of the texture images, respectively. An upward direction of FIGS. 10 and 11 indicates a front side and a downward direction thereof indicates a back side.

In the example of FIGS. 10 and 11, the subjects contained within the angle of view of the predetermined face of the first layer is a foreground 111 at a center and a background 112 in back of the foreground. In this case, as depicted in FIG. 11, the texture image of the predetermined face of the first layer is configured with a captured image 121 of the foreground 111 and captured images 122A of regions 112A that are not hidden by the foreground 111 out of the background 112.

On the other hand, the texture image of a face of the second layer corresponding to the predetermined face of the first layer contains captured image 122C of occlusion regions 112C captured by the multi-camera 11 in an occlusion region 112B that is occluded by the foreground 111 out of the background 112 as valid regions as depicted in FIG. 11.

Anything may be disposed in regions other than the valid regions in the texture image of the face of the second layer; however, disposing a special value such as an invalid value causes a change in a value of the special value by compression and encoding and it is difficult for the home server 13 to reconstruct the special value by decoding.

Therefore, the regions other than the valid regions in the texture image of the face of the second layer are split into unnecessary regions (background regions) corresponding to the regions 112A and an imaginary region corresponding to a region other than the captured occlusion regions 112C out of the occlusion region 112B.

In each of the unnecessary regions corresponding to the regions 112A where the occlusion region is not present, the captured image 122A is disposed similarly to the first layer or a flat image without sharp edge portions is disposed. In the case of disposing the captured image 122A in the unnecessary region, the texture image of the first layer is identical to that of the second layer in the unnecessary region; thus, in a case of compressing and encoding the texture image of the first layer by an MVC scheme or a 3D-HEVC scheme while referring to the texture image of the second layer, it is possible to improve a compression ratio. Furthermore, in the case of disposing the flat image in the unnecessary region, the compression ratio of the second layer image can be improved, compared with the case of disposing the image with the sharp edge portions. It is noted that the captured image 122A may be disposed in one portion of the unnecessary region and the flat image may be disposed on the other portion of the unnecessary region.

Moreover, the imaginary region is a region in which the occlusion region is present but which corresponds to the region that is not captured by the multi-camera 11 and that is other than the captured occlusion regions 112C out of the occlusion region 112B. Therefore, either an inpainting image estimated (inpainted) using the captured images 122C of the photographed occlusion region 112C is disposed in the imaginary region or the captured image 121 is disposed therein similarly to the first layer.

It is noted that a past captured image may be used in inpainting. The content server 12 performs inpainting, whereby the home server 13 can handle the imaginary region equivalently with the valid regions. Moreover, the content server 12 performs inpainting before reproducing, thereby making it possible to perform inpainting that requires longer time and that is high in processing load.

Furthermore, in the case of disposing the captured image 121 in the imaginary region, the imaginary region can be easily generated even when the imaginary region is sporadic or inpainting is difficult to perform. The inpainting image may be disposed in one portion of the imaginary region and the captured image 121 may be disposed in the other portion thereof.

Configurations of the depth images of the first layer and the second layer are similar to those of the texture images of the first layer and the second layer except that the captured images are replaced by the depth images; thus, explanation will be omitted. Furthermore, the case of disposing the captured image similar to that in the first layer or the depth image in the unnecessary regions and the imaginary region of the second layer will be described below.

(Explanation of Viewpoints of First Layer and Second Layer)

Figure 12B:
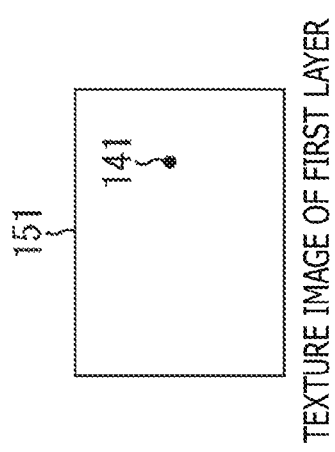
FIGS. 12A, 12B, and 12C represent explanatory diagrams of an example of the texture images of the first layer and the second layer.
Figure 12C:
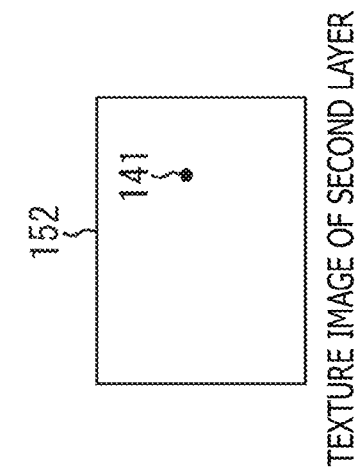
Figure 12A:
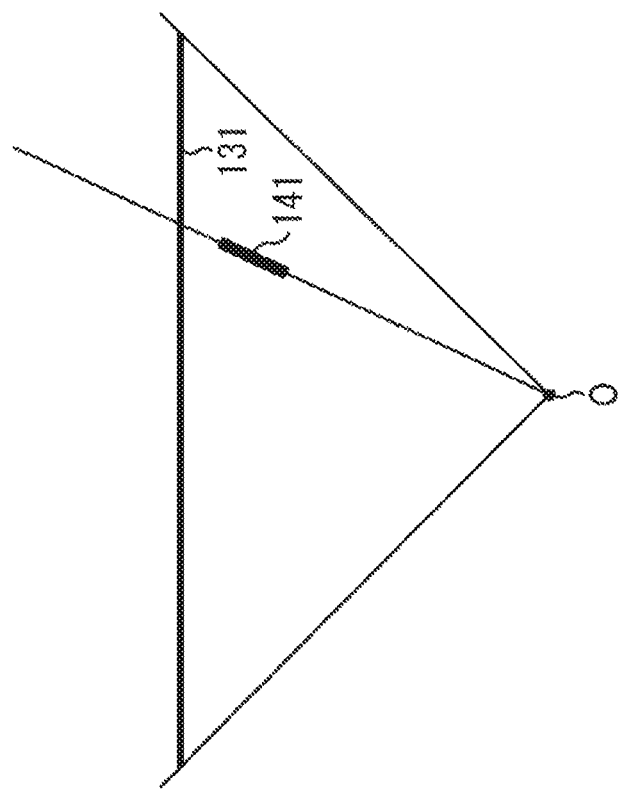

FIGS. 12A, 12B, and 12C represent explanatory diagrams of the texture images of the first layer and the second layer corresponding the predetermined face of the first layer in a case in which the viewpoint of the first layer is identical to that of the second layer. FIGS. 13A, 13B, and 13C represent explanatory diagrams of the texture images of the first layer and the second layer corresponding the predetermined face of the first layer in a case in which the viewpoint of the first layer is different from that of the second layer.

FIG. 12A and FIG. 13A are diagrams of the viewpoint O of the first layer and a subject viewed from above, and the vertical direction of FIG. 12A and FIG. 13A is the depth direction of the predetermined face of the first layer containing this subject within the angle of view.

As depicted in FIG. 12A, in a case in which the viewpoint of the second layer is the viewpoint O of the first layer, a rod-like subject 141 extending to the viewpoint O within the angle of view of a predetermined face 131 of the first layer becomes a dot in a texture image 151 of the first layer and a texture image 152 of the second layer.

In other words, since the first and second layers are identical in a direction from the viewpoint O to the face 131, the subject 141 is degenerated to one dot in both the texture image 151 of the first layer and the texture image 152 of the second layer. As a result, a length of the subject 141 in the direction of extending to the viewpoint O cannot be expressed in the texture images 151 and 152.

On the other hand, in a case in which the viewpoint of the second layer is a viewpoint O' different from the viewpoint O of the first layer, the subject 141 contained within the angles of view of the face 131 of the first layer and a face 161 of the second layer becomes a straight line in a texture image 172 of the second layer.

In other words, a direction from the viewpoint O of the first layer to the face 131 thereof differs from a direction from the viewpoint O' of the second layer to the face 161 thereof. Therefore, even if the subject 141 is degenerated to one dot in the texture image 151 of the first layer, the subject 141 is not degenerated to one dot in a texture image 172 of the second layer. It is, therefore, possible to express the length of the subject 141 in the direction of extending to the viewpoint O in the texture image 172.

In the light of the aforementioned, the content server 12 sets the viewpoints of the first and second layers different from each other.

(First Example of Viewpoints of Second Layer)

Figure 14B:
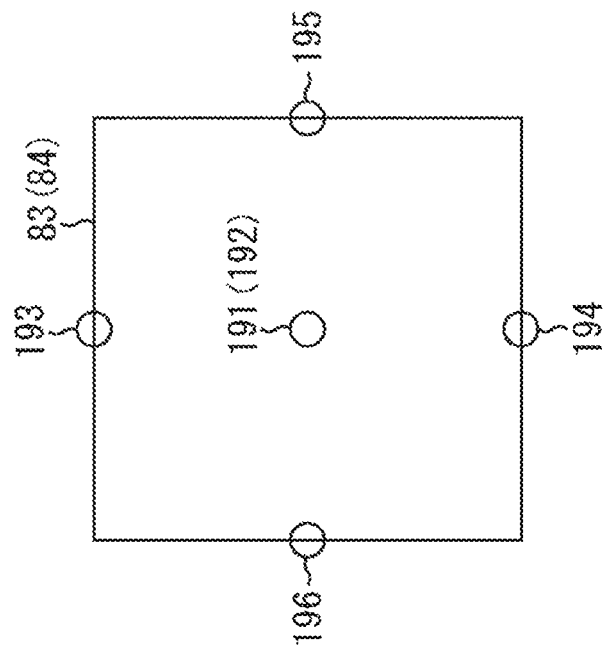
FIGS. 14A and 14B represent diagrams depicting a first example of viewpoints of the second layer.
Figure 14A:
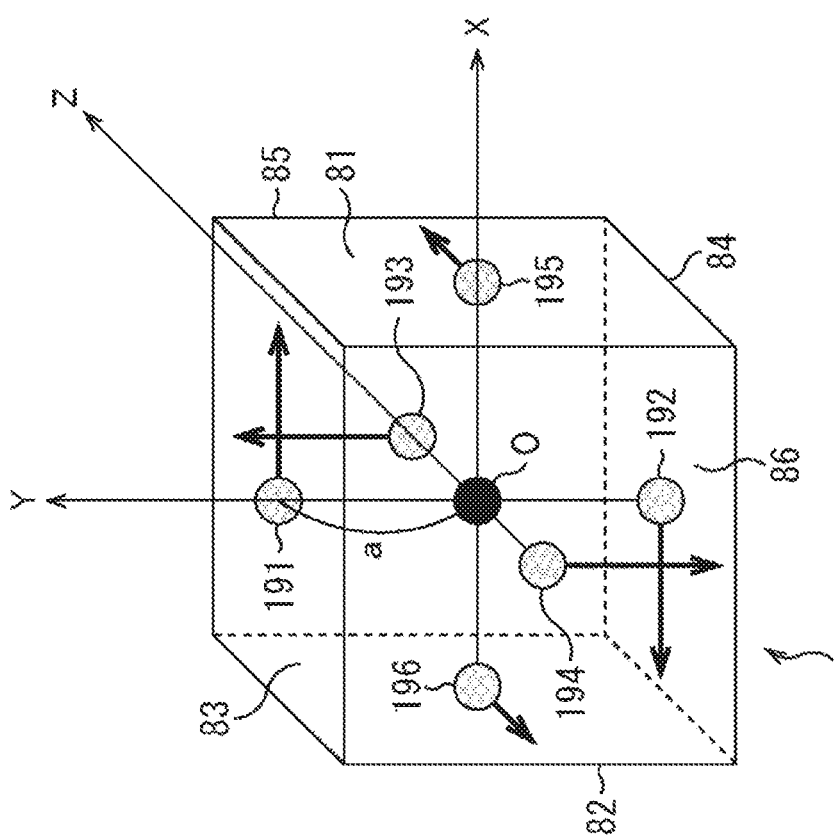

FIGS. 14A and 14B represent diagrams depicting a first example of the viewpoints of the second layer.

FIG. 14A is a perspective view of the cube 80 of the first layer and FIG. 14B depicts the cube 80 viewed in the negative direction of the Y-axis. This similarly applies to FIGS. 16A and 16B.

In the example of FIGS. 14A and 14B, a viewpoint 191 of the face of the second layer corresponding to the face, which contains the +X face 81, of the first layer is set at a location moved from the viewpoint O of the first layer by a length a that is half a length of each side of the cube 80 in the positive direction of the Y-axis. In FIGS. 14A and 14B, as indicated by an arrow added to the viewpoint 191, a visual line vector of the face of the second layer corresponding to the face, which contains the +X face 81, of the first layer is (1,0,0) similarly to that of the face of the first layer.

A viewpoint 192 of the face of the second layer corresponding to the face, which contains the −X face 82, of the first layer is set at a location moved from the viewpoint O by the length a in the negative direction of the Y-axis. In FIGS. 14A and 14B, as indicated by an arrow added to the viewpoint 192, a visual line vector of the face of the second layer corresponding to the face, which contains the −X face 82, of the first layer is (−1,0,0) similarly to that of the face of the first layer.

Furthermore, a viewpoint 193 of the face of the second layer corresponding to the face 91, which contains the +Y face 83, of the first layer and a viewpoint 194 of the face of the second layer corresponding to the face, which contains the −Y face 84, of the first layer are set at locations moved from the viewpoint O by the length a in the positive and negative directions of the Z-axis, respectively. In FIGS. 14A and 14B, as indicated by arrows added to the viewpoints 193 and 194, a visual line vector of the face of the second layer corresponding to the face 91 of the first layer is (0,1,0) and a visual line vector of the face of the second layer corresponding to the face, which contains the −Y face 84, of the first layer is (0,−1,0) similarly to those of the faces of the first layer.

Moreover, a viewpoint 195 of the face of the second layer corresponding to the face, which contains the +Z face 85, of the first layer and a viewpoint 196 of the face of the second layer corresponding to the face, which contains the −Z face 86, of the first layer are set at locations moved from the viewpoint O of the first layer by the length a in the positive and negative directions of the X-axis, respectively. In FIGS. 14A and 14B, as indicated by arrows added to the viewpoints 195 and 196, a visual line vector of the face of the second layer corresponding to the face, which contains the +Z face 85, of the first layer is (0,0,1) and a visual line vector of the face of the second layer corresponding to the face, which contains the −Z face 86, of the first layer is (0,0,−1) similarly to those of the faces of the first layer.

As described so far, in the example of FIGS. 14A and 14B, the viewpoints 191 to 196 of the faces of the second layer are each set at the location moved from the viewpoint O of the first layer by the length a in one direction perpendicular to the visual line vector. Furthermore, the visual line vector of each face of the second layer is identical to the visual line vector of the corresponding face of the first layer. Moreover, directions of deviating the viewpoints 191 to 196 of the faces of the second layer from the viewpoint O vary depending on the faces.

It is noted that the distance between the viewpoints 191 to 196 of the faces of the second layer and the viewpoint O in the X-axis, Y-axis, or Z-axis direction is not limited to the length a that is half of the length of each side of the cube 80.

(First Example of Configuration of Table of Viewpoint Location Information and Face Information Regarding Second Layer)

FIG. 15 is a diagram depicting an example of a configuration of a table of viewpoint location information and face information regarding the second layer among the metadata generated by the metadata generation section 57 of FIG. 3 in the case of setting the viewpoints 191 to 196 of FIGS. 14A and 14B as the viewpoints of the faces of the second layer.

The table of FIG. 15 is identical to the table of FIG. 9 except for the common parts to the file names and the viewpoint location information.

Specifically, in the example of FIG. 15, the file names of the texture images of the faces of the second layer corresponding to the faces of the first layer containing the +Z face 85, the −Z face 86, the +X face 81, the −X face 82, the +Y face 83, and the −Y face 84 are posZ2_texture, negZ2_texture, posX2_texture, negX2_texture, posY2_texture, and negY2_texture, respectively. Furthermore, the file names of the depth images of the faces of the second layer corresponding to the faces of the first layer containing the +Z face 85, the −Z face 86, the +X face 81, the −X face 82, the +Y face 83, and the −Y face 84 are posZ2_depth, negZ2_depth, posX2_depth, negX2_depth, posY2_depth, and negY2_depth, respectively. Therefore, posZ2, negZ2, posX2, negX2, posY2, and negY2 are registered in the table of FIG. 15 as the common parts to the file names of the faces of the second layer.

Furthermore, coordinates (a,0,0), (−a,0,0), (0,a,0), (0,−a,0), (0,0,a), and (0,0,−a) of the viewpoints 191 to 196 with the viewpoint O assumed as the origin are registered to correspond to the common parts to the file names "posZ2," "negZ2," "posX2," "negX2," "posY2," and "negY2," respectively.

(Second Example of Viewpoints of Second Layer)

Figure 16B:
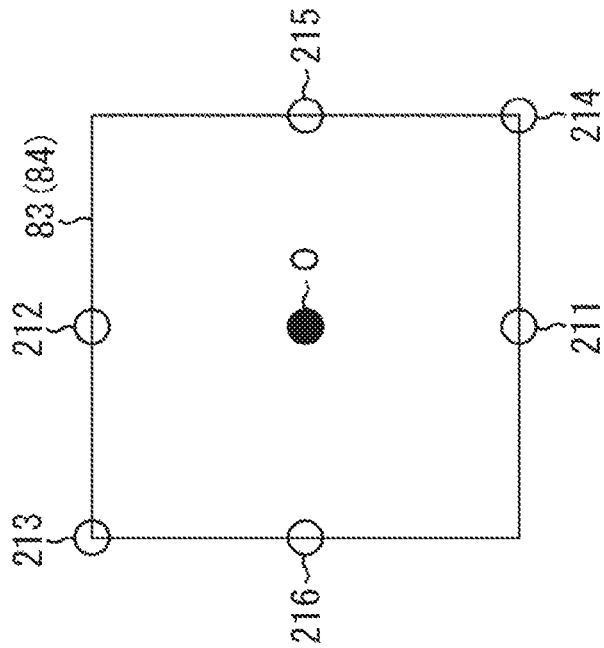
FIGS. 16A and 16B represent diagrams depicting a second example of the viewpoints of the second layer.
Figure 16A:
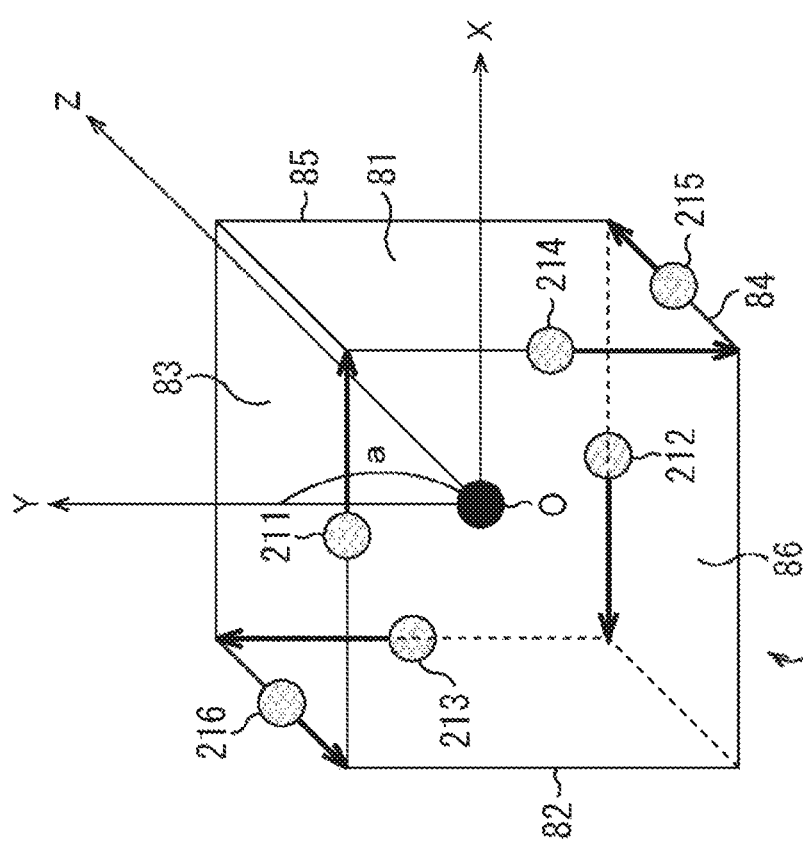

FIGS. 16A and 16B represent diagrams depicting a second example of the viewpoints of the second layer.

In the example of FIGS. 16A and 16B, a viewpoint 211 of the face of the second layer corresponding to the face, which contains the +X face 81, of the first layer is set at a location moved from the viewpoint O of the first layer by the length a in the positive direction of the Y-axis and the negative direction of the Z-axis, and a viewpoint 212 of the face of the second layer corresponding to the face, which contains the −X face 82, of the first layer is set at a location moved from the viewpoint O of the first layer by the length a in the negative directions of the Y-axis and the positive direction of the Z-axis. In FIGS. 16A and 16B, as indicated by arrows added to the viewpoints 211 and 212, a visual line vector of the face of the second layer corresponding to the face, which contains the +X face 81, of the first layer is (1,0,0) and a visual line vector of the face of the second layer corresponding to the face, which contains the −X face 82, of the first layer is (−1,0,0) similarly to those of the faces of the first layer.

Moreover, a viewpoint 213 of the face of the second layer corresponding to the face 91, which contains the +Y face 83, of the first layer is set at a location moved from the viewpoint O by the length a in the negative direction of the X-axis and the positive direction of the Z-axis, and a viewpoint 214 of the face of the second layer corresponding to the face, which contains the −Y face 84, of the first layer is set at a location moved from the viewpoint O by the length a in the positive direction of the X-axis and the negative direction of the Z-axis. In FIGS. 16A and 16B, as indicated by arrows added to the viewpoints 213 and 214, a visual line vector of the face of the second layer corresponding to the face 91 of the first layer is (0,1,0) and a visual line vector of the face of the second layer corresponding to the face, which contains the −Y face 84, of the first layer is (0,−1,0) similarly to those of the faces of the first layer.

Furthermore, a viewpoint 215 of the face of the second layer corresponding to the face, which contains the +Z face 85, of the first layer is set at a location moved from the viewpoint O by the length a in the positive direction of the X-axis and the negative direction of the Y-axis, and a viewpoint 216 of the face of the second layer corresponding to the face, which contains the −Z face 86, of the first layer is set at a location moved from the viewpoint O by the length a in the negative direction of the X-axis and the positive direction of the Y-axis. In FIGS. 16A and 16B, as indicated by arrows added to the viewpoints 215 and 216, a visual line vector of the face of the second layer corresponding to the face, which contains the +Z face 85, of the first layer is (0,0,1) and a visual line vector of the face of the second layer corresponding to the face, which contains the −Z face 86, of the first layer is (0,0,−1) similarly to those of the faces of the first layer.

As described so far, in the example of FIGS. 16A and 16B, the viewpoints 211 to 216 of the faces of the second layer are each set at the location moved from the viewpoint O of the first layer by the length a in two directions perpendicular to the visual line vector. Furthermore, the visual line vector of each face of the second layer is identical to the visual line vector of the corresponding face of the first layer. Moreover, directions of deviating the viewpoints 211 to 216 of the faces of the second layer from the viewpoint O vary depending on the faces. Further, the viewpoints 211 to 216 are symmetrical about the viewpoint O.

It is noted that the distance between the viewpoints 191 to 196 of the faces of the second layer and the viewpoint O in the two directions out of the X-axis, Y-axis, and Z-axis direction is not limited to the length a that is half of the length of each side of the cube 80.

(Second Example of Configuration of Table of Viewpoint Location Information and Face Information Regarding Second Layer)

FIG. 17 is a diagram depicting an example of a configuration of a table of viewpoint location information and face information regarding the second layer among the metadata generated by the metadata generation section 57 of FIG. 3 in the case of setting the viewpoints 211 to 216 of FIGS. 16A and 16B as the viewpoints of the faces of the second layer.

The table of FIG. 17 is identical to the table of FIG. 15 except for the viewpoint location information.

Specifically, coordinates (a,−a,0), (−a,a,0), (0,a,−a), (0,−a,a), (−a,0,a), and (a,0,−a) of the viewpoints 211 to 216 with the viewpoint O assumed as the origin are registered in the table of FIG. 17 to correspond to the common parts to the file names "posZ2," "negZ2," "posX2," "negX2," "posY2," and "negY2," respectively.

(Explanation of Process Performed by Content Server)

Figure 18:
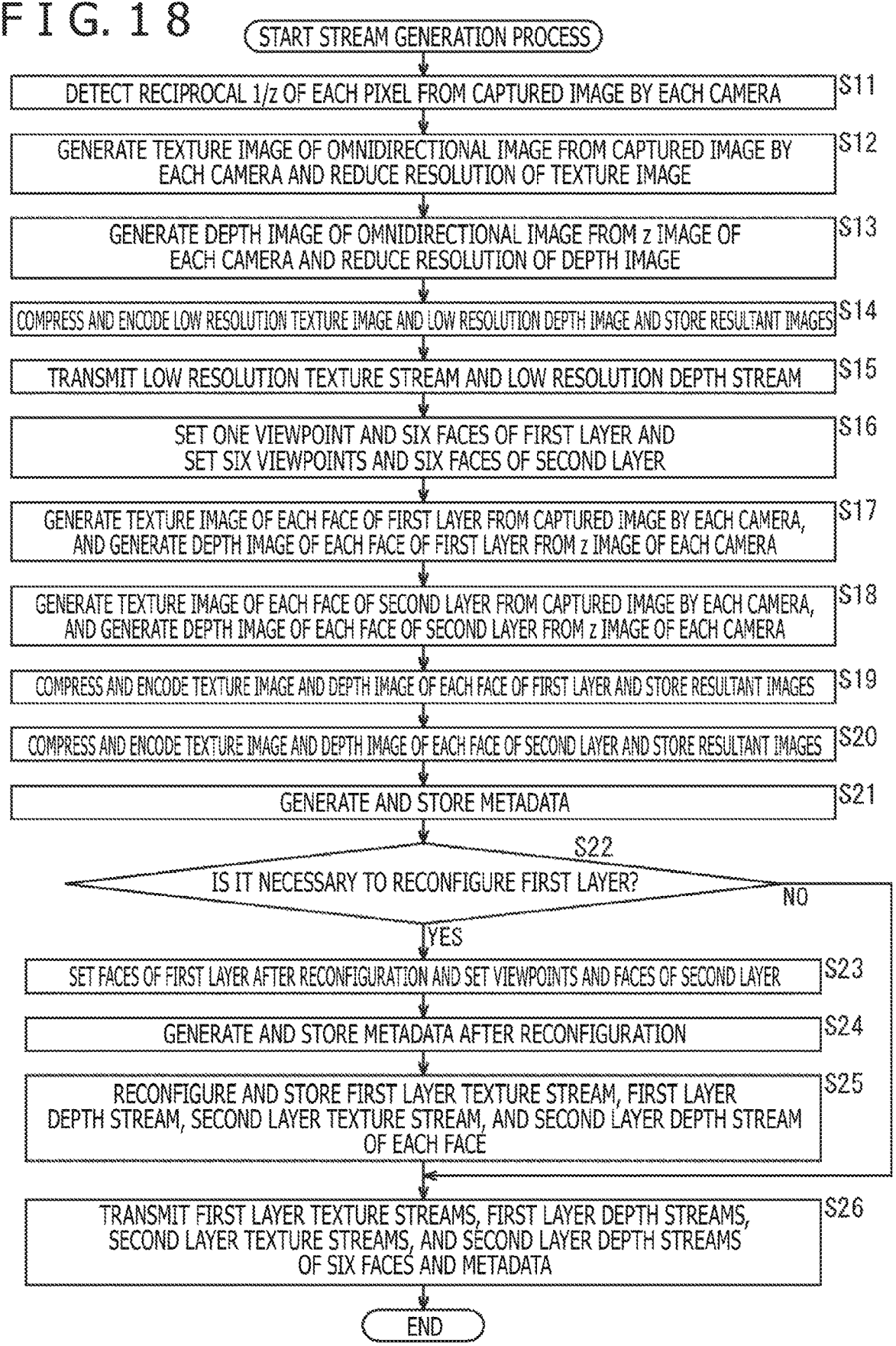
FIG. 18 is an explanatory flowchart of a stream generation process.

FIG. 18 is an explanatory flowchart of a stream generation process performed by the content server 12 of FIG. 2. This stream generation process is started when the captured image by each camera is supplied from the multi-camera 11 of FIG. 1 per unit.

In Step S11 of FIG. 18, the depth detection section 31 in the content server 12 detects the reciprocal 1/z of each pixel of the captured image by each camera from the captured image by the camera supplied from the multi-camera 11, and supplies the reciprocal 1/z to the low resolution image processing section 33 and the high resolution image processing section 34.

In Step S12, the low resolution image processing section 33 generates the texture image of the omnidirectional image from the captured image by each camera supplied from the multi-camera 11 with a predetermined three-dimensional location in the camera coordinate system assumed as the viewpoint, and reduces the resolution of the texture images.

In Step S13, the low resolution image processing section 33 generates the depth image of the omnidirectional image from the z image of each camera supplied from the depth detection section 31, and reduces the resolution of the depth image.

In Step S14, the low resolution image processing section 33 compresses and encodes the low resolution texture image generated by a process in Step S12 and the low resolution depth image generated by a process in Step S13, and stores the resultant images.

In Step S15, the low resolution image processing section 33 transmits the stored low resolution texture stream and the stored low resolution depth stream to the home server 13 of FIG. 1.

In Step S16, the setting section 56 (FIG. 3) in the high resolution image processing section 34 sets the origin in the 3D model coordinate system as one viewpoint common to the first layer, and sets the six faces containing the six faces configuring the cube about the viewpoint of the first layer as the center, respectively as the faces of the first layer. In addition, the setting section 56 sets the six viewpoints and the six faces of the second layer corresponding to the faces of the first layer. The setting section 56 supplies one viewpoint location information and the six pieces of face information regarding the first layer to the first layer generation section 50 and the metadata generation section 57. In addition, the setting section 56 supplies the six pieces of viewpoint location information and the six pieces of face information regarding the second layer to the second layer generation section 53 and the metadata generation section 57.

In Step S17, the first layer generation section 50 generates the texture image of each face corresponding to each face information regarding the first layer from the captured image by each camera, with the viewpoint of the omnidirectional image in the camera coordinate system assumed as the origin and the origin indicated by the viewpoint location information regarding the first layer assumed as the viewpoint. Furthermore, the first layer generation section 50 generates the z image of each face corresponding to each face information regarding the first layer from the z image of each camera and supplies the z image to the quantization section 51, and the quantization section 51 generates the depth image of each face from the z image of each face.

In Step S18, the second layer generation section 53 generates the texture image from the captured image by each camera with the viewpoint of the omnidirectional image in the camera coordinate system assumed as the origin and the three-dimensional location indicated by the viewpoint location information regarding the second layer as the viewpoint per face corresponding to the face information regarding the second layer. Furthermore, the second layer generation section 53 generates the z image of each face from the z image of each camera and supplies the z image to the quantization section 54 per face corresponding to the face information regarding the second layer, and the quantization section 54 generates the depth image of each face from the z image of each face.

In Step S19, the encoder 52 compresses and encodes the texture image and the depth image of each face of the first layer per face and per image type, supplies the resultant images to the storage 58 to store therein the images.

In Step S20, the encoder 55 compresses and encodes the texture image and the depth image of each face of the second layer per face and per image type, supplies the resultant images to the storage 58 to store therein the images.

In Step S21, the metadata generation section 57 generates the tables containing the viewpoint location information and the face information regarding the first layer and the viewpoint location information and the face information regarding the second layer supplied from the setting section 56 as the metadata, supplies the metadata to the storage 58 to store therein the metadata.

In Step S22, the reconfiguration section 59 determines whether it is necessary to reconfigure the texture images and the depth images of the first layer. For example, the reconfiguration section 59 determines that it is necessary to reconfigure the texture images and the depth images of the first layer in a case in which a user issues an instruction to change the number of faces, the angles of view of the faces, the face-to-face intervals, the locations, or the inclinations of the faces of the first layer.

In a case in which it is determined in Step S22 that it is necessary to reconfigure the texture images and the depth images of the first layer, the process goes to Step S23. In Step S23, the reconfiguration section 59 sets the faces of the first layer after reconfiguration and the viewpoints and the faces of the second layer corresponding to the faces of the first layer after reconfiguration.

In Step S24, the reconfiguration section 59 generates the tables containing the viewpoint location information and the face information regarding the first layer and the viewpoint location information and the face information regarding the second layer after reconfiguration as the metadata, and supplies the metadata to the storage 58.

In Step S25, the reconfiguration section 59 reconfigures the first layer texture streams of the faces stored in the storage 58 into the texture streams of the faces of the first layer after reconfiguration set in Step S23, and supplies the first layer texture streams after reconfiguration to the storage 58 to store therein the first layer texture streams. Furthermore, the reconfiguration section 59 reconfigures the first layer depth streams stored in the storage 58 into the first layer depth streams of the faces of the first layer after reconfiguration set in Step S23, and supplies the first layer depth streams after reconfiguration to the storage 58 to store therein the first layer depth streams after reconfiguration.

Moreover, the reconfiguration section 59 reconfigures the second layer texture streams of the faces stored in the storage 58 into the second layer texture streams of the viewpoints and the faces of the second layer after reconfiguration, and supplies the second layer texture streams after reconfiguration set in Step S23 to the storage 58 to store therein the second layer texture streams after reconfiguration. The reconfiguration section 59 reconfigures the second layer depth streams stored in the storage 58 into the second layer depth streams of the viewpoints and the faces of the second layer after reconfiguration set in Step S23, and supplies the second layer depth streams after reconfiguration to the storage 58 to store therein the second layer depth streams after reconfiguration. The process then goes to Step S26.

On the other hand, in a case in which it is determined in Step S22 that it is unnecessary to reconfigure the texture images and the depth images of the first layer, the process goes to Step S26.

In Step S26, the transmission section 60 reads the first layer texture streams, the first layer depth streams, the second layer texture streams, and the second layer depth streams of the six faces before reconfiguration and the metadata from the storage 58, and transmits the first layer texture streams, the first layer depth streams, the second layer texture streams, and the second layer depth streams of the six faces before reconfiguration and the metadata to the home server 13.

As described so far, the content server 12 generates the texture images and the depth images in the occlusion regions at the viewpoint of the first layer as the texture images and the depth images of the second layer. Therefore, the home server 13 can generate the occlusion regions at the viewpoint O contained in the display image by using the texture images and the depth images of the second layer in a case in which the viewing location differs from the viewpoint O. Thus, the home server 13 can generate a display image at a high image quality.

Moreover, the content server 12 sets the viewpoints of the second layer at the three-dimensional locations different from that of the viewpoint O of the first layer. It is, therefore, possible to express the length of the subject extending to the viewpoint O in the direction of extending to the viewpoint O in the second layer.

Furthermore, the content server 12 sets the y value of each pixel of the depth images as the value obtained by performing 8-bit quantization on the reciprocal 1/r. Therefore, the content server 12 does not need to perform 8-bit quantization again on the depth images at the time of reconfiguration.

(Example of Configuration of Home Server)

Figure 19:
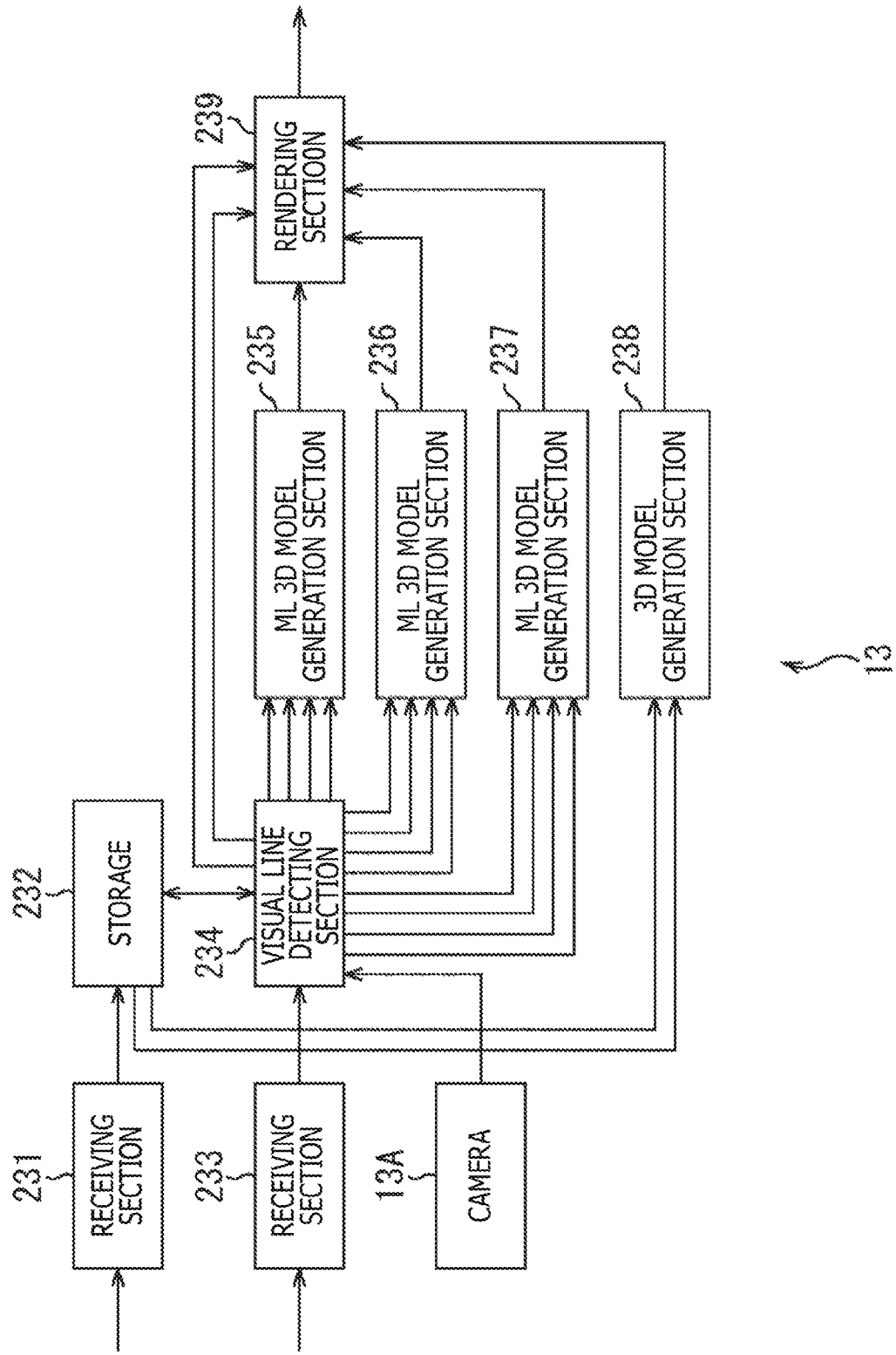
FIG. 19 is a block diagram depicting an example of a configuration of a home server.

FIG. 19 is a block diagram depicting an example of a configuration of the home server 13 of FIG. 1.

The home server 13 of FIG. 19 includes the camera 13A, a receiving section 231, a storage 232, a receiving section 233, a visual line detecting section 234, ML 3D model generation sections 235, 236, and 237, a 3D model generation section 238, and a rendering section 239.

The receiving section 231 in the home server 13 receives the low resolution texture stream, the low resolution depth stream, and the first layer texture streams, the first layer depth streams, the second layer texture streams, and the second layer depth streams of the six faces as well as the metadata transmitted from the content server 12, and supplies the streams and the metadata to the storage 232.

The storage 232 stores therein the low resolution texture stream and the low resolution depth stream, the first layer texture streams, the first layer depth streams, the second layer texture streams, and the second layer depth streams of the six faces, and the metadata supplied from the receiving section 231.

The receiving section 233 receives the detection result of the gyro sensor 15B of FIG. 1 from the head mounted display 15 and supplies the detection result to the visual line detecting section 234.

The visual line detecting section 234 determines the visual line direction of the viewer in the 3D model coordinate system on the basis of the detection result of the gyro sensor 15B supplied from the receiving section 233. In addition, the visual line detecting section 234 acquires the captured image of the marker 15A from the camera 13A, and detects the viewing location in the 3D model coordinate system on the basis of the captured image.

The visual line detecting section 234 reads the table of the first layer out of the metadata from the storage 232. The visual line detecting section 234 determines three faces corresponding to visual line vectors closest to the visual line extending from the viewing location in the visual line direction from among the six faces as selected faces on the basis of the viewing location and the visual line direction in the 3D model coordinate system and the table of the first layer. Specifically, the visual line detecting section 234 determines the face containing either the +X face 81 or the −X face 82, the face containing either the +Y face 83 or the −Y face 84, and the face containing either the +Z face 85 or the −Z face 86 as the selected faces.

Determining the selected faces as described so far makes the highest a rate of the high resolution regions in the display image generated using the texture images and the depth images of the first layer and the second layer corresponding to the selected faces by the rendering section 239 to be described later. Furthermore, determining the three selected faces makes it possible to increaser the rate of the high resolution regions in the display image in a case in which the visual line is directed to neighborhoods of a vertex of the cube 80, compared with a case of selecting one selected face.

The visual line detecting section 234 reads the first layer texture streams, the first layer depth streams, the second layer texture streams, and the second layer depth streams corresponding to the three selected faces from the storage 232. The visual line detecting section 234 supplies the read first layer texture streams, first layer depth streams, second layer texture streams, and second layer depth streams to the ML 3D model generation sections 235 to 237 to correspond to the faces. In addition, the visual line detecting section 234 reads the low resolution texture stream and the low resolution depth stream from the storage 232, and supplies the low resolution texture stream and the low resolution depth stream to the 3D model generation section 238.

Moreover, the visual line detecting section 234 determines a visual field range of the viewer in the 3D model coordinate system on the basis of the viewing location and the visual line direction in the 3D model coordinate system. The visual line detecting section 234 supplies the visual field range and the viewing location of the viewer to the rendering section 239. The visual line detecting section 234 supplies the three selected faces and the viewpoint location information and the face information regarding the three faces of the second layer corresponding to the three selected faces to the rendering section 239.

Each of the ML 3D model generation sections 235 to 237 generates three-dimensional data configured with three-dimensional locations (u,v,z) in a texture image coordinate system and connection information of sampling points corresponding to the pixels of the texture images of the first layer and RGB values as color information using the first layer texture stream and the first layer depth stream. It is noted that the connection information regarding the sampling points is information that represents connection between each sampling point (vertex) and the other sampling point. The texture image coordinate system is a coordinate system having the lateral direction of the texture image as a u-axis, the longitudinal direction thereof as a v-axis, and the depth direction thereof as a z-axis.

Furthermore, each of the ML 3D model generation sections 235 to 237 generates three-dimensional data regarding sampling points corresponding to the pixels of the texture images of the second layer using the second layer texture stream and the second layer depth stream supplied from the visual line detecting section 234. The ML 3D model generation sections 235 to 237 each supply the three-dimensional data regarding the first layer and the second layer to the rendering section 239.

The 3D model generation section 238 decodes the low resolution texture stream and the low resolution depth stream supplied from the visual line detecting section 234, and generates low resolution texture images and low resolution depth images. The 3D model generation section 238 converts a YCbCr value as a pixel value of each pixel of the low resolution texture images into an RGB value and sets the RGB value as that of the sampling point corresponding to each pixel. In addition, the 3D model generation section 238 performs 8-bit inverse quantization on the pixel value of each pixel of the low resolution depth images to obtain the reciprocal 1/r. The 3D model generation section 238 then obtains the three-dimensional location (u,v,z) of each pixel as the three-dimensional location (u,v,z) of the sampling point corresponding to the pixel on the basis of the reciprocal 1/r of the pixel of the low resolution depth image.

Moreover, the 3D model generation section 238 generates the connection information regarding the sampling points such that three adjacent sampling points are connected to one another on the basis of the three-dimensional location (u,v,z) of each sampling point. The 3D model generation section 238 supplies the three-dimensional location (u,v,z), the connection information, and the RGB value of each sampling point to the rendering section 239 as the three-dimensional data regarding the low resolution texture images.

The rendering section 239 performs triangle patch rendering (point group rendering) on the low resolution texture images in the 3D model coordinate system on the basis of the three-dimensional data regarding the low resolution texture image supplied from the 3D model generation section 238. The rendering section 239 then performs triangle patch rendering on the texture images of the first layer and the second layer in the 3D model coordinate system on the basis of the three-dimensional data regarding the first layer and the second layer supplied from the ML 3D model generation sections 235 and 237 and the viewpoint location information and the face information supplied from the visual line detecting section 234.

In other words, the viewpoint of each low resolution texture image is the origin in the 3D model coordinate system, and a location and a size of each face of the regular octahedron as the 3D model are determined in advance. The rendering section 239 can, therefore, obtain an internal parameter and an external parameter of each camera corresponding to each face of the regular octahedron. Thus, the rendering section 239 can recognize the location (u,v) of each sampling point on a screen and a three-dimensional location (X,Y,Z) thereof in the 3D model coordinate system from the three-dimensional location (u,v,z) of each sampling point of the low resolution texture image using the internal parameter and the external parameter. As a result, the rendering section 239 can perform triangle patch rendering using the location (u,v) of each sampling point of the low resolution texture image on the screen, the three-dimensional location (X,Y,Z) thereof, the connection information, and the RGB value.

Furthermore, the rendering section 239 can obtain the internal parameter and the external parameter of each camera corresponding to each face of the first layer and the second layer on the basis of the viewpoint location information and the face information regarding the first layer and the second layer. Therefore, the rendering section 239 can recognize the location (u,v) of each sampling point on the screen and the three-dimensional location (X,Y,Z) thereof from the three-dimensional location (u,v,z) of each sampling point of the first layer and the second layer using the internal parameter and the external parameter. As a result, the rendering section 239 can perform triangle patch rendering using the location (u,v) of each sampling point of the first layer and the second layer on the screen, the three-dimensional location (X,Y,Z) thereof, the connection information, and the RGB values.

The rendering section 239 (image generation section) generates the display image by perspectively projecting (mapping) triangle patches rendered in the 3D model coordinate system onto the visual field range with the viewing location supplied from the visual line detecting section 234 assumed as the viewpoint. The rendering section 239 transmits the display image to the conversion device 14 of FIG. 1.

(Example of Configuration of ML 3D Model Generation Section)

Figure 20:
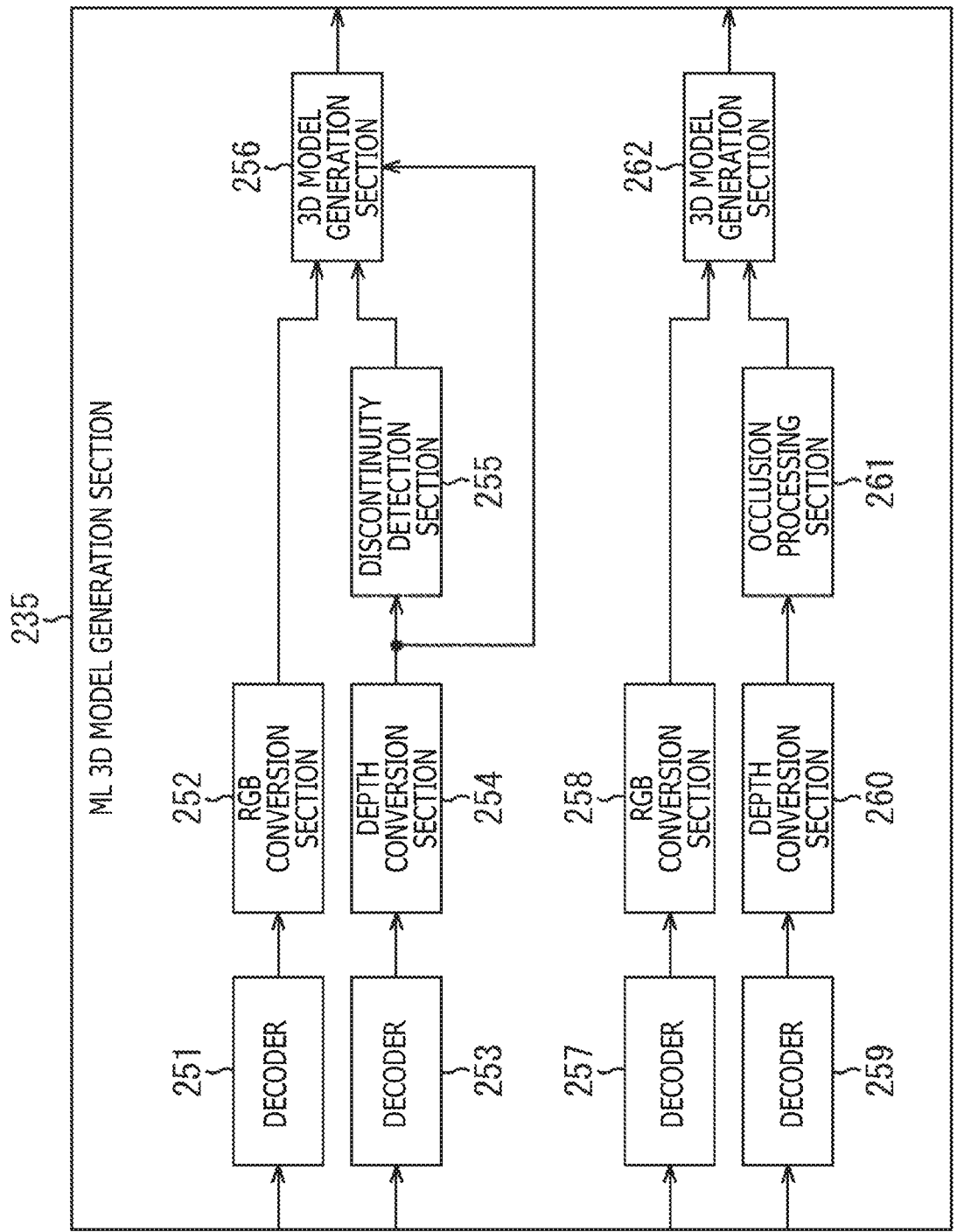
FIG. 20 is a block diagram depicting an example of a configuration of an ML 3D model generation section.

FIG. 20 is a block diagram depicting an example of a configuration of the ML 3D model generation section 235 of FIG. 19.

The ML 3D model generation section 235 of FIG. 20 is configured with a decoder 251, an RGB conversion section 252, a decoder 253, a depth conversion section 254, a discontinuity detection section 255, a 3D model generation section 256, a decoder 257, an RGB conversion section 258, a decoder 259, a depth conversion section 260, an occlusion processing section 261, and a 3D model generation section 262.

The decoder 251 in the ML 3D model generation section 235 decodes the first layer texture streams supplied from the visual line detecting section 234 of FIG. 19 and generates the texture images of the first layer. The decoder 251 supplies the texture images of the first layer to the RGB conversion section 252.

The RGB conversion section 252 converts the YCbCr value as the pixel value of each pixel of the texture images of the first layer into the RGB value and sets the RGB value as that of the sampling point corresponding to each pixel. The RGB conversion section 252 then supplies the RGB value of each sampling point to the 3D model generation section 256.

The decoder 253 decodes the first layer depth streams supplied from the visual line detecting section 234 and generates the depth images of the first layer. The decoder 253 supplies the depth images of the first layer to the depth conversion section 254.

The depth conversion section 254 performs 8-bit inverse quantization on the pixel value of each pixel of the depth images of the first layer supplied from the decoder 253 to obtain the reciprocal 1/r. The depth conversion section 254 then obtains the three-dimensional location (u,v,z) of each pixel as the three-dimensional location (u,v,z) of the sampling point corresponding to the pixel on the basis of the reciprocal 1/r of the pixel of the depth images of the first layer. The depth conversion section 254 supplies the three-dimensional location (u,v,z) of each sampling point to the discontinuity detection section 255 and the 3D model generation section 256.

The discontinuity detection section 255 detects a discontinuous pixel that is a pixel corresponding to the sampling point for which a difference in z coordinate from the adjacent sampling point is equal to or greater than a threshold out of the pixels of the depth images of the first layer on the basis of the three-dimensional location (u,v,z) of each sampling point supplied from the depth conversion section 254. The discontinuity detection section 255 supplies the three-dimensional location (u,v,z) of the sampling point corresponding to the discontinuous pixel to the 3D model generation section 256.

The 3D model generation section 256 (connection information generation section) generates connection information regarding each sampling point such that three adjacent sampling points out of the sampling points are connected to one another on the basis of the three-dimensional location (u,v,z) of each sampling point supplied from the depth conversion section 254. In other words, the 3D model generation section 256 generates the connection information that represents connection among three vertexes of a triangle patch having a sampling point as the vertex per sampling point. The 3D model generation section 256 then deletes connection information that represents connection to the sampling point corresponding to the discontinuous pixel among the generated connection information regarding each sampling point, on the basis of the three-dimensional location (u,v,z) of the sampling point corresponding to the discontinuous pixel supplied from the discontinuity detection section 255.

The 3D model generation section 256 generates the three-dimensional location (u,v,z), the RGB value, and the connection information after deletion of each sampling point of the first layer as three-dimensional data regarding the first layer, and supplies the three-dimensional data to the rendering section 239 of FIG. 19.

Processes performed by the decoder 257, the RGB conversion section 258, the decoder 259, and the depth conversion section 260 are similar to those performed by the decoder 251, the RGB conversion section 252, the decoder 253, and the depth conversion section 254 except that the layer to be processed changes from the first layer to the second layer; thus, explanation thereof will be omitted.

The occlusion processing section 261 detects a discontinuous pixel among the pixels of the depth images of the second layer on the basis of the three-dimensional location (u,v,z) of each sampling point supplied from the depth conversion section 260. The occlusion processing section 261 performs an occlusion process for correcting the three-dimensional location (u,v,z) of the sampling point corresponding to the discontinuous pixel on the basis of the three-dimensional location (u,v,z) of each sampling point of the second layer.

Specifically, the occlusion processing section 261 corrects, for example, the two-dimensional location (u,v) of the sampling point corresponding to the discontinuous pixel to a two-dimensional location of a sampling point in the vicinity of and in front of the sampling point. The occlusion processing section 261 supplies the three-dimensional location (u,v,z) of each sampling point of the second layer after the occlusion process to the 3D model generation section 262.

The 3D model generation section 262 generates the connection information that represents the connection of the sampling point to the two adjacent sampling points for each sampling point on the basis of the three-dimensional location (u,v,z) of each sampling point supplied from the occlusion processing section 261. The 3D model generation section 262 generates the three-dimensional location (u,v,z) and the connection information of each sampling point and the RGB value supplied from the RGB conversion section 258 as three-dimensional data regarding the second layer. The 3D model generation section 256 supplies the three-dimensional data regarding the second layer to the rendering section 239 of FIG. 19.

Although not depicted, the ML 3D model generation sections 236 and 237 are configured similarly to the ML 3D model generation section 235 of FIG. 20.

(Explanation of Deletion of Connection Information and Effects of Occlusion Process)

Figure 22:
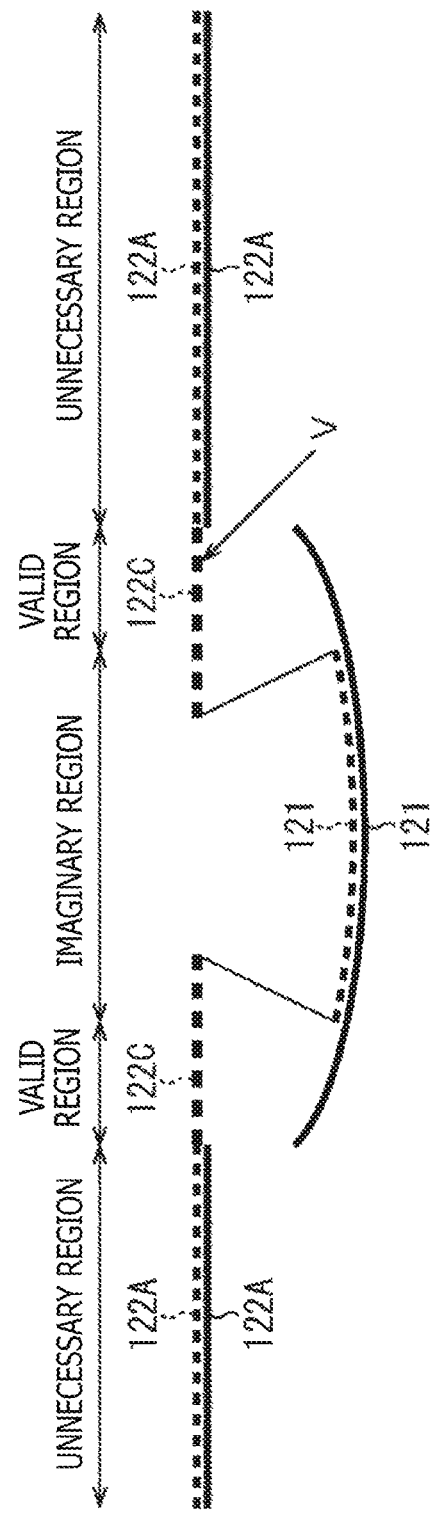
FIG. 22 is an explanatory diagram of another example of the connection information.

FIGS. 21A and 21B represent explanatory diagrams of connection information in a case in which the connection information that represents the connection to the sampling point corresponding to the discontinuous pixel among the connection information regarding the first layer is not deleted, and FIG. 22 is an explanatory diagram of the connection information in a case of deleting the connection information.

In FIGS. 21A, 21B and 22, the horizontal direction represents the lateral direction of the texture image and the vertical direction represents the depth direction of the texture image. The upward direction of FIGS. 21A, 21B and 22 indicates the front side and the downward direction thereof indicates the back side. Furthermore, in FIGS. 21A, 21B and 22, a solid line represents the three-dimensional location of each sampling point of the first layer, and a dotted line represents the three-dimensional location of each sampling point of the second layer. Moreover, in examples of FIGS. 21A, 21B and 22, the subjects are the foreground 111 and the background 112 of FIG. 10.

In a case in which the occlusion process is not performed on any of the first layer and the second layer, the three-dimensional locations of the sampling points corresponding to the discontinuous pixels on boundaries between the captured image 121 of the foreground 111 of the first layer and the captured images 122A of the regions 112A of the background 112 are not changed as depicted in FIG. 21A.

Furthermore, in the case in which the connection information that represents the connection to the sampling point corresponding to the discontinuous pixel is not deleted for any of the first layer and the second layer, the sampling point corresponding to the discontinuous pixel between the first layer and the second layer is connected to the two adjacent sampling points as depicted in FIG. 21A.

Therefore, a triangle patch having the sampling point corresponding to each discontinuous pixel of the first layer and the two adjacent sampling points as vertexes is generated, and the captured images 122C of the valid regions are filled with such triangle patches. Thus, in a case of generating a display image containing the photographed occlusion region 112C corresponding to a visual line V from lower right to upper left, the valid region of the second layer in which the captured image 122C of the photographed occlusion region 112C is disposed cannot be used.

Furthermore, in a case in which the connection information that represents the connection to the sampling point corresponding to the discontinuous pixel is not deleted for any of the first layer and the second layer but the occlusion process is performed, the two-dimensional location of a sampling point corresponding to the discontinuous pixel between the first layer and the second layer is corrected to the two-dimensional location of the sampling point in the vicinity of and in front of the sampling point as depicted in FIG. 21B.

Therefore, in the case of generating the display image corresponding to the visual line V, the captured image 122A of the region 112A of the first layer can be used as the display image of the photographed occlusion region 112C. As a result, the image quality of the display image improves.

Nevertheless, the sampling point corresponding to the discontinuous pixel of the first layer after the occlusion process is connected to the two adjacent sampling points and a triangle patch is generated. Therefore, similarly to the case of FIG. 21A, in the case of generating the display image corresponding to the visual line V, the valid region of the second layer in which the captured image 122C of the photographed occlusion region 112C is disposed cannot be used.

On the other hand, the 3D model generation section 256 deletes the connection information that represents the connection to the discontinuous pixel of the first layer as illustrated in FIG. 22. Therefore, the triangle patch having the sampling point corresponding to the discontinuous pixel of the first layer as one vertex is not generated. Thus, in the case of generating the display image corresponding to the visual line V, the valid region of the second layer in which the captured image 122C of the photographed occlusion region 112C is disposed can be used. Since the connection information is not deleted in the second layer, a triangle patch of the second layer is always present in a region of the first layer in which the triangle patch is not present.

Moreover, the occlusion processing section 261 performs the occlusion process on the second layer. As depicted in FIG. 22, therefore, the two-dimensional locations of the sampling points on the back side among the sampling points corresponding to the discontinuous pixels on the boundaries between the valid regions of the second layer and the imaginary region are corrected to the two-dimensional locations of the sampling points in the vicinity of and in front of the sampling points. Therefore, the occlusion region is reduced in the second layer. Thus, an image quality of the second layer used at the time of generating the display image corresponding to the visual line V improves and the image quality of the display image eventually improves.

(Explanation of Effects of Angle of View of Face of First Layer)

FIGS. 23A, 23B, 24A and 24B are explanatory diagrams of sampling points in a case in which the angle of view of each face of first layer is 90 degrees and 100 degrees, respectively.

For the sake of convenience, it is assumed in examples of FIGS. 23A, 23B, 24A and 24B that resolutions of the texture images and the depth images of the first layer are 4×4 pixels and 6×6 pixels in the case in which the angle of view of each face of the first layer is 90 degrees and 100 degrees.

Figure 23B:
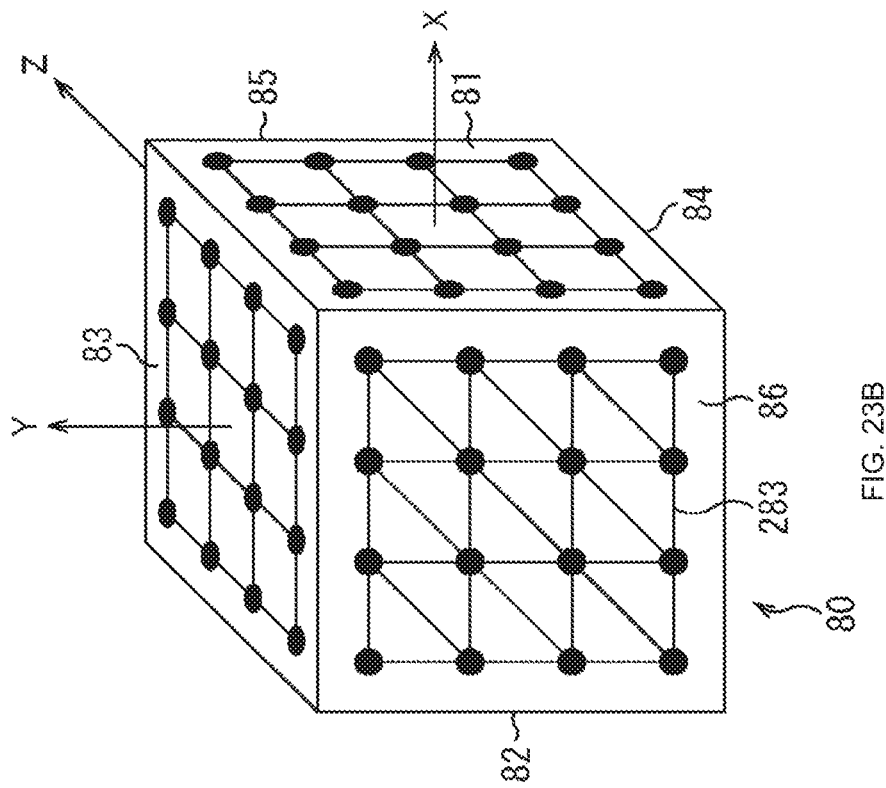
FIGS. 23A and 23B represent explanatory diagrams of an example of sampling points.

As depicted in FIG. 23B, in the case in which the angle of view of each face of the first layer is 90 degrees, the six faces of the first layer are the six faces 81 to 86 that configure the cube 80.

Figure 23A:
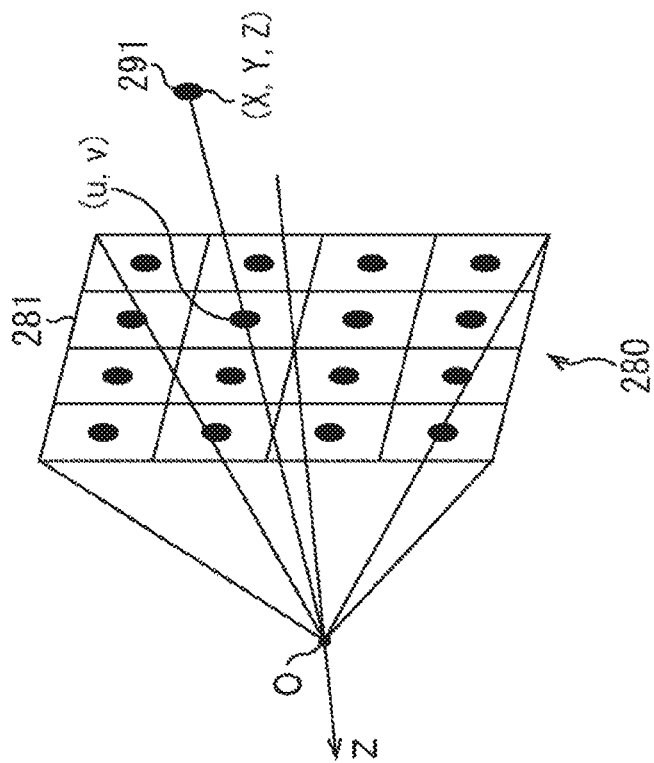

However, as depicted in FIG. 23A, a location (u,v) of a sampling point 291 on a texture image 280 on the −Z face 86 of the first layer, that is, a location at which a line from the viewpoint O toward the sampling point 291 crosses the −Z face 86 in the 3D model coordinate system is at a center of each pixel 281. Furthermore, the location (u,v) of each sampling point on the other faces 81 to 85 is also at the center of each pixel similarly to the −Z face 86.

Therefore, as depicted in FIG. 23B, a size, in each of u and v directions, of a region 283 on each of the faces 81 to 86 by all triangle patches each configured by connecting the three adjacent sampling points among the sampling points denoted by black circles is smaller than those of the faces 81 to 86 by a half of a pixel. Thus, triangle patches corresponding to the boundaries of the faces 81 to 86 are not generated, with the result that it is difficult to generate a display image of visual lines passing through the boundaries of the faces 81 to 86 with the high image quality.

Figure 24B:
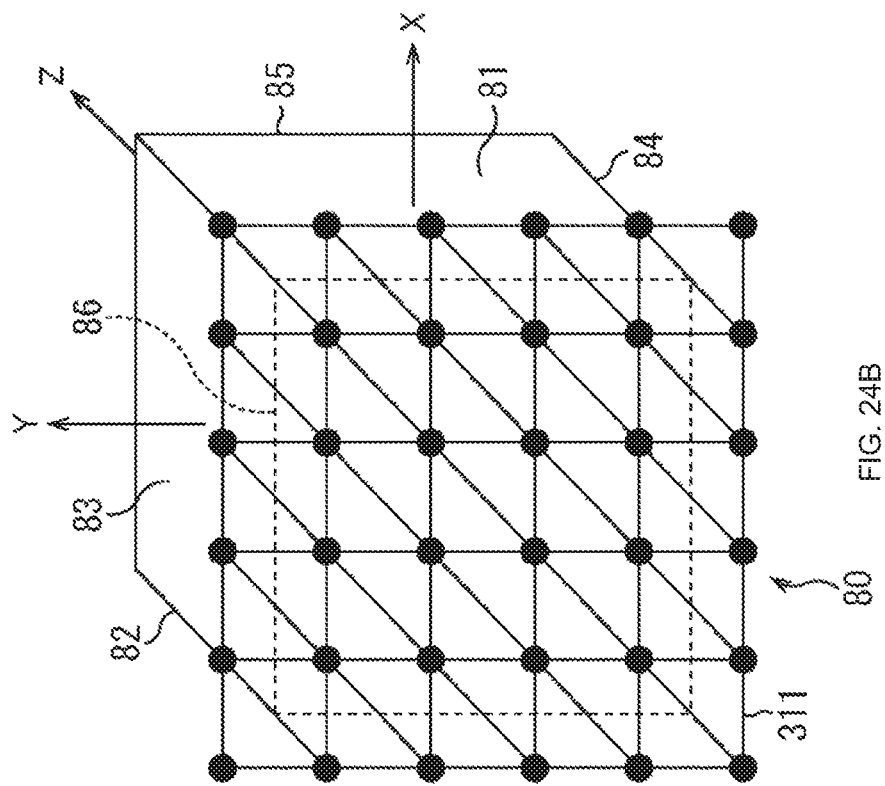
FIGS. 24A and 24B represent explanatory diagrams of another example of the sampling points.
Figure 24A:
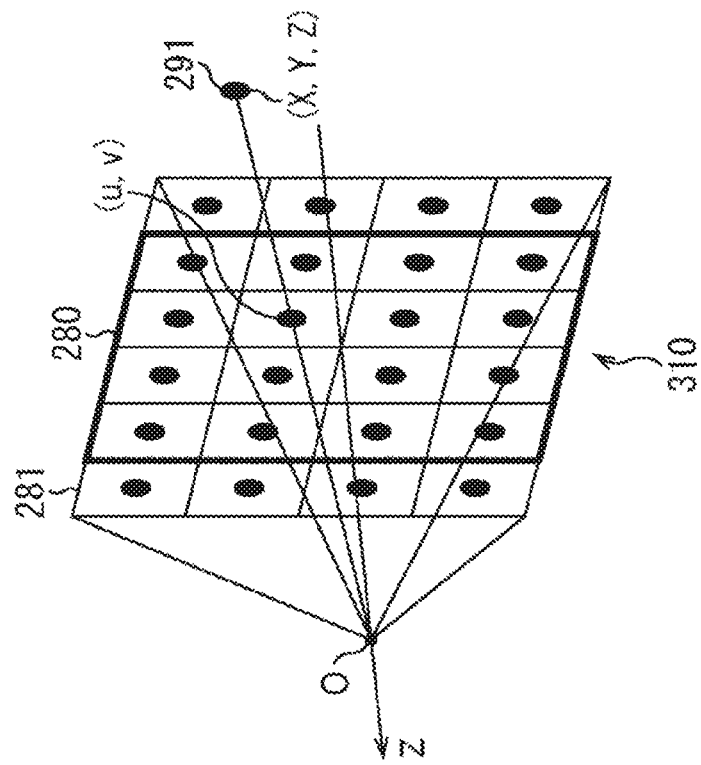

By contrast, in the case in which the angle of view of each face of the first layer is 100 degrees, a size of a texture image 310 of the face of the first layer containing the −Z face 86 is 6×6 pixels larger than that of the texture image 280 of FIGS. 23A and 23B, as depicted in FIG. 24A. Likewise, the sizes of the texture images on the faces of the first layer containing the other faces 81 to 85 are 6×6 pixels.

Therefore, as depicted in FIG. 24B, a size, in each of the u and v directions, of a region 311 on the −Z face 86 by all triangle patches each configured by connecting the three adjacent sampling points among the sampling points denoted by black circles is larger than that of the −Z face 86 by a half of a pixel. Although not depicted, sizes, in each of the u and v directions, of regions by the triangle patches on the faces of the first layer containing the other faces 81 to 85 are larger than those of the faces 81 to 85 each by a half of a pixel. Therefore, triangle patches corresponding to the boundaries of the faces 81 to 86 are generated, with the result that it is possible to generate a display image of an arbitrary visual line including the visual lines passing through the boundaries of the faces 81 to 86 with the high image quality.

While effects in the case in which the angle of view of each face of the first layer is 100 degrees have been described with reference to FIGS. 23A, 23B, 24A and 24B, similar effects are produced even in a case in which the angle of view of each face of the first layer is not 100 degrees as long as the angle of view thereof is greater than 90 degrees.

(Explanation of Effects of Angle of View of Face of Second Layer)

Figure 25B:
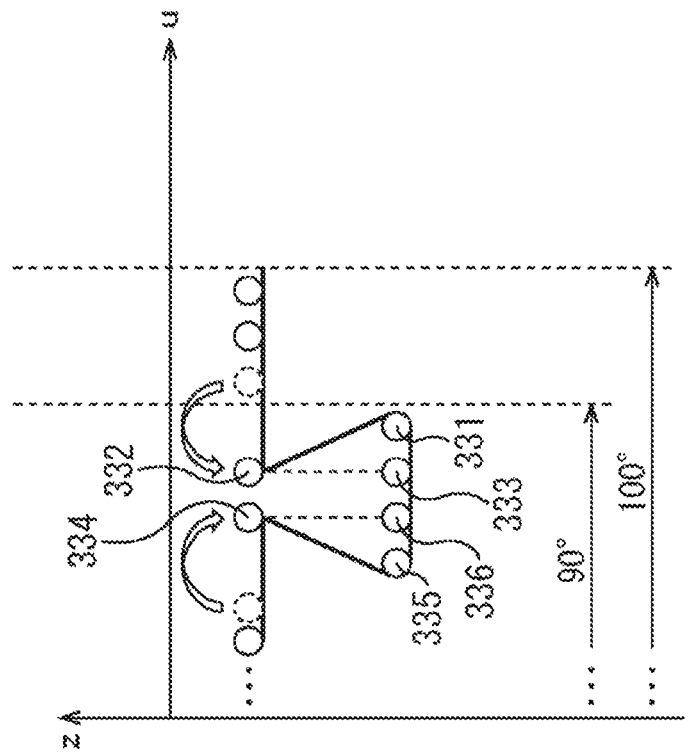
FIGS. 25A and 25B represent explanatory diagrams of an occlusion process.
Figure 25A:
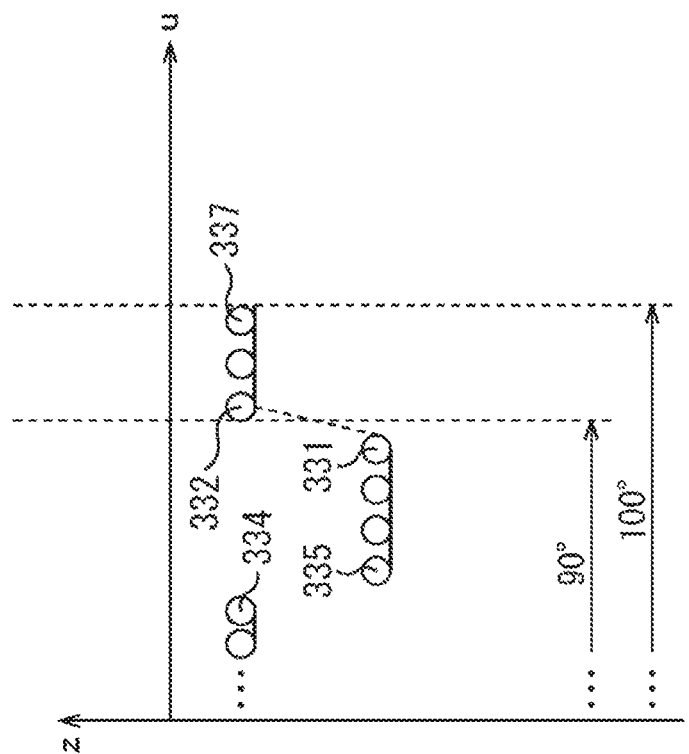

FIGS. 25A and 25B represent explanatory diagrams of the occlusion process in cases in which the angle of view of each face of the second layer is 90 degrees and 100 degrees.

In FIGS. 25A and 25B, a horizontal axis represents a u-axis and a vertical axis represents a z-axis. Furthermore, a circle represents a sampling point. Moreover, in an example of FIGS. 25A and 25B, a z coordinate is higher as a location in the depth direction is closer to the back side.

In the case in which the angle of view of each face of the second layer is 90 degrees, the sampling points are mapped only on one face of the second layer. Therefore, as depicted in FIG. 25A, a sampling point 332 adjacent to a sampling point 331 mapped onto an end portion of the face to be processed in the u direction is not mapped onto the face to be processed, and a location of the sampling point 332 on the z-axis is unknown at a time of the occlusion process on the face to be processed.

Thus, even in a case in which a difference between z coordinates of the sampling points 331 and 332 is equal to or greater than the threshold, the pixel corresponding to the sampling point 331 is not detected as the discontinuous pixel. Likewise, in a case in which a face onto which the sampling point 332 is mapped is regarded as the face to be processed, the pixel corresponding to the sampling point 332 is not detected as the discontinuous pixel. Therefore, it is impossible to perform the occlusion process on the sampling points 331 and 332. In other words, to perform the occlusion process on the sampling points 331 and 332, it is necessary to use not only the depth image on the face to be processed but also the depth image on the face adjacent to the face to be processed.

By contrast, in the case in which the angle of view of each face of the second layer is 100 degrees, a sampling point mapped onto a region other than the end portion of the face adjacent to each face is mapped onto each face overlappingly as a margin to paste up. For example, the sampling point 332 mapped onto the region other than the end portion of the face adjacent to the face to be processed, onto which the sampling point 331 is mapped, is mapped onto an end portion of the face to be processed.

Therefore, in the case in which the difference between the z coordinates of the sampling points 331 and 332 is equal to or greater than the threshold, the pixels corresponding to the sampling points 331 and 332 are detected as discontinuous pixels. Thus, as depicted in FIG. 25B, it is possible to perform the occlusion process on the sampling points 331 and 332. As a result, a u coordinate of the sampling point 332 corresponding to the discontinuous pixel is corrected to a u coordinate of a sampling point 333 in the vicinity of the sampling point 332 and in front of (lower in z coordinate than) the sampling point 332.

In the example of FIGS. 25A and 25B, a difference between z coordinates of sampling points 334 and 335 mapped onto a region other than the end portion of the face to be processed is equal to or greater than the threshold; thus, the pixels corresponding to the sampling points 334 and 335 are also detected as the discontinuous pixels. As a result, as depicted in FIG. 25B, a u coordinate of the sampling point 334 is corrected to a u coordinate of a sampling point 336 in the vicinity of the sampling point 334 and in front of the sampling point 334.

Furthermore, a sampling point 337 in an end portion having a highest u coordinate of the face to be processed is mapped onto the region other than the end portion of the face adjacent to the face to be processed. Therefore, in a case of regarding this face as the face to be processed, it is determined whether the pixel corresponding to the sampling point 337 is the discontinuous pixel, and it is possible to perform the occlusion process on the sampling point 337 in a case in which the pixel corresponding to the sampling point 337 is determined as the discontinuous pixel.

As described so far, in the case in which the angle of view of each face of the second layer is 100 degrees, it is possible to perform the occlusion process even the sampling point 331 mapped onto the end portion of the region other than the end portion of each face using only the sampling point on each face. As a result, the occlusion region of the second layer is diminished and the image quality of the display image can be improved.

While effects in the case in which the angle of view of each face of the second layer is 100 degrees have been described with reference to FIGS. 25A and 25B, similar effects are produced even in a case in which the angle of view of each face of the second layer is not 100 degrees as long as the angle of view thereof is greater than 90 degrees.

It is noted that the ML 3D model generation sections 235 to 237 may perform an image process such as a filter process using peripheral pixels on the texture images and the depth images obtained as a result of decoding. In this case, it is possible to attain an effect that the image process can be performed even on the end portion of the region other than the end portion of each face since the angle of view of each face of the first layer and the second layer is greater than 90 degrees, similarly to the occlusion process.

(Explanation of Process Performed by Home Server)

Figure 26:
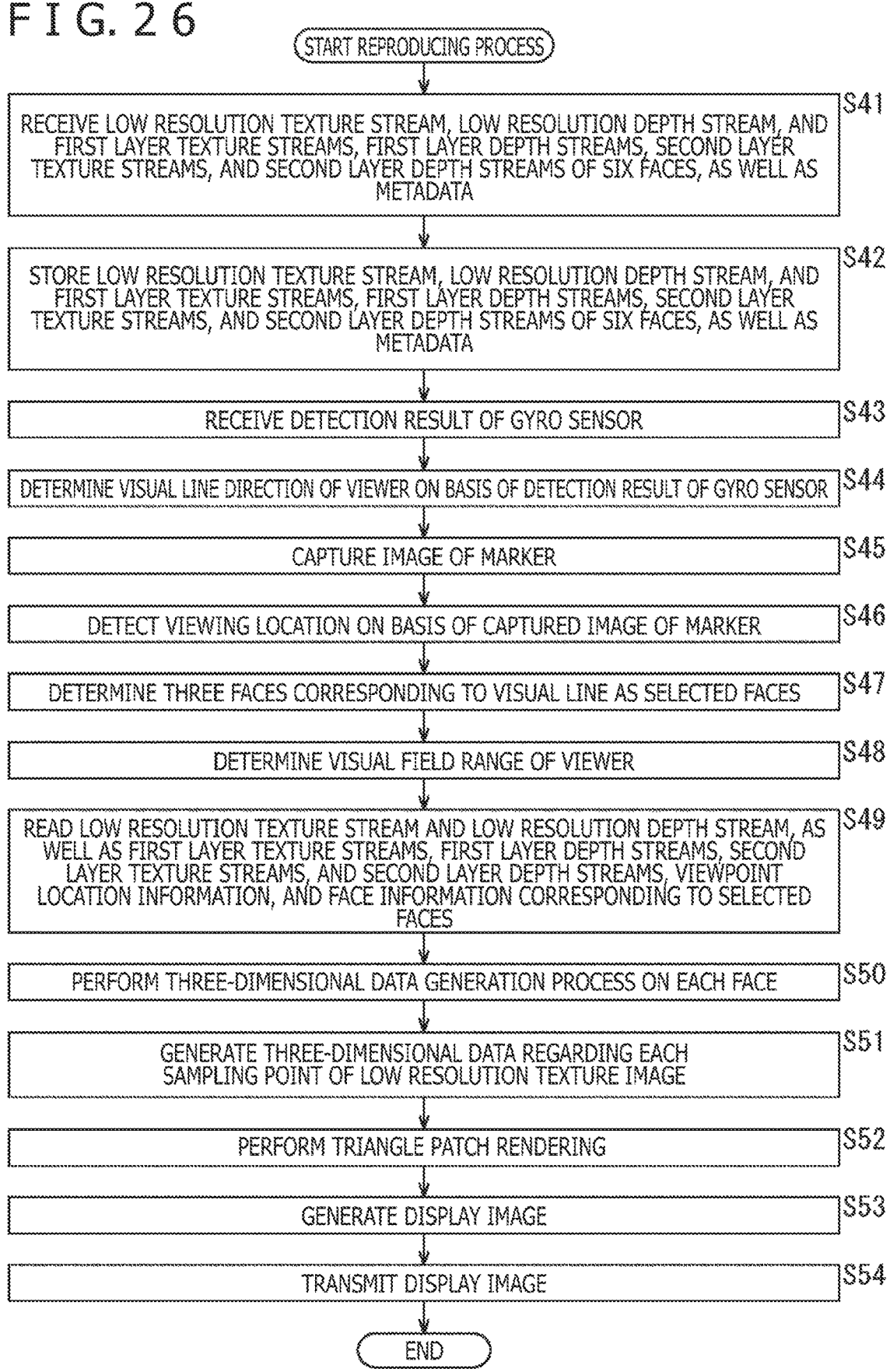
FIG. 26 is an explanatory flowchart of a reproducing process.

FIG. 26 is an explanatory flowchart of a reproducing process performed by the home server 13 of FIG. 19. This reproducing process is started when, for example, the content server 12 transmits the low resolution texture stream, the low resolution depth stream, and the first layer texture streams, the first layer depth streams, the second layer texture streams, and the second layer depth streams of the six faces as well as the metadata to the home server 13.

In Step S41 of FIG. 26, the receiving section 231 in the home server 13 receives the low resolution texture stream, the low resolution depth stream, and the first layer texture streams, the first layer depth streams, the second layer texture streams, and the second layer depth streams of the six faces as well as the metadata from the content server 12, and supplies the low resolution texture stream, the low resolution depth stream, and the first layer texture streams, the first layer depth streams, the second layer texture streams, and the second layer depth streams of the six faces as well as the metadata to the storage 232.

In Step S42, the storage 232 stores therein the low resolution texture stream, the low resolution depth stream, and the first layer texture streams, the first layer depth streams, the second layer texture streams, and the second layer depth streams of the six faces as well as the metadata.

In Step S43, the receiving section 233 receives the detection result of the gyro sensor 15B of FIG. 1 from the head mounted display 15 and supplies the detection result to the visual line detecting section 234.

In Step S44, the visual line detecting section 234 determines the visual line direction of the viewer in the 3D model coordinate system on the basis of the detection result of the gyro sensor 15B supplied from the receiving section 233. In Step S45, the camera 13A photographs the marker 15A affixed to the head mounted display 15 and supplies the resultant captured image to the visual line detecting section 234.

In Step S46, the visual line detecting section 234 detects the viewing location in the 3D model coordinate system on the basis of the captured image of the marker 15A supplied from the camera 13A, and supplies the viewing location to the rendering section 239.

In Step S47, the visual line detecting section 234 determines the three faces corresponding to the visual line vectors closest to the visual line from among the six faces as the selected faces on the basis of the table of the first layer among the metadata stored in the storage 232 and the viewing location and the visual line direction in the 3D model coordinate system.

In Step S48, the visual line detecting section 234 determines the visual field range of the viewer in the 3D model coordinate system on the basis of the viewing location and visual line direction in the 3D model coordinate system, and supplies the visual field range to the rendering section 239.

In Step S49, the visual line detecting section 234 reads the low resolution texture stream and the low resolution depth stream from the storage 232, and supplies the low resolution texture stream and the low resolution depth stream to the 3D model generation section 238. In addition, the visual line detecting section 234 reads the first layer texture streams, the first layer depth streams, the second layer texture streams, and the second layer depth streams corresponding to the three selected faces from the storage 232. The visual line detecting section 234 supplies the read first layer texture streams, first layer depth streams, second layer texture streams, and second layer depth streams to the ML 3D model generation sections 235 to 237 to correspond to the faces. Furthermore, the visual line detecting section 234 reads the viewpoint location information and the face information corresponding to the three selected faces from the storage 232, and supplies the viewpoint location information and the face information to the rendering section 239.

In Step S50, the ML 3D model generation sections 235 to 237 each perform the three-dimensional data generation process for generating the three-dimensional data regarding each sampling point of the first layer and the second layer to correspond to the faces. Details of this three-dimensional data generation process will be described later with reference to FIG. 27.

In Step S51, the 3D model generation section 238 generates the three-dimensional data regarding each sampling point of the low resolution texture images from the low resolution texture stream and the low resolution depth stream supplied from the visual line detecting section 234, and supplies the three-dimensional data to the rendering section 239.

In Step S52, the rendering section 239 performs triangle patch rendering on the low resolution texture images in the 3D model coordinate system on the basis of the three-dimensional data regarding the low resolution texture images supplied from the 3D model generation section 238. The rendering section 239 then performs triangle patch rendering on the texture images of the first layer and the second layer in the 3D model coordinate system on the basis of the three-dimensional data regarding the first layer and the second layer supplied from the ML 3D model generation sections 235 and 237 and the viewpoint location information and the face information supplied from the visual line detecting section 234.

In Step S53, the rendering section 239 generates the display image by perspectively projecting the triangle patches rendered in the 3D model coordinate system onto the visual field range with the viewing location supplied from the visual line detecting section 234 assumed as the viewpoint. In Step S54, the rendering section 239 transmits the display image to the conversion device 14 of FIG. 1.

Figure 27:
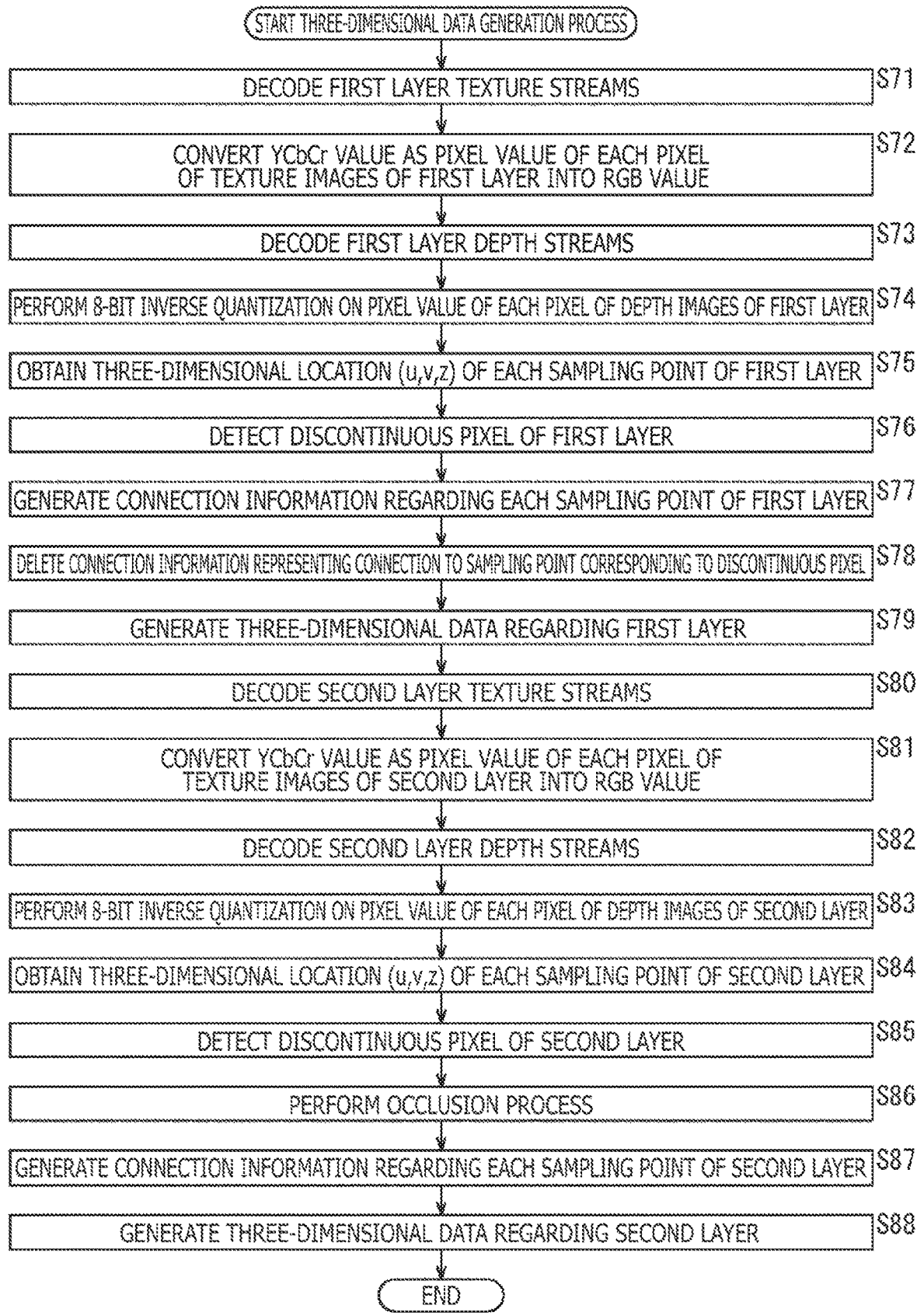
FIG. 27 is an explanatory flowchart of details of a three-dimensional data generation process.

FIG. 27 is an explanatory flowchart of the details of the three-dimensional data generation process performed by the ML 3D model generation section 235 in Step S50 of FIG. 26.

In Step S71 of FIG. 27, the decoder 251 (FIG. 20) in the ML 3D model generation section 235 decodes the first layer texture streams supplied from the visual line detecting section 234 of FIG. 19 and generates the texture images of the first layer. The decoder 251 supplies the texture images of the first layer to the RGB conversion section 252.

In Step S72, the RGB conversion section 252 converts the YCbCr value as the pixel value of each pixel of the texture images of the first layer into the RGB value and sets the RGB value as that of the sampling point corresponding to each pixel. The RGB conversion section 252 then supplies the RGB value of each sampling point to the 3D model generation section 256.

In Step S73, the decoder 253 decodes the first layer depth streams supplied from the visual line detecting section 234 and generates the depth images of the first layer. The decoder 253 supplies the depth images of the first layer to the depth conversion section 254.

In Step S74, the depth conversion section 254 performs 8-bit inverse quantization on the pixel value of each pixel of the depth images of the first layer supplied from the decoder 253 to obtain the reciprocal 1/r of each pixel of the depth images of the first layer.

In Step S75, the depth conversion section 254 obtains the three-dimensional location (u,v,z) of each pixel of the depth images of the first layer as the three-dimensional location (u,v,z) of the sampling point corresponding to each pixel on the basis of the reciprocal 1/r of each pixel of the depth images of the first layer. The depth conversion section 254 supplies the three-dimensional location (u,v,z) of each sampling point to the discontinuity detection section 255 and the 3D model generation section 256.

In Step S76, the discontinuity detection section 255 detects a discontinuous pixel out of the pixels of the depth images of the first layer on the basis of the three-dimensional location (u,v,z) of each sampling point supplied from the depth conversion section 254. The discontinuity detection section 255 supplies the three-dimensional location (u,v,z) of the sampling point corresponding to the discontinuous pixel to the 3D model generation section 256.

In Step S77, the 3D model generation section 256 generates the connection information regarding each sampling point of the first layer such that three adjacent sampling points out of the sampling points are connected to one another on the basis of the three-dimensional location (u,v,z) of each sampling point supplied from the depth conversion section 254.

In Step S78, the 3D model generation section 256 deletes the connection information that represents the connection to the sampling point corresponding to the discontinuous pixel among the connection information regarding each sampling point generated in Step S77, on the basis of the three-dimensional location (u,v,z) of the sampling point corresponding to the discontinuous pixel supplied from the discontinuity detection section 255.

In Step S79, the 3D model generation section 256 generates the three-dimensional location (u,v,z), the RGB value, and the connection information after deletion at Step S78 of each sampling point of the first layer as the three-dimensional data regarding the first layer. The 3D model generation section 256 supplies the three-dimensional data of the first layer to the rendering section 239 of FIG. 19.

In Step S80, the decoder 257 decodes the second layer texture streams supplied from the visual line detecting section 234 and generates the texture images of the second layer. The decoder 257 supplies the texture images of the second layer to the RGB conversion section 258.

In Step S81, the RGB conversion section 258 converts the YCbCr value as the pixel value of each pixel of the texture images of the second layer into the RGB value and sets the RGB value as that of the sampling point corresponding to each pixel. The RGB conversion section 258 then supplies the RGB value of each sampling point to the 3D model generation section 262.

In Step S82, the decoder 259 decodes the second layer depth streams supplied from the visual line detecting section 234 and generates the depth images of the second layer. The decoder 259 supplies the depth images of the second layer to the depth conversion section 260.

In Step S83, the depth conversion section 260 performs 8-bit inverse quantization on the pixel value of each pixel of the depth images of the second layer supplied from the decoder 259 to obtain the reciprocal 1/r of each pixel of the depth images of the second layer.

In Step S84, the depth conversion section 260 obtains the three-dimensional location (u,v,z) of each pixel of the depth images of the second layer as the three-dimensional location (u,v,z) of the sampling point corresponding to each pixel on the basis of the reciprocal 1/r of each pixel of the depth images of the second layer. The depth conversion section 260 supplies the three-dimensional location (u,v,z) of each sampling point to the occlusion processing section 261 and the 3D model generation section 262.

In Step S85, the occlusion processing section 261 detects a discontinuous pixel among the pixels of the depth images of the second layer on the basis of the three-dimensional location (u,v,z) of each sampling point supplied from the depth conversion section 260.

In Step S86, the occlusion processing section 261 performs the occlusion process for correcting the three-dimensional location (u,v,z) of the sampling point corresponding to the discontinuous pixel on the basis of the three-dimensional location (u,v,z) of each sampling point of the second layer. The occlusion processing section 261 supplies the three-dimensional location (u,v,z) of each sampling point of the second layer after the occlusion process to the 3D model generation section 262.

In Step S87, the 3D model generation section 262 generates the connection information regarding each sampling point of the second layer such that three adjacent sampling points out of the sampling points are connected to one another on the basis of the three-dimensional location (u,v,z) of each sampling point supplied from the occlusion processing section 261.

In Step S88, the 3D model generation section 262 generates the three-dimensional location (u,v,z) and the connection information of each sampling point and the RGB value supplied from the RGB conversion section 258 as three-dimensional data regarding the second layer. The 3D model generation section 262 supplies the three-dimensional data regarding the second layer to the rendering section 239 of FIG. 19.

It is noted that the three-dimensional data generation processes performed by the ML 3D model generation sections 236 and 237 are similar to the three-dimensional data generation process of FIG. 27.

As described so far, the home server 13 generates the display image using the first layer and the second layer. Therefore, in a case in which the viewing location differs from the viewpoint O, the occlusion region at the viewpoint O contained in the display image can be generated using the second layer. It is, therefore, possible to generate the display image with the high image quality.

Moreover, the home server 13 generates the display image using not only the texture images but also the depth images. Therefore, triangle patch rendering is performed to map the texture images onto the triangle patch of the three-dimensional shape according to the subject, and the display image can be generated using the triangle patches. Thus, it is possible to generate the display image with the high image quality, compared with a case of generating the display image by mapping the texture images onto a predetermined face using only the texture images.

Furthermore, the texture images and the depth images of the first layer are texture images and depth images obtained by mapping the texture images and the depth images of the omnidirectional image onto a predetermined face. Therefore, a reproducing apparatus, which reproduces only the texture images and the depth images obtained by mapping the texture images and the depth images of the omnidirectional image onto the predetermined face, can reproduce the texture images and the depth images of the first layer.

In other words, formats of the texture images and the depth images of the first layer and the second layer generated by the content server 12 are compatible with those of the texture images and the depth images obtained by mapping the texture images and the depth images of the omnidirectional image onto the predetermined face. Furthermore, a reproducing method by the home server 13 is compatible with a reproducing method by the reproducing apparatus that reproduces only the texture images and the depth images obtained by mapping the texture images and the depth images of the omnidirectional image onto the predetermined face.

It is noted that the home server 13 may generate the display image using only the texture images and the depth images of the first layer. In this case, the occlusion process is performed on the first layer as an alternative to deletion of the connection information.

2. Second Embodiment

A second embodiment of the image display system will next be described.

In the second embodiment, explanation of parts overlapping those in the first embodiment will be omitted as appropriate and only different parts will be described.

In the first embodiment, the content server 12 generates the first layer texture streams by compressing and encoding the texture images of the first layer and the first layer depth streams by compressing and encoding the depth images of the first layer, and transmits the first layer texture streams and the first layer depth streams to the home server 13.

In addition, the content server 12 generates the second layer texture streams by compressing and encoding the texture images of the second layer and the second layer depth streams by compressing and encoding the depth images of the second layer, and transmits the second layer texture streams and the second layer depth streams to the home server 13.

Therefore, the content server 12 transmits the texture images and the depth images per layer; however, the content server 12 is in some cases intended to transmit additional auxiliary information as well as the texture images and the depth images of each layer. In the second embodiment, therefore, a configuration that makes it possible to transmit auxiliary information as well as the texture images and the depth images of each layer will be described.

Details of the auxiliary information will be described later. While the display image can be generated without the auxiliary information, the auxiliary information is ancillary information for making high in image quality or function the display image generated using the texture images and the depth images. Auxiliary information of the same type may be added to each of the first layer and the second layer, or auxiliary information of different types may be added thereto. Furthermore, the auxiliary information may be added to only one of the first layer or the second layer.

(Example of Configuration of High Resolution Image Processing Section)

Figure 28:
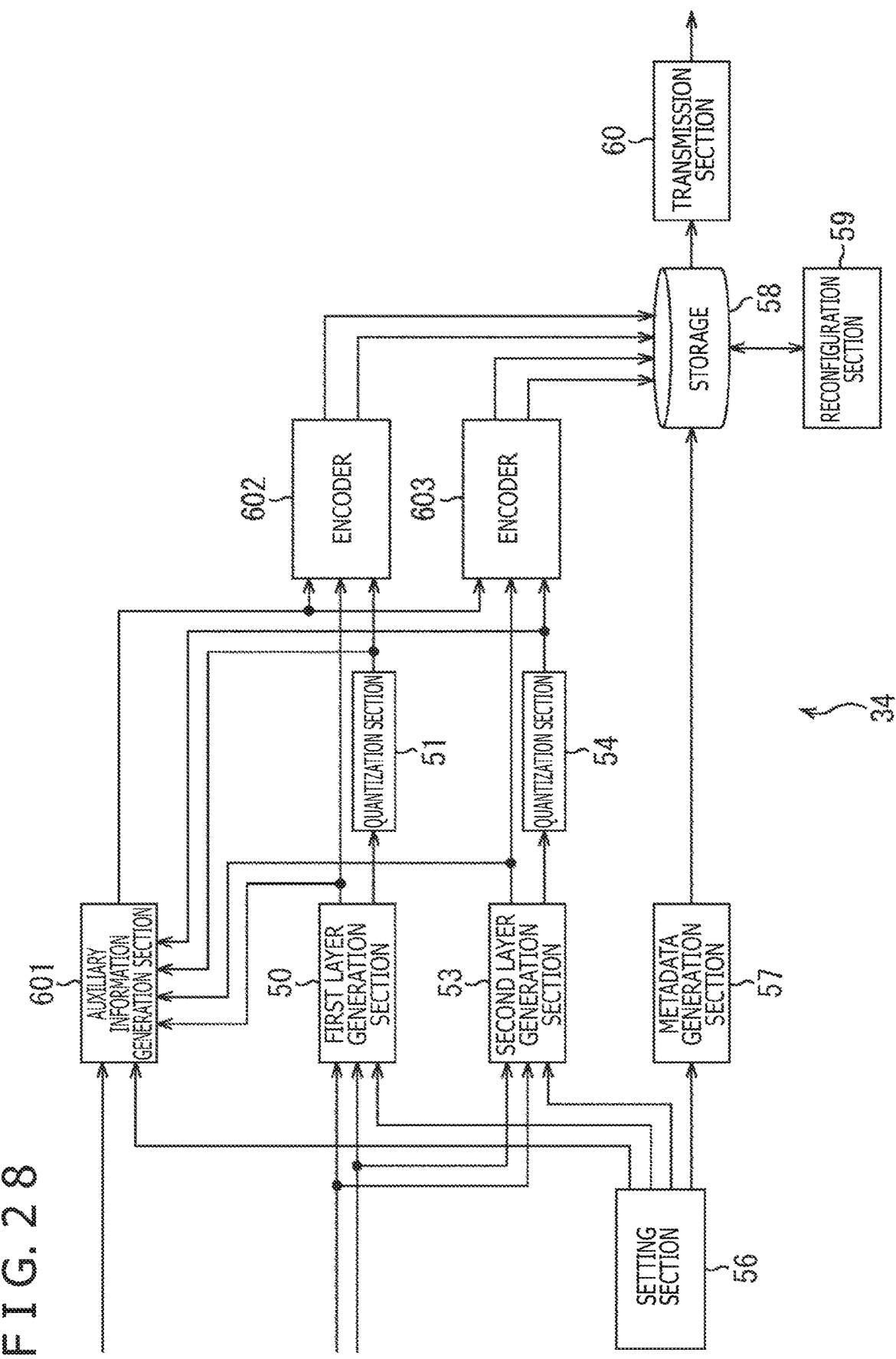
FIG. 28 is a block diagram depicting an example of a configuration of a high resolution image processing section in a second embodiment of the image display system.

FIG. 28 is a block diagram depicting an example of a configuration of the high resolution image processing section 34 according to the second embodiment.

In FIG. 28, parts corresponding to those of the configuration of the high resolution image processing section 34 according to the first embodiment depicted in FIG. 3 are denoted by the same reference signs and explanation of the parts will be omitted as appropriate.

Comparison with the first embodiment depicted in FIG. 3 indicates that an auxiliary information generation section 601 is newly added to the high resolution image processing section 34 according to the second embodiment and encoders 602 and 603 are provided thereon as an alternative to the encoders 53 and 55.

The auxiliary information generation section 601 generates auxiliary information utilized in an image process using the texture images and the depth images of the first layer and the second layer on the basis of control by the setting section 56. The setting section 56 issues an instruction as to what type of auxiliary information is to be generated. The setting section 56 supplies auxiliary information identification information for identifying auxiliary information to be created to the auxiliary information generation section 601 on the basis of, for example, user's operation.

The auxiliary information generation section 601 utilizes the captured images by the cameras generated by the multi-camera 11, the texture images and the depth images of the first layer on each face generated by the first layer generation section 50, the texture images and the depth images of the second layer on each face generated by the second layer generation section 53, and the like as needed depending on the auxiliary information to be created.

The auxiliary information generated by the auxiliary information generation section 601 is supplied to the encoders 602 and 603. More specifically, the auxiliary information utilized in the image process using the texture images and the depth images of the first layer is supplied to the encoder 602, and the auxiliary information utilized in the image process using the texture images and the depth images of the second layer is supplied to the encoder 603.

The encoder 602 compresses and encodes the texture images and the depth images of the six faces of the first layer per face and per image type to generate the first layer texture streams and the first layer depth streams, similarly to the encoder 52 in the first embodiment.

Here, a difference of the encoder 602 from the encoder 52 in the first embodiment is that at the time of generating the first layer depth stream by compressing and encoding the depth images of each face of the first layer, the encoder 602 stores the auxiliary information supplied from the auxiliary information generation section 601 in CbCr components in a YCbCr format, and generates the first layer depth stream.

In other words, the encoder 602 stores pixel values (depth values) of the depth images of the first layer supplied from the quantization section 51 in a Y component in the YCbCr format for each of the six faces of the first layer, stores auxiliary information regarding the first layer supplied from the auxiliary information generation section 601 in the CbCr components in the YCbCr format, performs compression and encoding, and generates the first layer depth stream. The encoder 602 is similar to the encoder 52 in the first embodiment with respect to the first layer texture stream generated by compressing and encoding the texture images of each of the six faces of the first layer.

The encoder 603 is similar to the encoder 602 except that the layer subjected to compression and encoding is not the first layer but the second layer.

In other words, the encoder 603 compresses and encodes the texture images and the depth images of the six faces of the second layer per face and per image type to generate the second layer texture streams and the second layer depth streams, similarly to the encoder 55 in the first embodiment.

Here, the encoder 603 stores pixel values (depth values) of the depth images of the second layer supplied from the quantization section 54 in a Y component in the YCbCr format for each of the six faces of the second layer, stores auxiliary information regarding the second layer supplied from the auxiliary information generation section 601 in the CbCr components in the YCbCr format, performs compression and encoding, and generates the second layer depth stream. The encoder 603 is similar to the encoder 55 in the first embodiment with respect to the second layer texture stream generated by compressing and encoding the texture images of each of the six faces of the second layer.

(Example of Configuration of Encoder)

Figure 29:
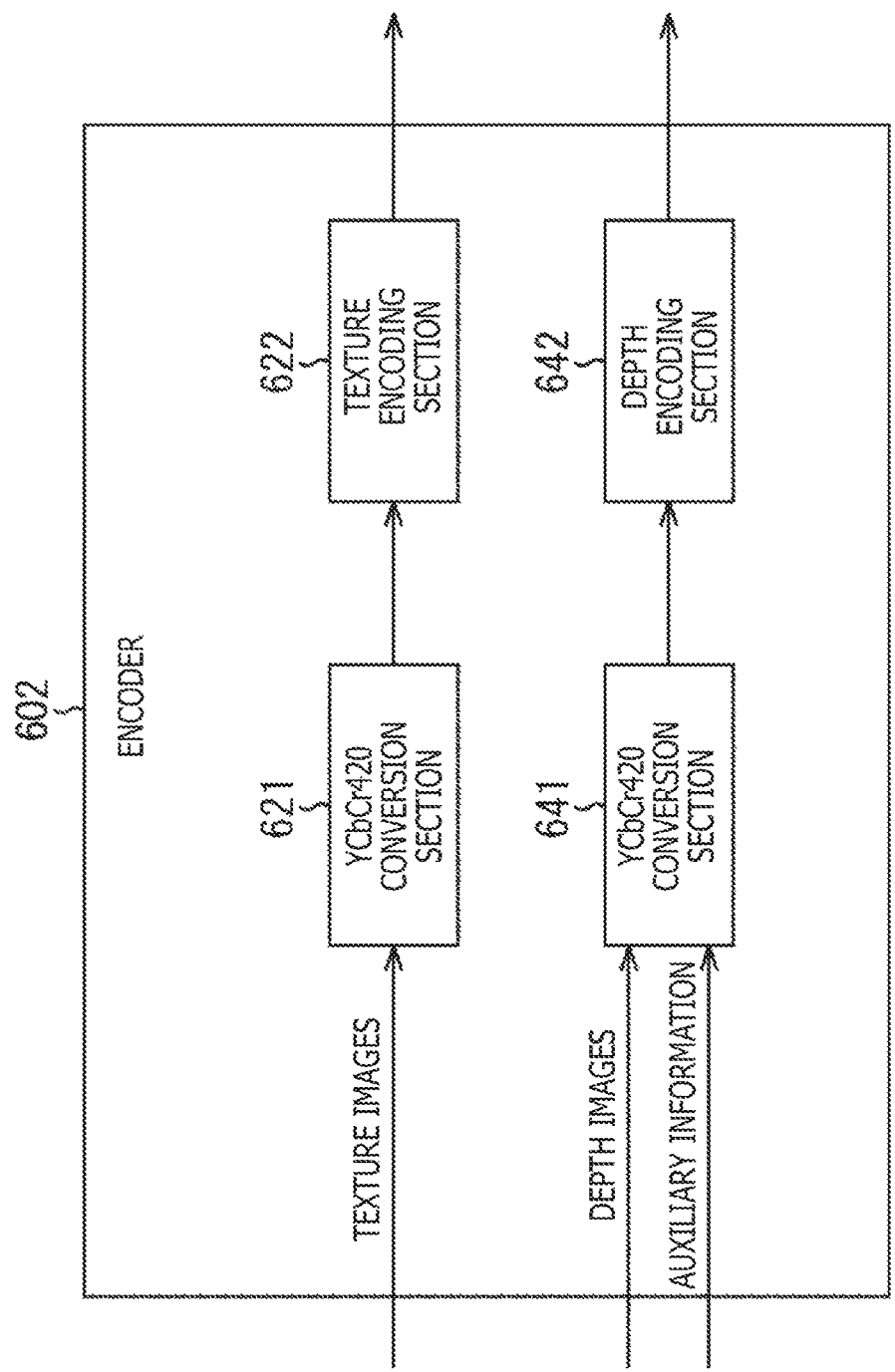
FIG. 29 is a block diagram depicting an example of a configuration of an encoder of FIG. 28.

FIG. 29 is a block diagram depicting an example of a configuration of the encoder 602 of FIG. 28.

The encoder 602 is configured with a YCbCr420 conversion section 621, a texture encoding section 622, a YCbCr420 conversion section 641, and a depth encoding section 642.

The YCbCr420 conversion section 621 converts (down-converts) the texture images in the YCbCr444 format of each of the six faces of the first layer supplied from the first layer generation section 50 into texture images in a YCbCr420 format, and supplies the resultant texture images to the texture encoding section 622.

In other words, the texture images of each of the six faces of the first layer are supplied from the first layer generation section 50 to the YCbCr420 conversion section 621 in the YCbCr444 format having the Y component, the Cb component, and the Cr component per pixel. The YCbCr420 conversion section 621 converts the texture images in the YCbCr444 format into the texture images in the YCbCr420 format having one Cb component and one Cr component for four pixels, and supplies the resultant texture images to the texture encoding section 622.

The texture encoding section 622 compresses and encodes the texture images in the YCbCr420 format by a predetermined encoding scheme such as H.265/HEVC, and supplies the compressed and coded texture images to the storage 58 to store therein the texture images.

The YCbCr420 conversion section 641 (image data generation section) stores the auxiliary information regarding the first layer supplied from the auxiliary information generation section 601 in the Cb component or the Cr component in the YCbCr444 format for the depth images of each of the six faces of the first layer supplied in the YCbCr444 format from the quantization section 51, and generates depth images in the YCbCr444 format. Pixel values of the depth images supplied from the quantization section 51 are stored in the Y component in the YCbCr444 format. The depth image regarding which the auxiliary information is stored in the Cb component or the Cr component will be referred to as "auxiliary information-added depth image," hereinafter.

Moreover, the YCbCr420 conversion section 641 converts (downconverts) the auxiliary information-added depth images in the YCbCr444 format into auxiliary information-added depth images in the YCbCr420 format having one Cb component and one Cr component for four pixels, and supplies the resultant auxiliary information-added depth images to the depth encoding section 642.

The depth encoding section 642 compresses and encodes the auxiliary information-added depth images in the YCbCr420 format by the predetermined encoding scheme such as H.265/HEVC, and supplies the compressed and coded auxiliary information-added depth images to the storage 58 to store therein the texture images.

The encoder 602 is configured as described so far. A detailed configuration of the encoder 603 is similar to that of the encoder 602.

(Example of Configuration of High Resolution Image Processing Section)

A 420 conversion process executed by the YCbCr420 conversion section 641 will next be described with reference to FIGS. 30A, 30B, 31, 32, 33, 34, 35 and 36.

As depicted in FIG. 30A, one color difference component (the Cr component and Cb component) is shared among 2×2, that is, four pixels in the YCbCr420 format.

It is assumed that the auxiliary information generated by the auxiliary information generation section 601 can take on N patterns of values (N types of values) per pixel of the texture images.

As depicted in FIG. 30B, the YCbCr420 conversion section 641 expresses a combination of the auxiliary information regarding two upper pixels out of the 2×2, that is, four pixels by N×N gradation values, and stores a gradation value as (a value of) the Cb component.

Furthermore, the YCbCr420 conversion section 641 expresses a combination of the auxiliary information regarding two lower pixels out of the 2×2, that is, four pixels by the N×N gradation values, and stores a gradation value as (a value of) the Cr component.

Each of the Cb component and the Cr component takes on any of gradation values (0, δ, 2δ, 3δ, . . . , and 255). It is noted, however, that δ=256/(N×N−1) and the gradation values of δ, 2δ, 3δ, and the like between 0 and 255 do not exceed 255.

Expressing the auxiliary information held by the 2×2, that is, four pixels by such gradation values makes it possible to expand an interval (gradation width) between the gradation values as much as possible, and to correctly discriminate the four pixels during decoding even if the four pixels are influenced by a codec-caused distortion.

Determining an intermediate value of each of the gradation values (0, δ, 2δ, 3δ, . . . , and 255) as a threshold makes it possible to correctly discriminate the auxiliary information held by the 2×2, that is, four pixels.

A case of N=2 will be described specifically.

It is assumed that the auxiliary information generation section 601 generates segmentation information that represents whether each pixel of the texture images is a pixel corresponding to the foreground or a pixel corresponding to the background as the auxiliary information, and supplies the segmentation information to the YCbCr420 conversion section 641.

In this case, the auxiliary information regarding each pixel takes on either the foreground or the background; thus, N=2.

As depicted in FIG. 31, the YCbCr420 conversion section 641 expresses a combination of the auxiliary information regarding the two upper pixels out of 2×2, that is, four pixels by 2×2, that is, four gradation values, and stores a gradation value in the Cb component.

Furthermore, the YCbCr420 conversion section 641 expresses a combination of the auxiliary information regarding the two lower pixels out of the 2×2, that is, four pixels by 2×2, that is, four gradation values, and stores a gradation value in the Cr component.

Each of the Cb component and the Cr component takes on any of the gradation values (0, 85, 170, and 255). Specifically, as depicted in FIG. 32, for example, the YCbCr420 conversion section 641 substitutes the gradation value 0 in a case in which the auxiliary information regarding the two pixels corresponding to the Cb component or the Cr component is (foreground, foreground), substitutes the gradation value 85 in a case of (foreground, background), substitutes the gradation value 170 in a case of (background, foreground), and substitutes the gradation value 255 in a case of (background, background).

Intermediate values 42.5, 127.5, and 212.5 of the gradation values (0, 85, 170, and 255) are used as thresholds for the reproducing side to determine the transmitted auxiliary information. In other words, in a case in which the gradation value obtained by decoding is equal to or greater than 0 and smaller than 42.5, it is discriminated that the auxiliary information regarding the two pixels is (foreground, foreground) corresponding to the gradation value 0. In a case in which the gradation value obtained by decoding is equal to or greater than 42.5 and smaller than 127.5, it is discriminated that the auxiliary information regarding the two pixels is (foreground, background) corresponding to the gradation value 85. In a case in which the gradation value obtained by decoding is equal to or greater than 127.5 and smaller than 212.5, it is discriminated that the auxiliary information regarding the two pixels is (background, foreground) corresponding to the gradation value 170. In a case in which the gradation value obtained by decoding is equal to or greater than 212.5 and equal to or smaller than 255, it is discriminated that the auxiliary information regarding the two pixels is (background, background) corresponding to the gradation value 255.

Figure 33:
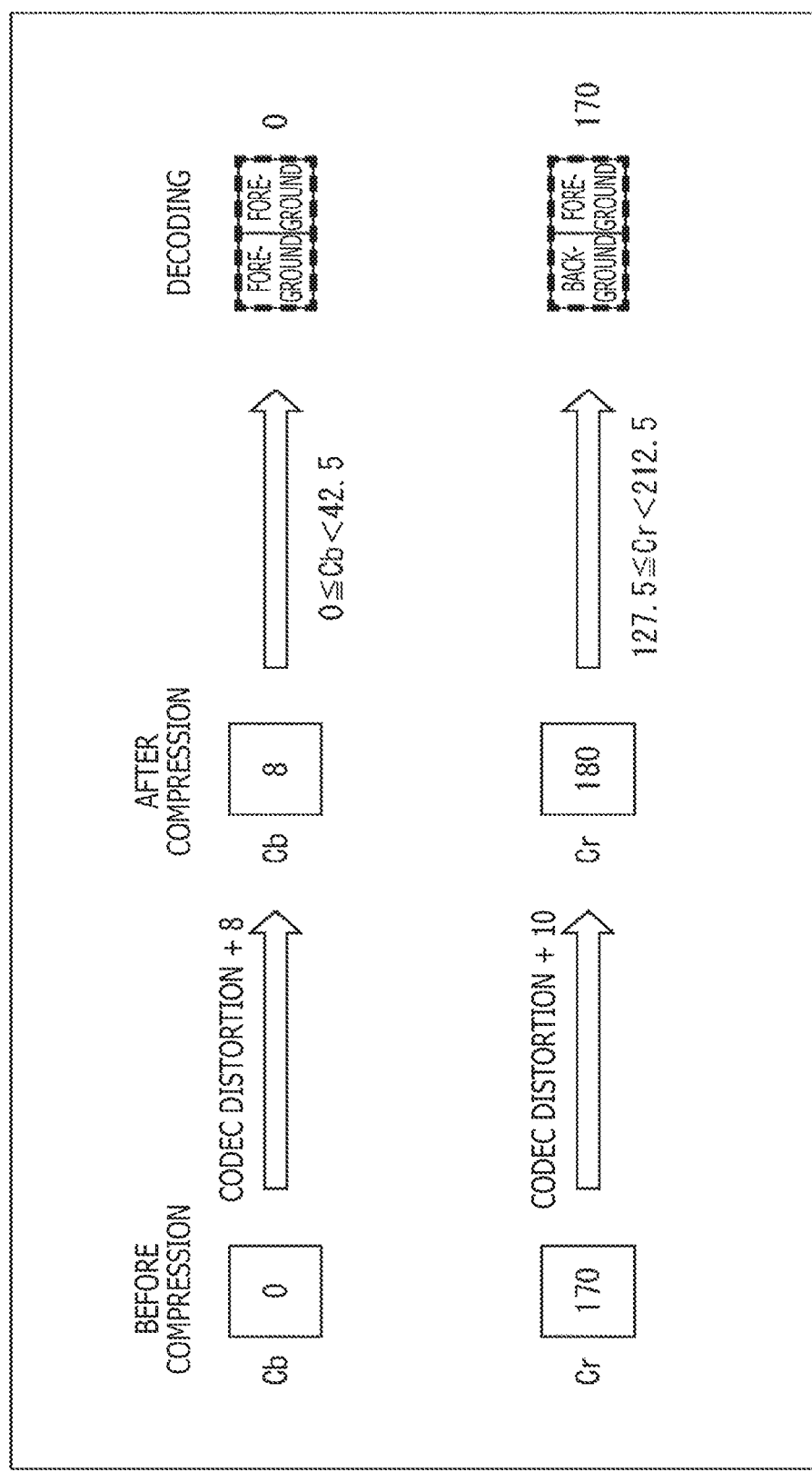
FIG. 33 is an explanatory diagram of the 420 conversion process in the case of N=2.

As depicted in FIG. 33, it is assumed, for example, that the gradation value 0 is set as the Cb component before compression and encoding is changed to 8 due to a codec distortion. Even in this case, the reproducing side can discriminate that the auxiliary information is (foreground, foreground) corresponding to the gradation value 0 since the gradation value obtained by decoding is equal to or greater than 0 and smaller than 42.5.

Likewise, it is assumed that the gradation value 170 is set as the Cr component before compression and encoding is changed to 180 due to a codec distortion. Even in this case, the reproducing side can discriminate that the auxiliary information regarding the two pixels is (background, foreground) corresponding to the gradation value 170 since the gradation value obtained by decoding is equal to or greater than 127.5 and smaller than 212.5. It is assumed that it is known to the reproducing side that the auxiliary information can take on N patterns of values (N types of values).

A case of N=3 will next be described specifically.

The auxiliary information generation section 601 classifies the texture images into three regions, and any of segment IDs=0, 1, and 2 is allocated to each pixel of the texture images on the basis of a classification result. The auxiliary information generation section 601 supplies the segmentation information that represents any of the segment IDs=0, 1, and 2 to the YCbCr420 conversion section 641 as the auxiliary information.

In this case, the auxiliary information regarding each pixel takes on any of the segment IDs=0, 1, and 2; thus, N=3.

Figure 34:
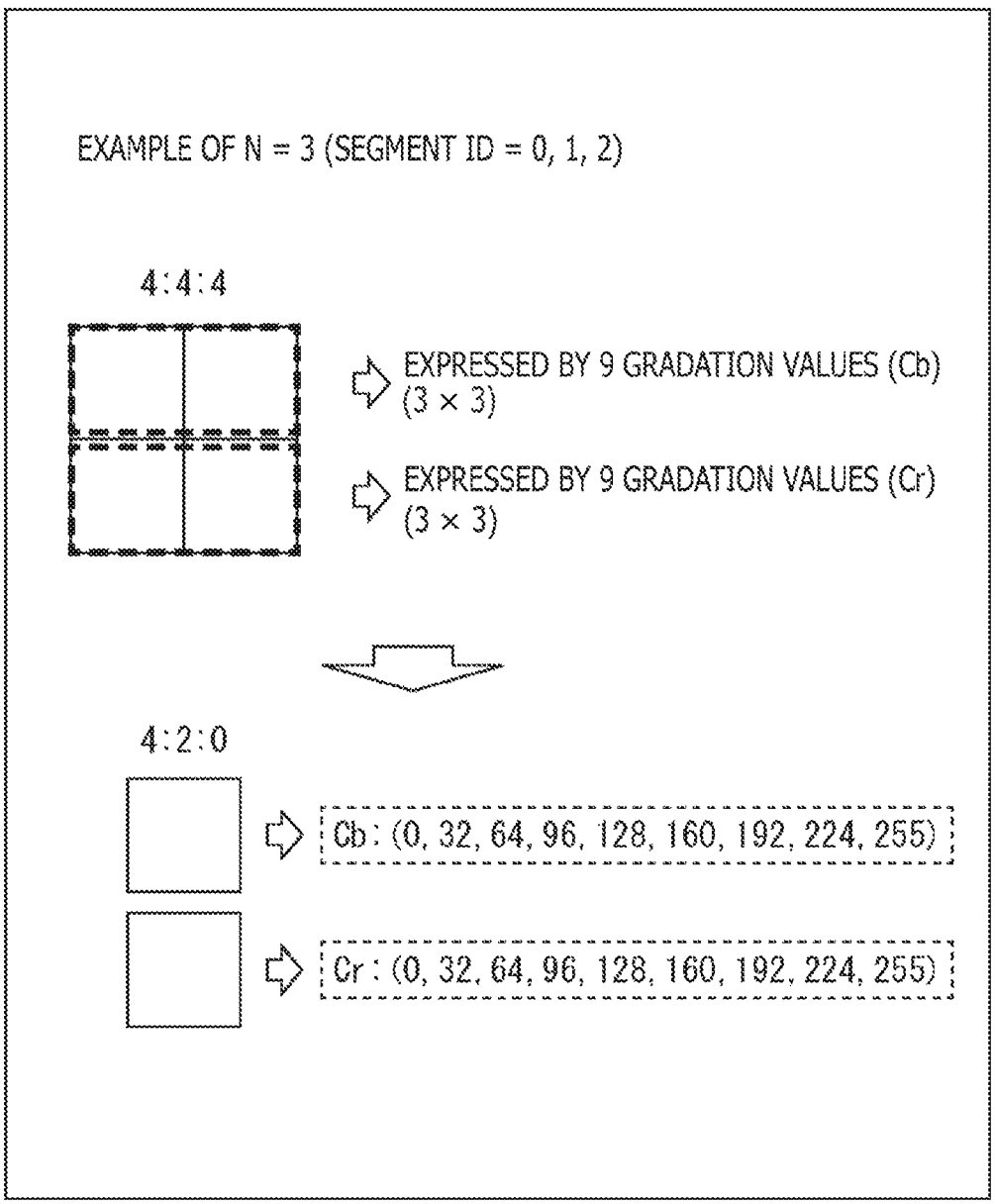
FIG. 34 is an explanatory diagram of the 420 conversion process in a case of N=3.

As depicted in FIG. 34, the YCbCr420 conversion section 641 expresses a combination of the auxiliary information regarding the two upper pixels out of 2×2, that is, four pixels by 3×3, that is, nine gradation values, and stores a gradation value in the Cb component.

Furthermore, the YCbCr420 conversion section 641 expresses a combination of the auxiliary information regarding the two lower pixels out of the 2×2, that is, four pixels by 3×3, that is, nine gradation values, and stores a gradation value in the Cr component.

Each of the Cb component and the Cr component takes on any of gradation values (0, 32, 64, 96, 128, 160, 192, 224, and 255). Specifically, as depicted in FIG. 35, for example, the YCbCr420 conversion section 641 substitutes the gradation value 0 in a case in which the segment ID of the two pixels corresponding to the Cb component or the Cr component is (0,0), substitutes the gradation value 32 in a case of (0,1), substitutes the gradation value 64 in a case of (0,2), and substitutes the gradation value 96 in a case of (1,0).

Likewise, the YCbCr420 conversion section 641 substitutes the gradation value 128 in a case in which the segment ID of the two pixels corresponding to the Cb component or the Cr component is (1,1), substitutes the gradation value 160 in a case of (1,2), substitutes the gradation value 192 in a case of (2,0), substitutes the gradation value 224 in a case of (2,1), and substitutes the gradation value 255 in a case of (2,2).

Intermediate values 16, 48, 80, 112, 144, 176, 208, and 240 of the gradation values (0, 32, 64, 96, 128, 160, 192, 224, and 255) are used as thresholds for the reproducing side to determine the transmitted auxiliary information.

Figure 36:
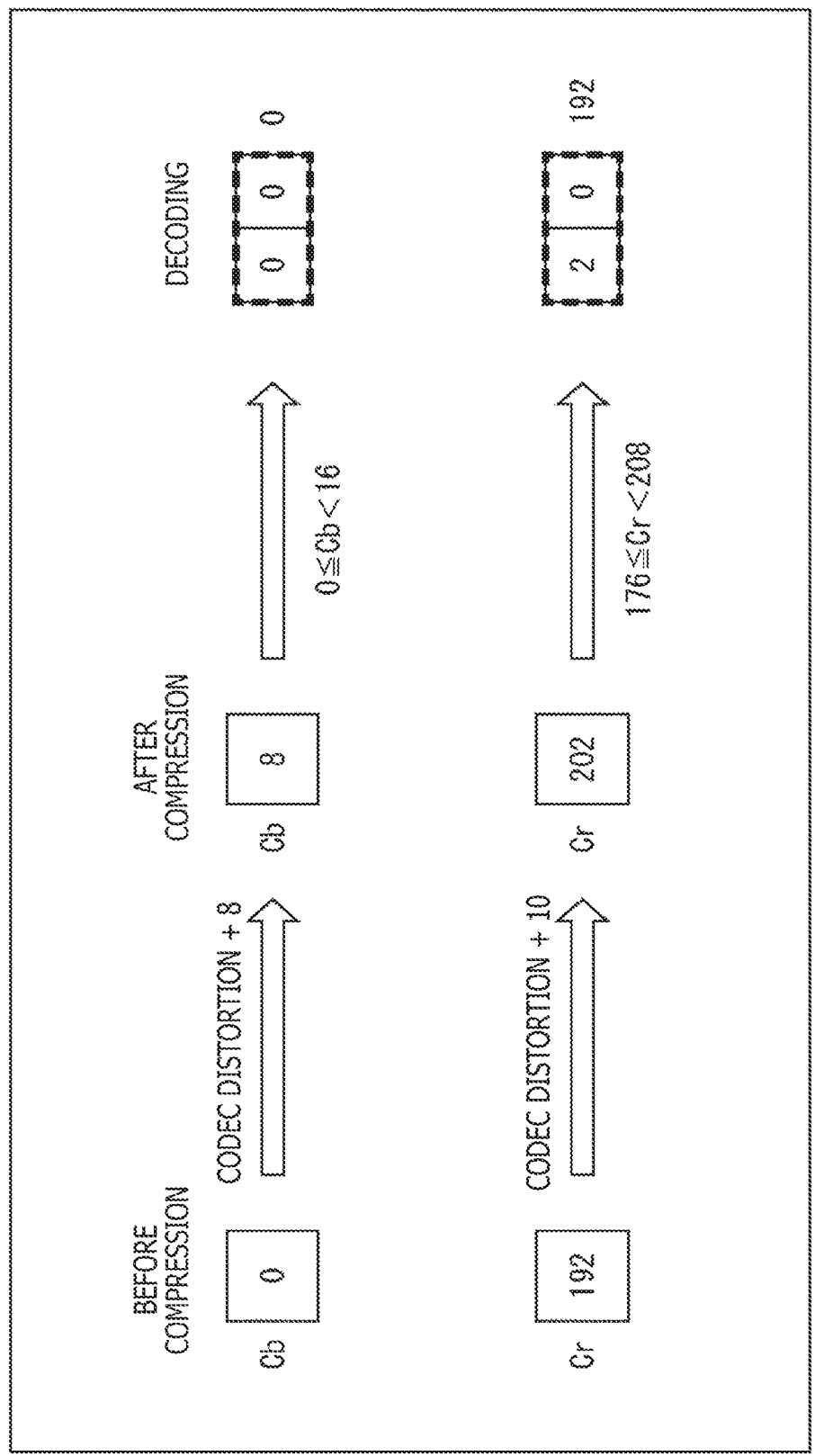
FIG. 36 is an explanatory diagram of the 420 conversion process in the case of N=3.

As depicted in FIG. 36, it is assumed, for example, that the gradation value 0 set as the Cb component before compression and encoding is changed to 8 due to a codec distortion. Even in this case, the reproducing side can discriminate that the auxiliary information is the segment ID=(0,0) corresponding to the gradation value 0 since the gradation value obtained by decoding is equal to or greater than 0 and smaller than 16.

Likewise, it is assumed that the gradation value 192 is set for the Cr component before compression and encoding is changed to 202 due to a codec distortion. Even in this case, the reproducing side can discriminate that the auxiliary information regarding the two pixels is the segment ID=(2, 0) corresponding to the gradation value 192 since the gradation value obtained by decoding is equal to or greater than 176 and smaller than 208.

As described so far, the YCbCr420 conversion section 641 stores the gradation value by converting the combination of the auxiliary information regarding the two upper pixels out of the 2×2, that is, four pixels into any of the N×N gradation values in the Cb component, and stores the gradation value by converting the combination of the auxiliary information regarding the two lower pixels into any of the N×N gradation values in the Cr component.

In general, the YCbCr420 format is adopted as a motion video input type format in the compression and encoding scheme such as H.264/MPEG-4 AVC, H.265/HEVC, and MPEG2. As described above, in the YCbCr420 format, the color difference (the Cr component and the Cb component) is shared among the 2×2, that is, four pixels; thus, deterioration of information occurs.

However, as described above, converting the combination of the auxiliary information regarding the two pixels into any of the N×N gradation values and storing the gradation value in each of the Cb component and the Cb component make it possible for the reproducing side to correctly discriminate the auxiliary information even in a case of occurrence of deterioration of information due to the YCbCr420 format and the codec distortion. In other words, lossless transmission of the auxiliary information can be achieved.

(Explanation of Process Performed by Encoder)

Figure 37:
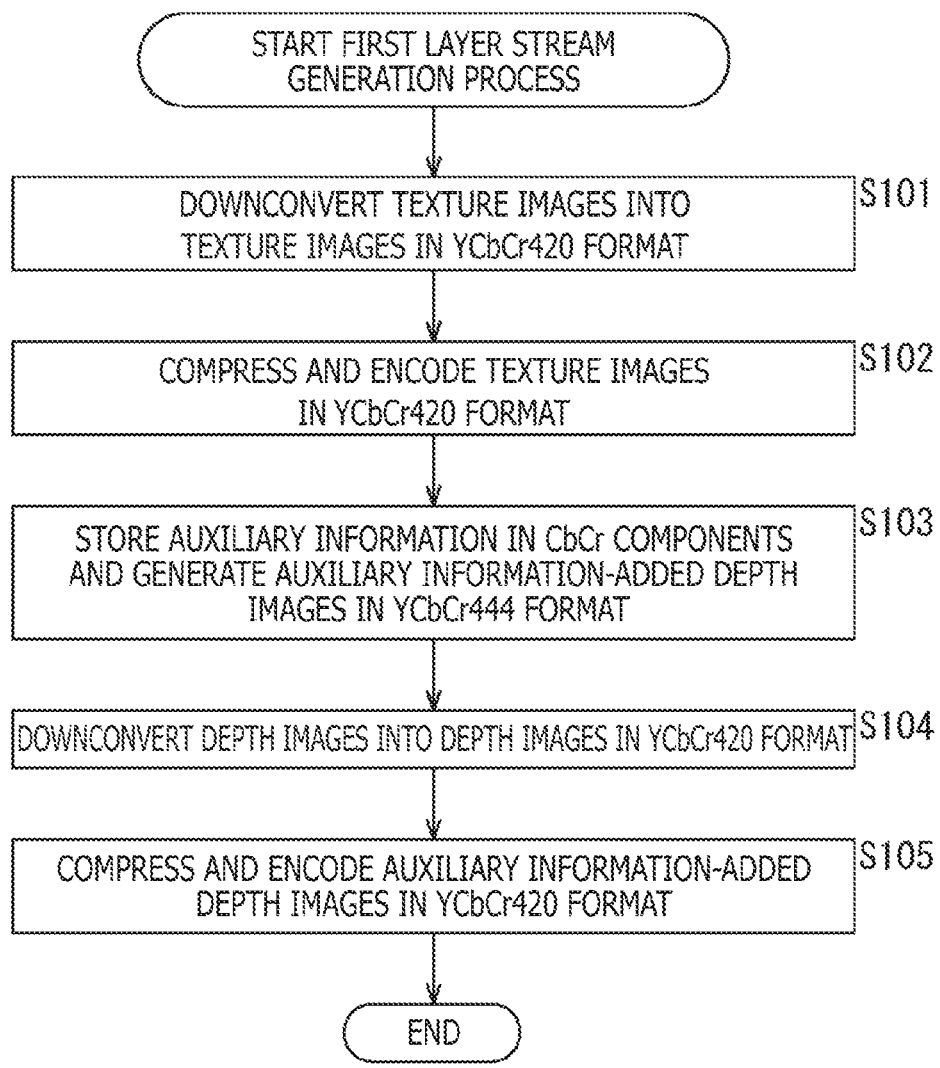
FIG. 37 is an explanatory flowchart of a first layer stream generation process according to the second embodiment.

FIG. 37 is an explanatory flowchart of a first layer stream generation process performed by the encoder 602 of FIG. 29 for generating the first layer texture streams and the first layer depth streams. Before start of this process, the texture images and the depth images of the six faces of the first layer and the auxiliary information to be utilized for the texture images or the depth images of the first layer are supplied to the encoder 602.

First, in Step S101, the YCbCr420 conversion section 621 downconverts the texture images of the predetermined face out of the six faces of the first layer supplied in the YCbCr444 format from the first layer generation section 50 into the texture images in the YCbCr420 format, and supplies the resultant texture images to the texture encoding section 622.

In Step S102, the texture encoding section 622 compresses and encodes the texture images in the YCbCr420 format by the predetermined encoding scheme such as H.265/HEVC, and supplies the resultant texture images as the first layer texture stream of the predetermined face of the first layer to the storage 58 to store therein the first layer texture stream.

In Step S103, the YCbCr420 conversion section 641 stores, for the depth images of the predetermined face out of the six faces of the first layer supplied in the YCbCr444 format from the quantization section 51, the auxiliary information supplied from the auxiliary information generation section 601 and corresponding to each pixel of the depth images of the first layer in the CbCr components in the YCbCr444 format, and generates the auxiliary information-added depth images in the YCbCr444 format. The auxiliary information is stored, for example, in either the Cb component or the Cr component in the YCbCr444 format.

In Step S104, the YCbCr420 conversion section 641 downconverts the auxiliary information-added depth images in the YCbCr444 format into the auxiliary information-added depth images in the YCbCr420 format having one Cb component and one Cr component for four pixels, and supplies the resultant depth images to the depth encoding section 642.

In Step S105, the depth encoding section 642 compresses and encodes the auxiliary information-added depth images in the YCbCr420 format supplied from the YCbCr420 conversion section 641 by the predetermined encoding scheme, and supplies the resultant depth images to the storage 58 as the first layer depth stream of the predetermined face of the first layer to store therein the first layer depth stream.

The first layer stream generation process described so far is executed to all the six faces of the first layer supplied from the first layer generation section 50. The first layer stream generation process may be executed to the six faces either in sequence or in parallel. The first layer stream generation process of FIG. 38 for all the six faces corresponds to the process in Step S19 of the stream generation process described with reference to FIG. 18.

Figure 38:
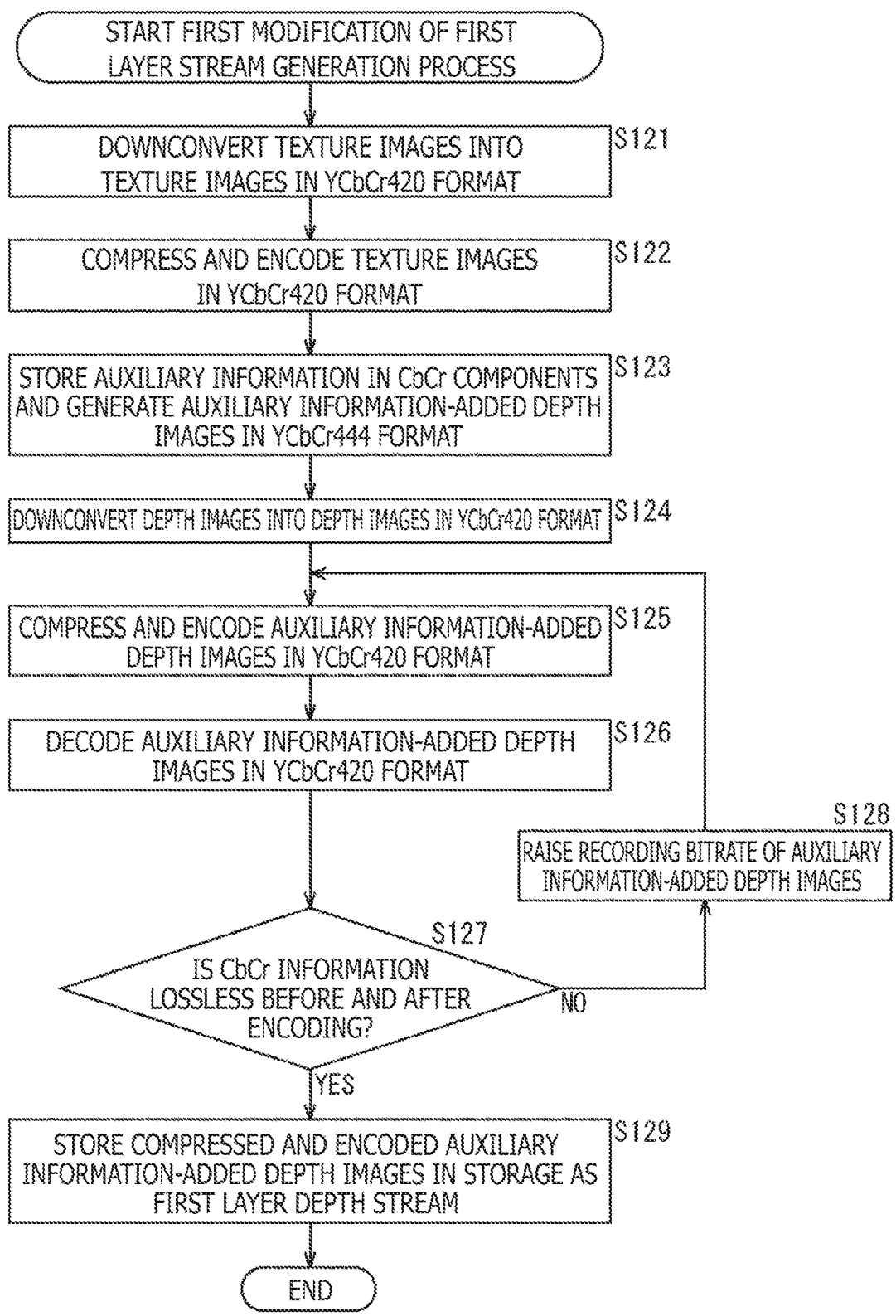
FIG. 38 is an explanatory flowchart of a first modification of the first layer stream generation process of FIG. 37.

FIG. 38 is an explanatory flowchart of a first modification of the first layer stream generation process.

Since Steps S121 to S124 of FIG. 38 are similar to Steps S101 to S104 of FIG. 37, explanation thereof will be omitted.

In Step S125, the depth encoding section 642 compresses and encodes the auxiliary information-added depth images in the YCbCr420 format supplied from the YCbCr420 conversion section 641 by the predetermined encoding scheme such as H.265/HEVC.

In Step S126, the depth encoding section 642 decodes the compressed and encoded auxiliary information-added depth images.

In Step S127, the depth encoding section 642 determines whether the auxiliary information (CbCr information) stored in the CbCr components is lossless before and after encoding. In other words, the depth encoding section 642 determines whether the compressed and encoded first layer depth stream has the same gradation values as those before encoding with the intermediate values of the gradation values before encoding assumed as the thresholds.

In a case in which it is determined in Step S127 that the CbCr information is not lossless before and after encoding, the process goes to Step S128, in which the depth encoding section 642 raises a recording bitrate of the auxiliary information-added depth images by a predetermined amount.

After Step S128, the process returns to Step S125, and the process is repeated from Step S125 to Step S127 described above. In Steps S125 to S127, the auxiliary information-added depth images in the YCbCr420 format are compressed and encoded at the recording bitrate changed in Step S128, and it is determined whether or not the CbCr information is lossless before and after encoding.

On the other hand, in a case in which it is determined in Step S127 that the CbCr information is lossless before and after encoding, the process goes to Step S129, in which the depth encoding section 642 supplies the compressed and encoded auxiliary information-added depth images in the YCbCr420 format to the storage 58 as the first layer depth stream of the predetermined face of the first layer to store therein the first layer depth stream.

According to the first modification of the first layer stream generation process, it is determined whether or not the CbCr information is lossless before and after encoding, and the recording bitrate of the auxiliary information-added depth images is changed (raised) such that the CbCr information becomes lossless before and after encoding in the case in which it is determined that the CbCr information is not lossless.

Figure 39:
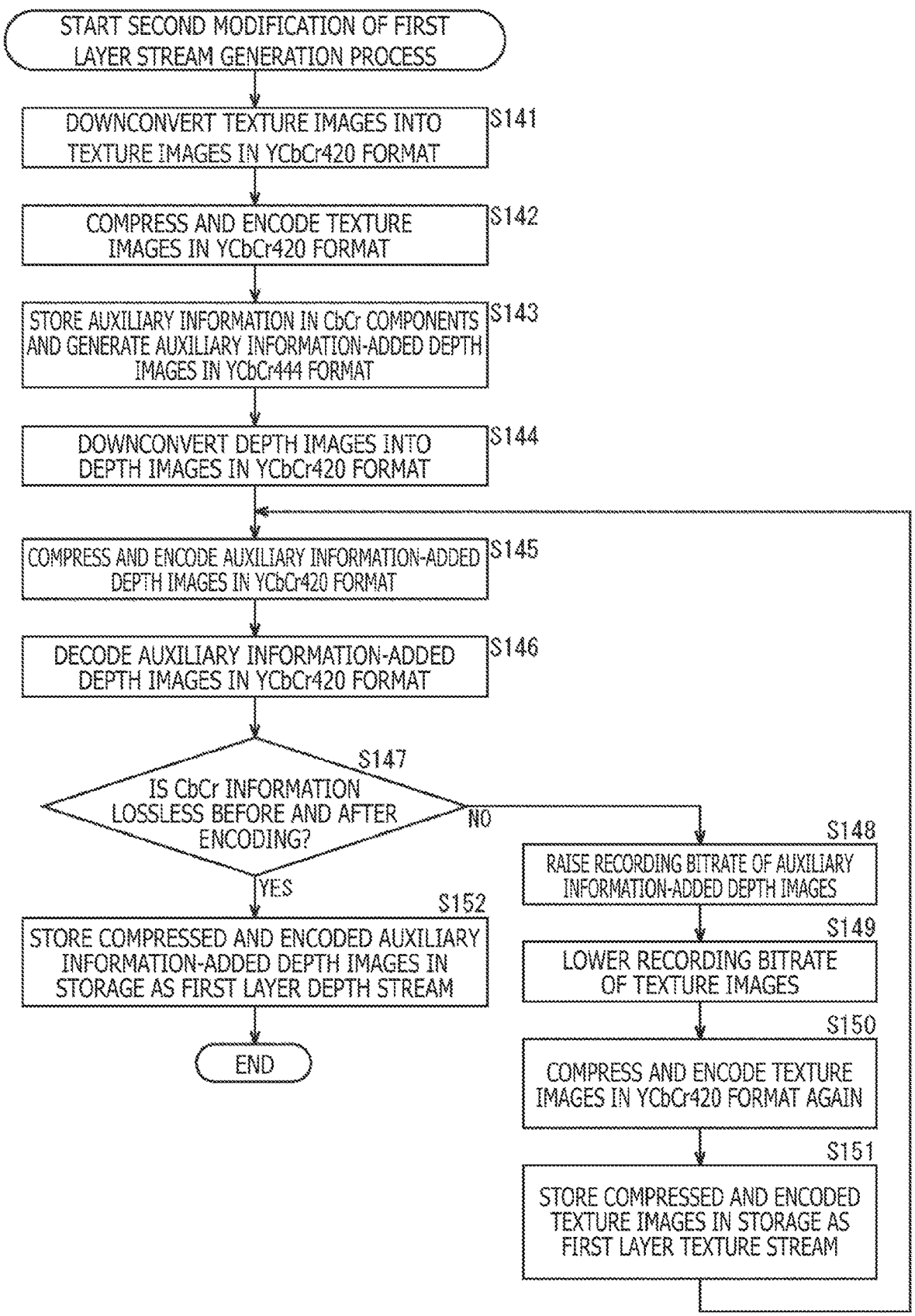
FIG. 39 is an explanatory flowchart of a second modification of the first layer stream generation process of FIG. 37.

FIG. 39 is an explanatory flowchart of a second modification of the first layer stream generation process.

Since Steps S141 to S148 of FIG. 39 are similar to Steps S121 to S128 in the first modification described with reference to FIG. 38, respectively, explanation thereof will be omitted.

In Step S148, after the recording bitrate of the auxiliary information-added depth images is changed to be raised, the texture encoding section 622 lowers the recording bitrate of the texture images by a predetermined amount in next Step S149.

in Step S150, the texture encoding section 622 compresses and encodes the texture images in the YCbCr420 format again at the recording bitrate changed in Step S149.

In Step S151, the texture encoding section 622 supplies the compressed and encoded texture images to the storage 58 as the first layer texture stream of the predetermined face of the first layer to store therein the first layer texture stream.

The first layer texture stream generated by changing the recording bitrate is stored in the storage 58 in such a manner as to be overwritten on the first layer texture stream stored in Step S142.

After Step S151, the process returns to Step S145, and the process is repeated from Step S145 to Step S147 described above. In Steps S145 to S147, the auxiliary information-added depth images in the YCbCr420 format are compressed and encoded at the recording bitrate changed in Step S148, and it is determined whether or not the CbCr information is lossless before and after encoding.

On the other hand, in a case in which it is determined in Step S147 that the CbCr information is lossless before and after encoding, the process goes to Step S152, in which the depth encoding section 642 supplies the compressed and encoded auxiliary information-added depth images in the YCbCr420 format to the storage 58 as the first layer depth stream of the predetermined face of the first layer to store therein the first layer depth stream.

According to the second modification of the first layer stream generation process, it is determined whether or not the CbCr information is lossless before and after encoding, and the recording bitrate of the auxiliary information-added depth images is raised and the recording bitrate of the texture images is lowered such that the CbCr information becomes lossless before and after encoding in the case in which it is determined that the CbCr information is not lossless. This can maintain the recording bitrate of entire first layer streams as a combination of the first layer texture stream and the first layer depth stream.

Figure 40:
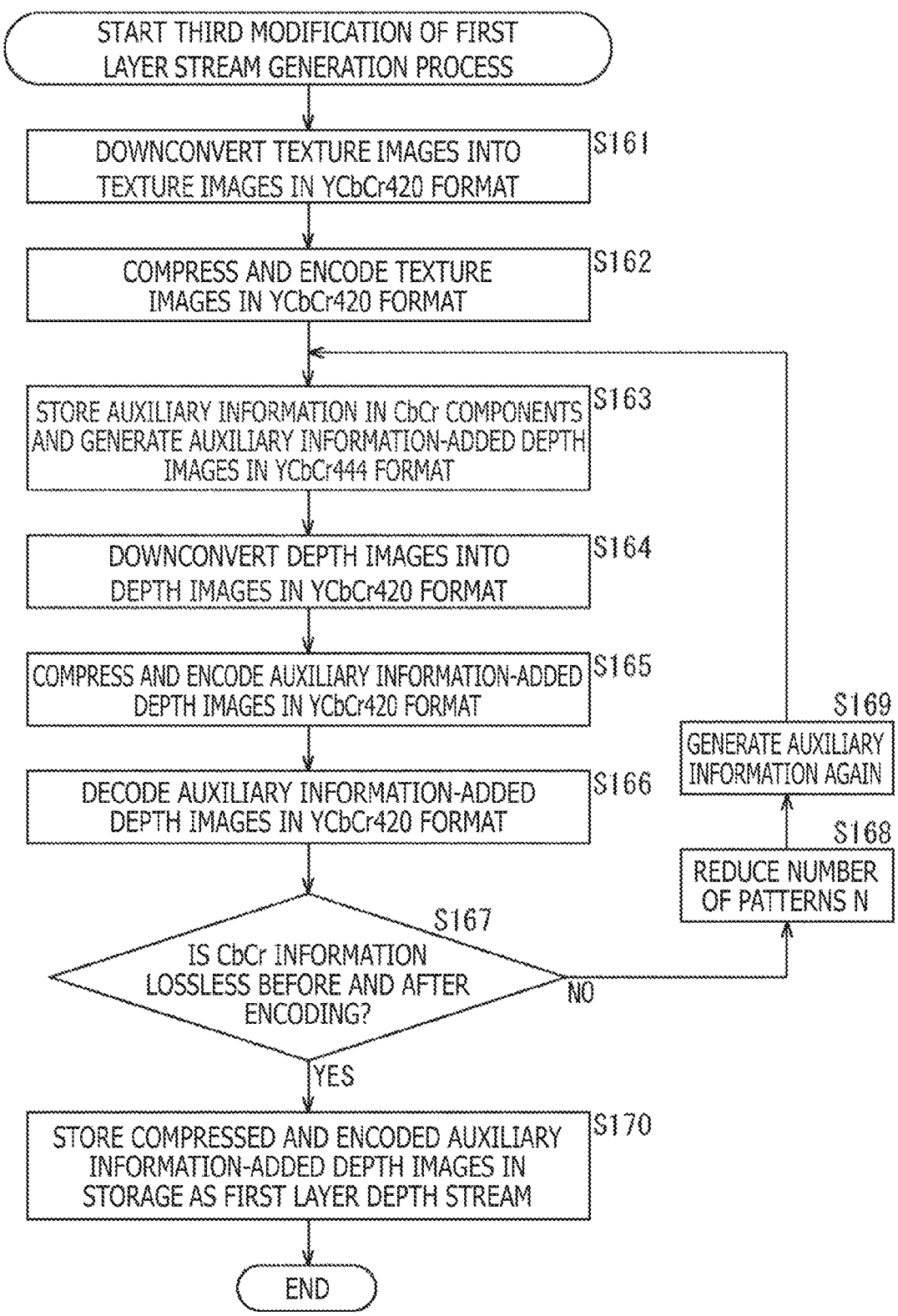
FIG. 40 is an explanatory flowchart of a third modification of the first layer stream generation process of FIG. 37.

FIG. 40 is an explanatory flowchart of a third modification of the first layer stream generation process.

Since Steps S161 to S167 of FIG. 40 are similar to Steps S121 to S127 of FIG. 38, explanation thereof will be omitted.

In a case in which it is determined in Step S167 that the CbCr information is not lossless before and after encoding, the process goes to Step S168, in which the depth encoding section 642 instructs the auxiliary information generation section 601 to reduce the number of patterns N that can be taken on by the auxiliary information. The auxiliary information generation section 601 reduces the number of patterns N.

In Step S169, the auxiliary information generation section 601 generates the auxiliary information again with the changed number of patterns N. The re-generated auxiliary information is supplied to the YCbCr420 conversion section 641 in the encoder 602.

After Step S169, the process returns to Step S163, and the process is repeated from Step S163 to Step S167 described above. In Steps S163 to S167, the re-generated auxiliary information is stored in the CbCr components, the auxiliary information-added depth images in the YCbCr420 format are compressed and encoded, and it is determined whether or not the CbCr information is lossless before and after encoding.

In a case in which it is determined in Step S167 that the CbCr information is lossless before and after encoding, the process goes to Step S170, in which the depth encoding section 642 supplies the compressed and encoded auxiliary information-added depth images in the YCbCr420 format to the storage 58 as the first layer depth stream of the predetermined face of the first layer to store therein the first layer depth stream.

According to the third modification of the first layer stream generation process, it is determined whether or not the CbCr information is lossless before and after encoding, and the number of patterns N that can be taken on by the auxiliary information is reduced, the auxiliary information-added depth images are compressed and encoded, and the resultant depth images are stored in the storage 58 in the case in which it is determined that the CbCr information is not lossless.

A second layer stream generation process executed by the encoder 603 is similar to the first layer stream generation process described above except that the layer to be processed is changed from the first layer to the second layer; thus, explanation will be omitted.

The reproducing-side home server 13 will next be described.

(Example of Configuration of ML 3D Model Generation Section)

Figure 41:
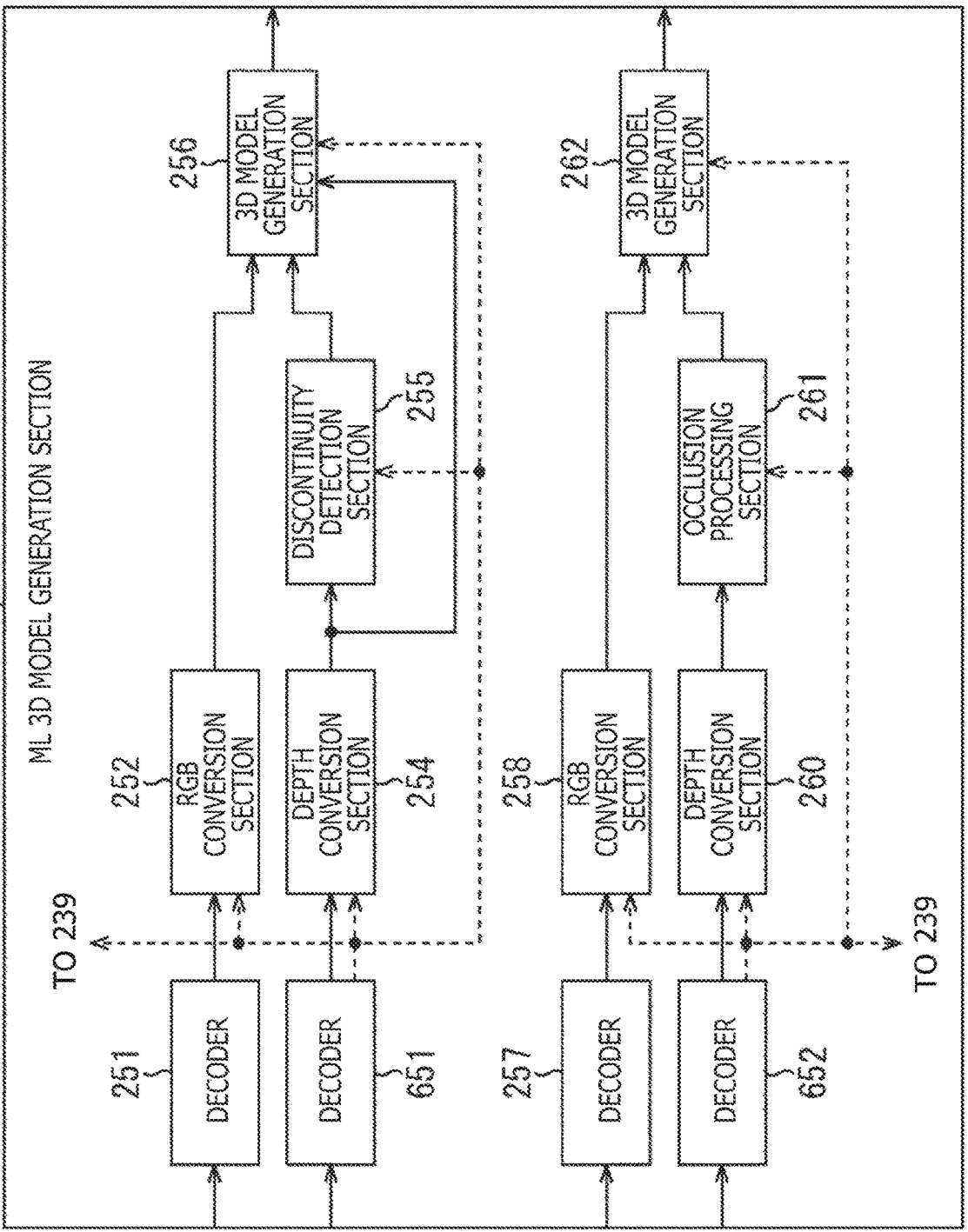
FIG. 41 is a block diagram depicting an example of a configuration of an ML 3D model generation section in the second embodiment of the image display system.

FIG. 41 is a block diagram depicting an example of a configuration of the ML 3D model generation section 235 in the second embodiment.

Comparison with the first embodiment depicted in FIG. 20 indicates that the decoders 253 and 259 of FIG. 20 are replaced by decoders 651 and 652, respectively.

The decoder 651 functions similarly to the decoder 253 of the first embodiment in that the decoder 651 acquires the first layer depth stream supplied from the visual line detecting section 234, decodes the first layer depth stream by a scheme corresponding to the encoding scheme used in compression and encoding, and generates the depth images of the first layer.

On the other hand, the decoder 651 differs from the decoder 253 of the first embodiment in that the first layer depth stream received by the decoder 651 is the auxiliary information-added depth images in the YCbCr420 format in which the auxiliary information is stored in the CbCr components in the YCbCr420 format, and that the decoder 651 extracts the auxiliary information obtained by decoding.

The decoder 651 supplies the acquired auxiliary information to a processing section that executes a predetermined image process utilizing the auxiliary information. In a case, for example, in which the auxiliary information is used in a process for converting the RGB values of the texture images of the first layer, the acquired auxiliary information is supplied to the RGB conversion section 252. In a case, for example, in which the auxiliary information is used in an inverse quantization process on the depth images of the first layer, the acquired auxiliary information is supplied to the depth conversion section 254. In a case, for example, in which the auxiliary information is information used in generating the three-dimensional data of the first layer, the acquired auxiliary information is supplied to the 3D model generation section 256. In a case, for example, in which the auxiliary information is information used in detecting the discontinuous pixel of the depth images of the first layer, the acquired auxiliary information is supplied to the discontinuity detection section 255. In a case, for example, in which the auxiliary information is information used in generating the display image of the first layer, the acquired auxiliary information is supplied to the rendering section 239 (FIG. 19).

The decoder 652 performs a second layer stream generation process similar to the first layer stream generation process described above except that the layer to be processed is changed from the first layer to the second layer; thus, explanation will be omitted. It is noted, however, that a processing section to which the extracted auxiliary information can be supplied is any of the RGB conversion section 258, the depth conversion section 260, the occlusion processing section 261, the 3D model generation section 262, and the rendering section 239.

Figure 42:
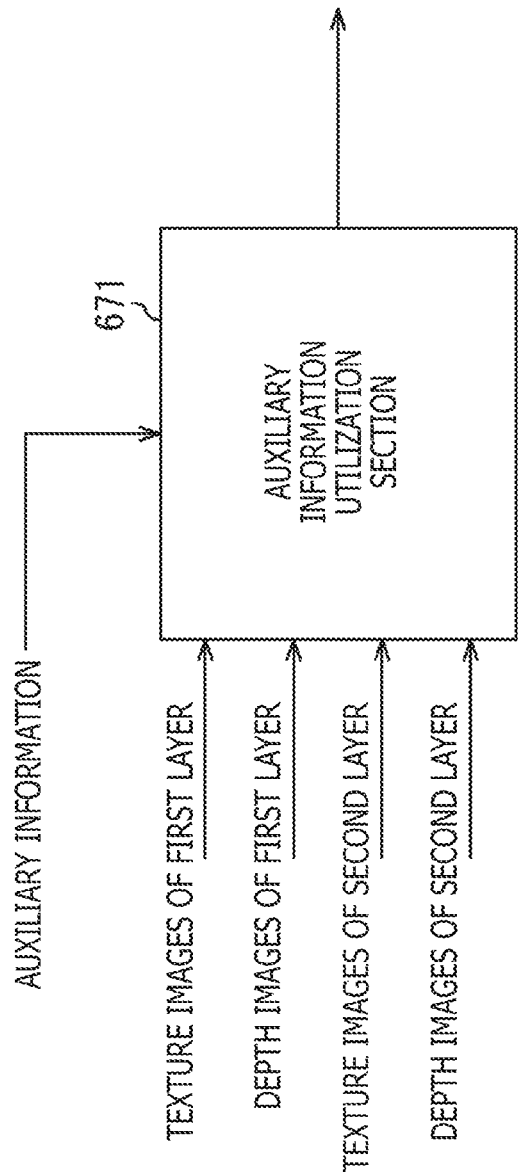
FIG. 42 is a functional block diagram related to utilization of auxiliary information.

The processing section that executes the predetermined image process utilizing the auxiliary information regarding the first layer supplied from the decoder 651 functions as an auxiliary information utilization section 671 depicted in FIG. 42.

The data to be processed that is processed using the auxiliary information such as the texture images of the first layer, the depth images of the first layer, the texture images of the second layer, and the depth images of the second layer is supplied to the auxiliary information utilization section 671 separately from the auxiliary information.

The auxiliary information utilization section 671 executes the predetermined image process using the auxiliary information on at least one of the texture images and the depth images of the first layer and the texture images and the depth images of the second layer.

As described above, this auxiliary information utilization section 671 corresponds to any one of the RGB conversion section 252 or 258, the depth conversion section 254 or 260, the discontinuity detection section 255, the occlusion processing section 261, the 3D model generation section 256 or 262, or the rendering section 239 depending on a type of the auxiliary information.

(Explanation of Process Performed by Decoder)

Figure 43:
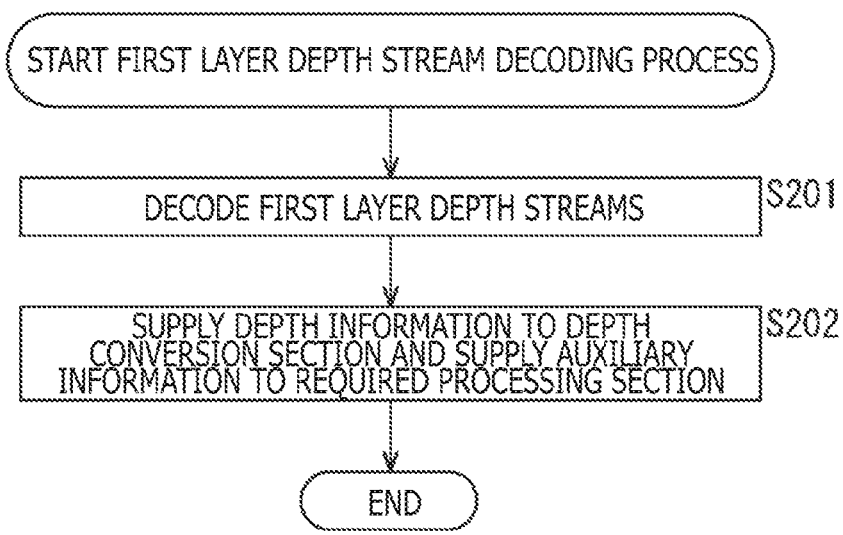
FIG. 43 is an explanatory flowchart of a first layer depth stream decoding process according to the second embodiment.

FIG. 43 is an explanatory flowchart of a first layer depth stream decoding process performed by the decoder 651 of FIG. 41 for decoding the first layer depth streams. This process corresponds to the process in Step S73 of the three-dimensional data generation process of FIG. 27 in the first embodiment.

First, in Step S201, the decoder 651 decodes the first layer depth streams supplied from the visual line detecting section 234. The depth images of the first layer stored in the Y component in the YCbCr420 format and the auxiliary information stored in the CbCr components are thereby obtained.

In Step S202, the decoder 651 supplies the depth images of the first layer stored in the Y component in the YCbCr420 format to the depth conversion section 254, and supplies the auxiliary information regarding the first layer stored in the CbCr components to the processing section that executes the predetermined image process utilizing the auxiliary information.

A second layer depth stream decoding process executed by the decoder 652 is similar to the first layer depth stream decoding process described above except that the layer to be processed is changed from the first layer to the second layer; thus, explanation will be omitted.

Figure 44:
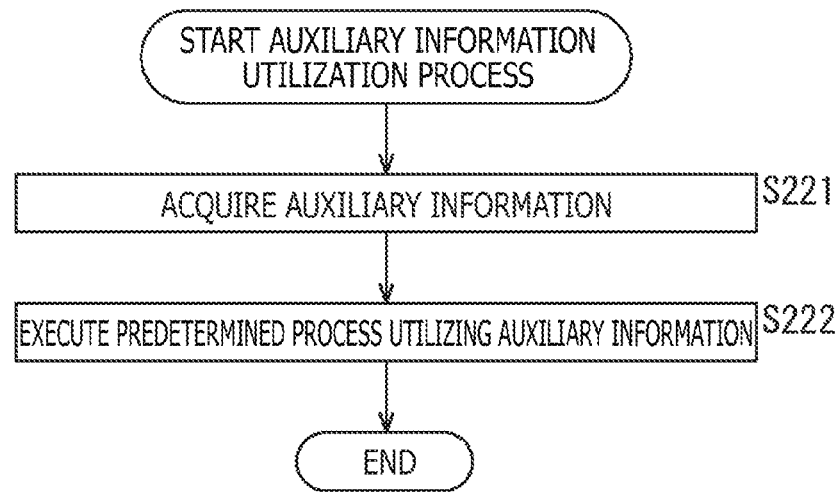
FIG. 44 is an explanatory flowchart of an auxiliary information utilization process.

FIG. 44 is an explanatory flowchart of an auxiliary information utilization process executed by the predetermined processing section that functions as the auxiliary information utilization section 671.

First, in Step S221, the auxiliary information utilization section 671 acquires the auxiliary information supplied from the decoder 651.

In Step S222, the auxiliary information utilization section 671 executes the predetermined image process (auxiliary information utilization process) utilizing the acquired auxiliary information.

(Specific Examples of Auxiliary Information)

Specific examples of the auxiliary information will next be described.

FIG. 45 depicts an example of storing, as the auxiliary information, the segmentation information that represents whether each pixel of the texture image is a pixel corresponding to the foreground (object) or a pixel corresponding to the background.

In the example of FIG. 45, the segment ID can take on any of a value "0" (segment ID=0) indicating the background and a value "1" (segment ID=1) indicating the foreground. An image of the auxiliary information depicted in FIG. 45 is an image in which "0" is allocated to the segment ID=0 indicating the background and "255" is allocated to the segment ID=1 indicating the foreground.

In this case, the value that can be taken on by the auxiliary information regarding each pixel in the YCbCr444 format is "0" or "1"; thus, N=2. In the case of N=2, the auxiliary information downconverted into that in the YCbCr420 format takes on any of the gradation values (0, 85, 170, and 255) as described with reference to FIGS. 31 to 33.

Using such auxiliary information makes it possible to solve a problem, for example, that the foreground and the background cannot be accurately separated only with the texture image and the depth image.

Figure 46:
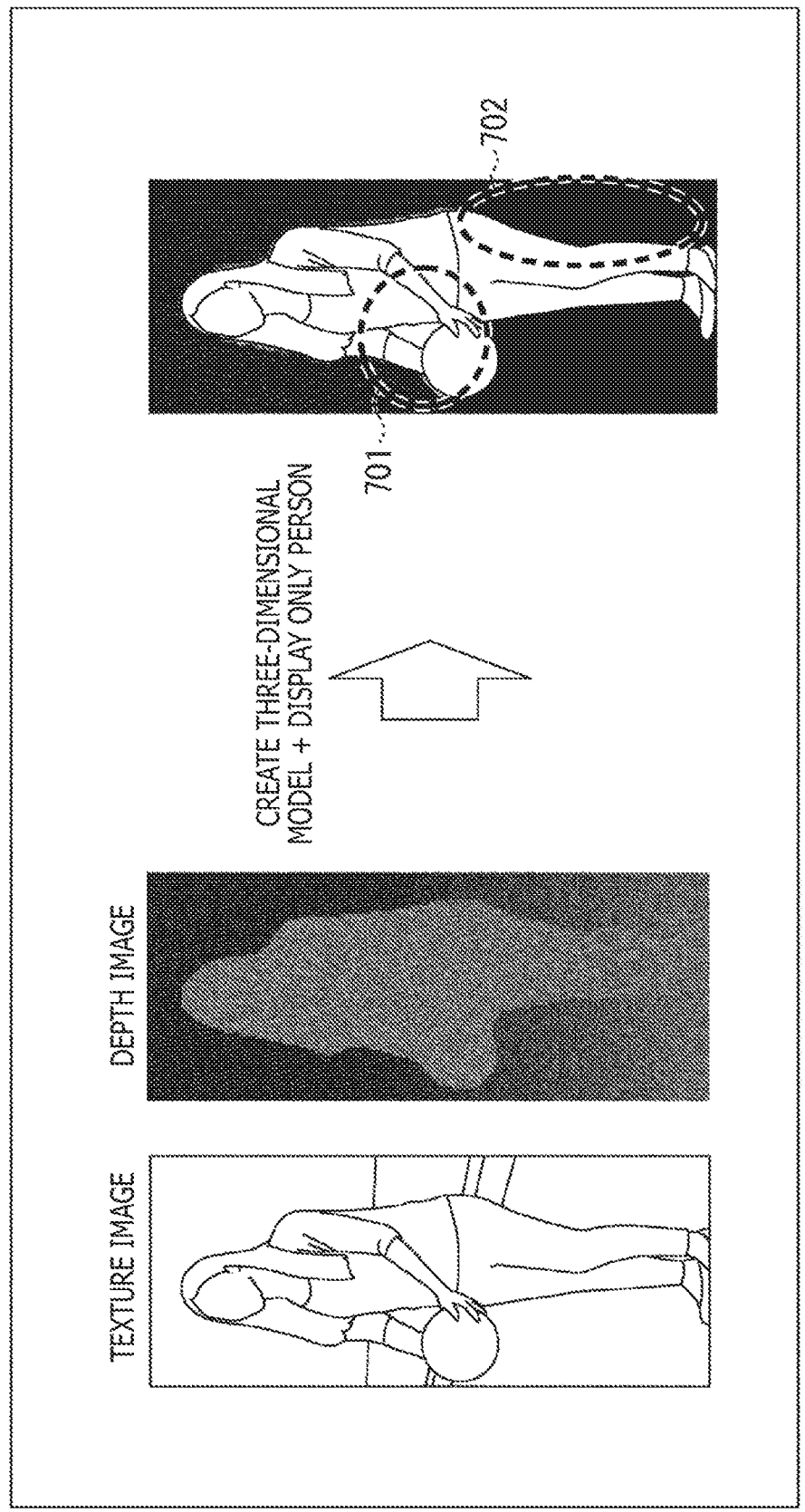
FIG. 46 is an explanatory diagram of an example of storing the segmentation information as the auxiliary information.

For example, as depicted in FIG. 46, in a case of generating a three-dimensional model (three-dimensional data) using only the texture image and the depth image, a small background region, for example, a region 701 surrounded by a person region that is the foreground cannot be accurately separated and the background region is expressed as a foreground region as it is in some cases. In addition, like a region 702, for example, peripheries of edges of the foreground and the background are jagged in some cases.

Storing the segmentation information indicating the foreground or the background in the CbCr components in the YCbCr420 format as the auxiliary information and transmitting the auxiliary information to the reproducing side make it possible for the reproducing side to accurately separate the foreground from the background and to display the three-dimensional model with high precision.

Furthermore, pixel values of the depth image corresponding to the same object (segment ID) and originally having substantially the same depth value include a pixel value greatly deviated from the other pixel values in some cases due to an influence such as an error in depth estimation or a codec distortion during encoding, as depicted in a left side of FIG. 47.

Even in such a case, transmitting the segmentation information indicating the foreground or the background to the reproducing side as the auxiliary information makes it possible for the reproducing side to perform a filter process for correcting the pixel value greatly deviated from the other pixel values to the same value as peripheral pixel values within the same region indicated by the segment ID.

Therefore, transmitting the segmentation information indicating the foreground or the background to the reproducing side as the auxiliary information makes it possible to display the three-dimensional model with high precision.

While the example of two types of segment IDs "0" and "1" as the segmentation information has been described above, the number of types of segment ID values can be three or more (segment ID=0, 1, 2, 3, and the like).

Furthermore, region information for identifying a region set to the texture image or edge information indicating whether or not a portion is an edge portion of the texture image can be transmitted as the auxiliary information.

Figure 48B:
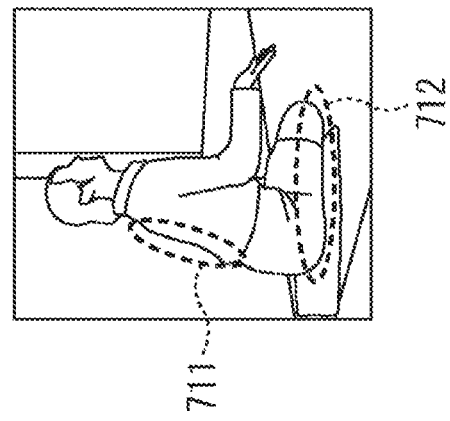
FIGS. 48A and 48B represent explanatory diagrams of an example of storing edge information as the auxiliary information.
Figure 48A:
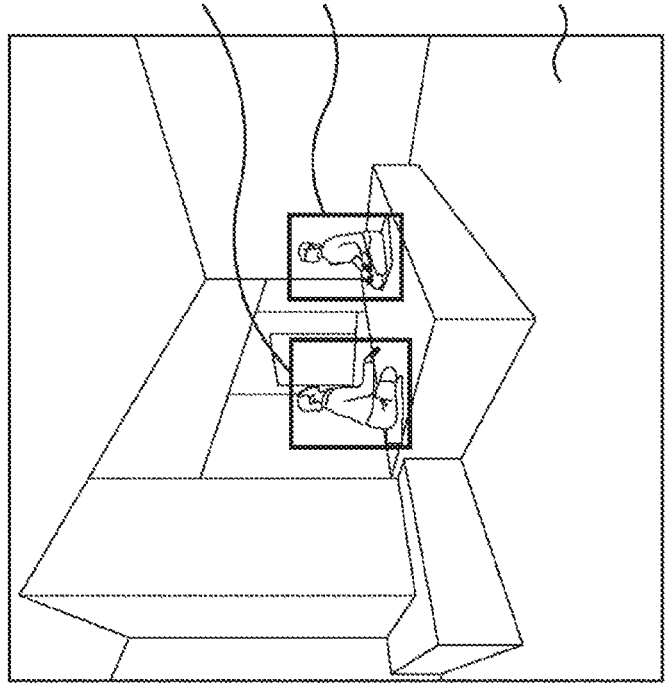

For example, as depicted in FIG. 48A, region information of ROI (Region Of Interest)_IDs=1, 2, 3, and the like is allocated to one or more regions (ROIs) set to the texture image. In FIG. 48A, ROI_ID=1 is allocated to a rectangular region that surrounds one of two persons within the texture image and ROI_ID=2 is allocated to a rectangular region that surrounds the other person. ROI_ID=0 represents a remaining region that is not designated by ROI_IDs=1 and 2.

In this case, values that can be taken on by the auxiliary information regarding each pixel in the YCbCr444 format are "0," "1," and "2"; thus, N=3. In the case of N=3, the auxiliary information downconverted into the YCbCr420 format takes on any of gradation values (0, 32, 64, 96, 128, 160, 192, 224, and 225) as described with reference to FIGS. 34 to 36.

In a case in which such region information is transmitted to the reproducing side, the reproducing side can apply different processing methods among, for example, set regions. For example, the discontinuity detection section 255 uses different thresholds for detecting a discontinuous pixel among the regions. More specifically, a threshold set to a small value is used in the regions that contain the persons and that are designated by ROI_ID=1 and ROI_ID=2, and a threshold set to a large value is used in the other region that is designated by ROI_ID=0. It is thereby possible to correctly separate the foreground from the background and display the three-dimensional model with high precision even with the pixels having a small difference in depth value.

In the case of transmitting the edge information indicating whether or not a portion is an edge portion of the texture image as the auxiliary information, noise (jaggies) can be diminished by performing, for example, a filter process or an alpha blending process on the noise (jaggies) in the edge portions of the foreground and the background such as regions 711 and 712 of FIG. 48B. It is thereby possible to display the three-dimensional model with high precision.

Furthermore, in a case in which the reproducing side performs the alpha blending process on the texture image, an alpha value may be transmitted to the reproducing side as the auxiliary information. Performing the alpha bending process makes it possible to not only obtain an effect of antialiasing described above but also express the foreground (object) by fade-in/fade-out video.

Moreover, as depicted in FIG. 49, filter factor information for designating a filter factor at a time of executing the filter process by the reproducing side may be transmitted as the auxiliary information.

A type of filter process can be changed or a degree of the filter process (for example, degree of blurring) can be changed partially depending on a pattern of the texture image, so that an appropriate filter process can be performed on each portion of the texture image.

As described so far, transmitting the auxiliary information enables the reproducing side to perform a process in response to an intention of an image generation side such as the filter process performed only on a predetermined region in the entire image.

Furthermore, face region information that indicates whether or not each pixel of the texture image is a pixel of a face region may be transmitted as the auxiliary information. In this case, the reproducing side does not need to execute a process for detecting the face region of the acquired texture image, and it is not necessary to separately send the face region information other than the texture streams and the depth streams to the reproducing side in a case in which the reproducing side is supposed to acquire the texture image from the texture image generation side.

FIG. 50 is a table of a summary of various information that can be adopted as the auxiliary information described above and effects thereof at a time of adopting the auxiliary information.

The auxiliary information utilization process using the various auxiliary information depicted in FIG. 50 is a process that can be executed as a process closed in one of the first layer or the second layer; thus, the auxiliary information utilization process can be applied to not only a case of transmitting the texture streams and the depth streams of the first layer and the second layer as described in the first and second embodiments but also a case of transmitting the texture streams and the depth streams of only one layer (first layer).

An example of the auxiliary information that can be adopted in the case of transmitting the texture streams and the depth streams of at least two multiple layers of the first layer and the second layer and the auxiliary information utilization process using the auxiliary information will next be described.

FIGS. 51A, 51B, and 51C represent an example of the auxiliary information utilization process in a case of transmitting the segmentation information that represents whether each pixel of the texture image is a pixel corresponding to the foreground (object) or a pixel corresponding to the background as the auxiliary information.

FIG. 51A is a display image generated by the home server 13 using the texture stream and the depth stream of the first layer and the second layer.

A case in which the viewing location of the viewer is changed to a low location closer to a floor surface than a location corresponding to the display image of FIG. 51A will be considered.

In a case in which the segmentation information as the auxiliary information is not transmitted, the display image generated by the home server 13 is that depicted in FIG. 51B in response to the changed viewing location.

In the display image of FIG. 51B, a location of player's arms within the display image is changed to an upper side than that in the display image of FIG. 51A in response to the low viewing location closer to the floor surface.

In the display image of FIG. 51A, a portion of a body hidden by the player's arms is an occlusion region, so that the portion is a region for which it is unclear the region is filled with what pixel values (RGB values) (how to inpaint the region) in the display image of FIG. 51B changed in viewing location. Owing to this, when this region is filled using pixel values of the background (wall) located on the backside, an unnatural display image in which a player's body portion is divided by the wall is generated as depicted in a region 721 of the display image of FIG. 51B.

By contrast, in a case of transmitting the segmentation information that represents whether each pixel of the texture image is a pixel corresponding to the foreground (object) or a pixel corresponding to the background as the auxiliary information, "1" (segment ID=1) indicating the foreground is allocated to a player's region and "0" (segment ID=0) indicating the background is allocated to floor surface and wall regions.

In this case, the home server 13 executes an occlusion process for filling (inpainting) the occlusion region with the pixel values within the player's region indicating the foreground. Specifically, the home server 13 fills the occlusion region with pixel values of the body portion having a depth value on the back side out of the pixel values within the player's region, like the display image of FIG. 51C. As a result, as depicted in a region 722 of the display image of FIG. 51C, the display image in which the occlusion region is correctly filled with the pixel values of the player's body without unnaturally dividing the body portion is generated.

Therefore, transmitting the segmentation information as the auxiliary information makes it possible to adopt appropriate pixel values to perform the occlusion process and to display the three-dimensional model with high precision.

Figure 52:
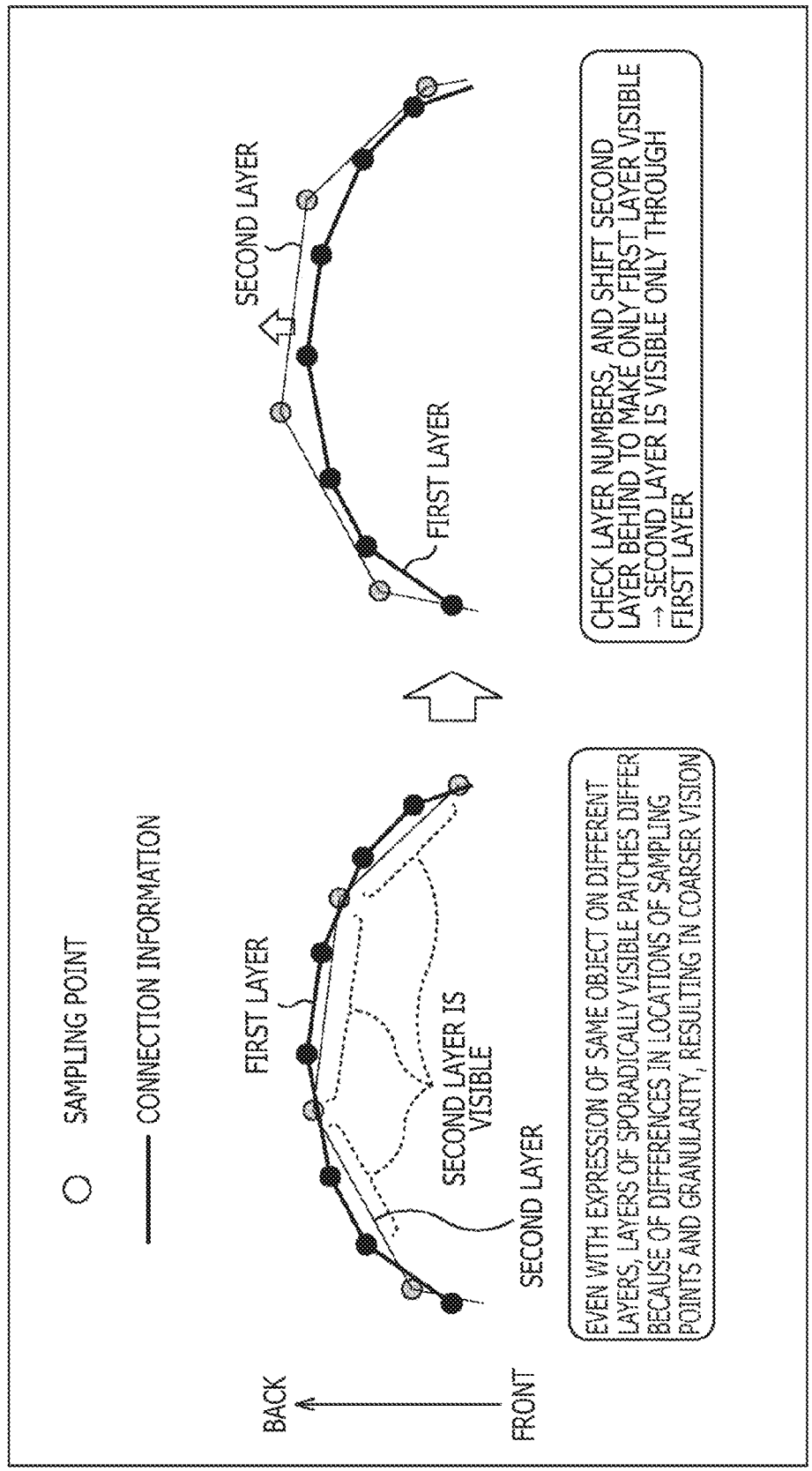
FIG. 52 is an explanatory diagram of an example of storing layer numbers as the auxiliary information.

FIG. 52 depicts an example of the auxiliary information utilization process in a case of transmitting layer numbers (layer identification information) for identifying layers as the auxiliary information.

In a case, for example, in which the first layer and the second layer differ in resolution and mapping, even with expression of the same object on the first layer and the second layer, layers of sporadically visible patches differ, resulting in coarser vision as depicted in a left side of FIG. 52 because of differences in locations of the sampling points of the triangle patches and granularity.

In a case of transmitting the layer numbers for identifying the layers as the auxiliary information, as depicted in the right part of FIG. 52, the home server 13 checks the layer numbers, and performs a process for shifting the locations of the sampling points of the second layer in the depth direction behind (in back of) the sampling points of the first layer to make first layer preferentially visible. In other words, the locations of the sampling points of the second layer in the depth direction are changed such that the second layer is visible to the viewer only through first layer.

In this way, transmitting the layer numbers (layer identification information) as the auxiliary information makes it possible to adjust the z coordinates to prevent a relation between the foreground and the background from being reversed and to display the three-dimensional model with high precision.

FIG. 53 depicts an example of the auxiliary information utilization process in a case of transmitting triangle valid/invalid information that indicates whether each triangle patch is valid or invalid as the auxiliary information.

In the example of FIG. 53, the number of sampling points 741 of the first layer is 12. Therefore, the number of triangle patches 742 each having three adjacent sampling points 741 as vertexes is 12.

In this case, the auxiliary information generation section 601 in the content server 12 detects a discontinuous pixel similarly to the discontinuity detection section 255. The auxiliary information generation section 601 then sets the triangle patches 742 each having the sampling point corresponding to the discontinuous pixel as the vertex to be invalid (OFF), and sets the triangle patches 742 that do not contain the sampling point corresponding to the discontinuous pixel to be valid (ON).

The auxiliary information generation section 601 generates triangle patch valid/invalid information indicating whether each triangle patch 742 is valid or invalid as the auxiliary information.

While it has been described above that the 3D model generation section 256 in the home server 13 deletes the connection information that represents the connection to the sampling point corresponding to the discontinuous pixel detected by the discontinuity detection section 255, the 3D model generation section 256 deletes the connection information on the basis of the triangle patch valid/invalid information transmitted from the content server 12 as the auxiliary information. In this case, the discontinuity detection section 255 is not provided.

The 3D model generation section 256 deletes the connection information that represents the connection of the sampling points configuring the vertexes of the invalid triangle patches on the basis of the triangle patch valid/invalid information. As a result, the triangle patches indicated as invalid by the triangle patch valid/invalid information are not rendered.

It is noted that two triangle patches are generated per sampling point except for the sampling points on right and lower ends. Furthermore, the triangle patch valid/invalid information is one-bit information indicating whether each triangle patch is valid or invalid. Therefore, if it is assumed that the number of pixels of the texture image of the first layer in the horizontal direction is width and the number of pixels thereof in the perpendicular direction is height, the number of bits of the triangle patch valid/invalid information regarding all the triangle patches is expressed by (width−1)×(height−1)×2.

FIG. 54 is a table of a summary of various information that can be adopted as the auxiliary information in the case of transmitting the texture streams and the depth streams of a plurality of layers and effects thereof at the time of adopting the auxiliary information.

According to the second embodiment of the image display system described so far, the content server 12 stores each pixel value of the depth image in the Y component in the YCbCr444 format, stores the auxiliary information (metadata) in the CbCr components, and generates the auxiliary information-added depth image in the YCbCr444 format. The content server 12 then converts (downconverts) the auxiliary information-added depth image in the YCbCr444 format into the auxiliary information-added depth image in the YCbCr420 format, and compresses and encodes the depth image by the encoding scheme such as H.265/HEVC. The content server 12 generates and compresses and encodes the auxiliary information-added depth image in the YCbCr420 format for each of the depth images of the first layer and the second layer.

Since the CbCr components that are unused regions of the encoded stream are used, it is unnecessary to transmit special stream data and the reproducing side can perform decoding by general-purpose decoders, compared with the first embodiment in which the auxiliary information is not transmitted.

At the time of converting the YCbCr444 format into the YCbCr420 format, the value of the auxiliary information is converted into any of the N×N gradation values. Each of the Cb component and the Cr component takes on any of the gradation values (0, δ, 2δ, 3δ, . . . , and 255) (where δ=256/(N×N−1)) and the interval (gradation width) between the gradation values can be expanded as much as possible; thus, even the auxiliary information of the granularity per pixel can be transmitted to the reproducing side losslessly.

Therefore, the content server 12 can transmit the auxiliary information as well as the texture images and the depth images to the reproducing side robustly with high precision, and the reproducing-side home server 13 can generate the three-dimensional model (three-dimensional data) using the texture images, the depth images, and the auxiliary information in real time with high precision.

In the above second embodiment, an example of downconverting the auxiliary information-added depth image in the YCbCr444 format into the auxiliary information-added depth image in the YCbCr420 format having one Cb component and one Cr component for 2×2, that is, four pixels has been described.

However, the technique of the present disclosure is not limited to the YCbCr420 format and is also applicable to a case of downconversion into, for example, a YCbCr422 format or a YCbCr411 format. Alternatively, the auxiliary information-added depth image in the YCbCr444 format is converted only into the gradation value and may be stored again in the YCbCr444 format. In this case, the reproducing side can correctly discriminate the auxiliary information since the auxiliary information is stored while being converted into the gradation value with the gradation width expanded as much as possible.

Moreover, in the second embodiment, an example of storing the auxiliary information in the transmission of the encoded streams of the texture images and the depth images of each of the six faces configuring the cube about the viewpoint of the omnidirectional image as the center has been described.

However, the present technique is not limited to the depth images of the omnidirectional image and is also applicable to an encoded stream of depth images at a time of transmitting the texture images and the depth images captured at an arbitrary viewpoint after compression and encoding.

(Example of Types N of Values that can be Taken on by Auxiliary Information)

While it has been described in the second embodiment above that it is known to the generation side and the reproducing side that the number of patterns of values (the number of types of values) that can be taken on by the auxiliary information regarding each pixel of the texture images is N, the number of types N of values that can be taken on by the auxiliary information may be changed depending on the encoded stream.

In a case in which the types N of values that can be taken on by the auxiliary information regarding the encoded stream transmitted to the reproducing side is unknown to the reproducing side, the types N of the values that can be taken on by the auxiliary information can be transmitted to the reproducing side while containing the types N in a bit stream encoded by, for example, the HEVC (High Efficiency Video Coding) scheme by, for example, storing the types N in User data unregistered SEI (Supplemental Enhancement Information) or DPS (Depth Parameter Set). Furthermore, the values such as "0," "1," "2," and the like that can be taken on by the auxiliary information when the segmentation information is used as the auxiliary information may be transmitted while containing the values as well as the types N of the values that can be taken on by the auxiliary information in the bit stream.

3. Third Embodiment (Example of Configuration of Third Embodiment of Image Display System)

FIG. 55 is a block diagram depicting an example of a configuration of a third embodiment of an image display system to which the present disclosure is applied.

In the configuration depicted in FIG. 55, the same configurations as those in FIG. 1 are denoted by the same reference signs. Repetitive explanation will be omitted, as appropriate.

An image display system 400 of FIG. 55 is configured with the multi-camera 11, the content server 12, the conversion device 14, the head mounted display 15, a delivery server 401, a network 402, and a reproducing device 403. In the image display system 400, only the first layer texture stream, the first layer depth stream, the second layer texture stream, and the second layer depth stream of one face corresponding to a visual line out of the six faces are delivered to and reproduced by the reproducing device 403.

Specifically, the delivery server 401 in the image display system 400 receives and stores therein the low resolution texture stream, the low resolution depth stream, and the first layer texture streams, the first layer depth streams, the second layer texture streams, and the second layer depth streams of the six faces as well as the metadata transmitted from the content server 12.

Furthermore, the delivery server 401 is connected to the reproducing device 403 via the network 402. The delivery server 401 transmits the low resolution texture stream, the low resolution depth stream, and the first layer texture stream, the first layer depth stream, the second layer texture stream, and the second layer depth stream of one face that are stored as well as the stored metadata to the reproducing device 403 via the network 402 in response to a request from the reproducing device 403.

The reproducing device 403 (image processing apparatus) issues a request to the delivery server 401 to transmit the low resolution texture stream, the low resolution depth stream, and the metadata via the network 402, and receives the low resolution texture stream, the low resolution depth stream, and the metadata transmitted in response to the request.

Moreover, the reproducing device 403 incorporates therein the camera 13A. The reproducing device 403, like the home server 13, detects the viewing location in the 3D model coordinate system and determines the visual line direction and the visual field range of the viewer in the 3D model coordinate system.

The reproducing device 403 then determines one face corresponding to the visual line vector closest to the visual line out of the six faces of the first layer as a selected face on the basis of the viewing location and the visual line direction in the 3D model coordinate system and the table of the first layer contained in the metadata. The reproducing device 403 issues a request to transmit the first layer texture stream, the first layer depth stream, the second layer texture stream, and the second layer depth stream corresponding to the one selected face via the network 402. The reproducing device 403 receives the first layer texture stream, the first layer depth stream, the second layer texture stream, and the second layer depth stream transmitted in response to the request and corresponding to the one selected face.

The reproducing device 403 generates a display image using the low resolution texture stream, the low resolution depth stream, and the first layer texture stream, the first layer depth stream, the second layer texture stream, and the second layer depth stream corresponding to the one selected face. Since a process performed by the reproducing device 403 for generating the display image is similar to the process performed by the home server 13 except that the number of selected faces is one, explanation will be omitted. The reproducing device 403 transmits the display image to the conversion device 14 via an HDMI cable that is not depicted.

4. Other Examples of Texture Image

FIGS. 56A and 56B represent diagrams depicting other examples of the texture images of the first layer.

While it has been described above that the texture image of each face of the first layer is the texture image at one viewpoint O, the texture image may be formed by combining texture images at a left-eye viewpoint and a right-eye viewpoint corresponding to the viewpoint O.

Specifically, as depicted in FIG. 56A, the texture image of each face of the first layer may be, for example, a packed image 420 by packing a texture image 421 of each face of the first layer at the left-eye viewpoint corresponding to the viewpoint O and a texture image 422 of each face of the first layer at the right-eye viewpoint in the lateral direction (horizontal direction).

Furthermore, as depicted in FIG. 56B, the texture image of each face of the first layer may be, for example, a packed image 440 by packing texture images 421 and 422 in the longitudinal direction (perpendicular direction).

Likewise, the texture image of each face of the second layer may be a packed image by packing a texture image of the second layer at the left-eye viewpoint corresponding to one second layer viewpoint of each face and a texture image of the second layer at the right-eye viewpoint in the lateral or longitudinal direction.

As described so far, in the case in which the texture image of each face of the first layer and the second layer is the texture image by packing the images at the left-eye viewpoint and the right-eye viewpoint, the texture image obtained as a result of decoding is separated into the texture image at the left-eye viewpoint and the texture image at the right-eye viewpoint. Left-eye three-dimensional data and right-eye three-dimensional data are then generated for the first layer and the second layer.

A left-eye display image is then generated from the left-eye three-dimensional data on the basis of a viewing direction and a viewing location of a left eye corresponding to the viewing direction and the viewing location of the viewer. Furthermore, a right-eye display image is generated from the right-eye three-dimensional data on the basis of a viewing direction and a viewing location of a right eye corresponding to the viewing direction and the viewing location of the viewer. Moreover, in a case in which the head mounted display 15 can display an image in 3D view, the head mounted display 15 displays the left-eye display image as a left-eye image and displays the right-eye display image as a right-eye image, thereby displaying the display image in 3D view.

While the omnidirectional image is generated by mapping the captured images onto the regular octahedron in the first to third embodiments, not only the regular octahedron but also a sphere, a cube, and the like can be used as the 3D model onto which the captured images are mapped. In a case of mapping the captured images onto the sphere, the omnidirectional image is an image of the sphere onto which the captured images are mapped by equirectangular projection.

Moreover, the low resolution texture stream and the low resolution depth stream are not necessarily generated. The depth images of the first layer and the second layer are not necessarily generated. Furthermore, the texture images and the depth images of the second layer may be generated only for part of the faces onto which captured images of an important subject are mapped.

Moreover, the low resolution texture image and the low resolution depth image may be generated by being hierarchized similarly to high resolution texture images and high resolution depth images.

5. Fourth Embodiment (Explanation of Computer to which Present Disclosure is Applied)

A series of processes described above can be either executed by hardware or executed by software. In a case of executing a series of processes by software, a program configuring the software is installed into a computer. Here, types of computer include a computer incorporated into dedicated hardware, a computer, for example, a general-purpose personal computer, capable of executing various functions by installing various programs into the computer, and the like.

FIG. 57 is a block diagram illustrating an example of a configuration of the hardware of the computer executing the series of processes described above by the program.

In a computer 500, a CPU (Central Processing Unit) 501, a ROM (Read Only Memory) 502, and a RAM (Random Access Memory) 503 are mutually connected by a bus 504.

An input/output interface 505 is also connected to the bus 504. An input section 506, an output section 507, a storage section 508, a communication section 509, and a drive 510 are connected to the input/output interface 505.

The input section 506 is configured from a keyboard, a mouse, a microphone, and the like. The output section 507 is configured from a display, a speaker, and the like. The storage section 508 is configured from a hard disc, a nonvolatile memory, or the like. The communication section 509 is configured from a network interface and the like. The drive 510 drives a removable medium 511 such as a magnetic disc, an optical disc, a magneto-optical disc or a semiconductor memory.

In the computer 500 configured as described above, the CPU 501 loads a program stored in, for example, the storage section 508 to the RAM 503 via the input/output interface 505 and the bus 504 and executes the program, whereby the series of processes described above are performed.

The program executed by the computer 500 (CPU 501) can be provided by, for example, recording the program in the removable medium 511 serving as a package medium or the like. Alternatively, the program can be provided via a wired or wireless transmission medium such as a local area network, the Internet, or a digital satellite service.

In the computer 500, the program can be installed into the storage section 508 via the input/output interface 505 by attaching the removable medium 511 to the drive 510. Alternatively, the program can be received by the communication section 509 via the wired or wireless transmission medium and installed into the storage section 508. In another alternative, the program can be installed into the ROM 502 or the storage section 508 in advance.

The program executed by the computer 500 may be a program for performing processes in time series in an order described in the present specification or may be a program for performing the processes either in parallel or at necessary timing such as timing of calling.

6. Application Examples

The technology according to the present disclosure can be applied to various products. For example, the technology according to the present disclosure may be implemented as a device mounted in a mobile body of any of kinds such as a vehicle, an electric-powered vehicle, a hybrid electric-powered vehicle, a two-wheeled vehicle, a bicycle, a personal mobility, an airplane, a drone, a ship, a robot, a construction machine, and an agricultural machine (tractor).

FIG. 58 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 58, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 58 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 59 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 59 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 58, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 58, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 58 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

A computer program for realizing the functions of the image display system 10 (400) according to the present embodiments described with reference to FIGS. 1, 2, 3, 4A, 4B, 5, 6A, 6B, 7, 8A, 8B, 9, 10, 11, 12A, 12B, 12C, 13A, 13B, 13C, 14A, 14B, 15, 16A, 16B, 17, 18, 19, 20, 21A, 21B, 22, 23A, 23B, 24A, 24B, 25A, 25B, 26, 27, 28, 29, 30A, 30B, 31, 32, 33, 34, 35, 36, 37, 38, 39, 40, 41, 42, 43, 44, 45, 46, 47, 48A, 48B, 49, 50, 51A, 51B, 51C, 52, 53, 54, 55, and 56 may be implemented in any of the control units and the like. Furthermore, a computer readable recording medium storing therein such a computer program can be provided. Examples of the recording medium include a magnetic disc, an optical disc, a magneto-optical disc, and a flash memory. Moreover, the computer program may be delivered via, for example, a network without using the recording medium.

In the vehicle control system 7000 described so far, the image display system 10 (400) according to the present embodiments described with reference to FIGS. 1, 2, 3, 4A, 4B, 5, 6A, 6B, 7, 8A, 8B, 9, 10, 11, 12A, 12B, 12C, 13A, 13B, 13C, 14A, 14B, 15, 16A, 16B, 17, 18, 19, 20, 21A, 21B, 22, 23A, 23B, 24A, 24B, 25A, 25B, 26, 27, 28, 29, 30A, 30B, 31, 32, 33, 34, 35, 36, 37, 38, 39, 40, 41, 42, 43, 44, 45, 46, 47, 48A, 48B, 49, 50, 51A, 51B, 51C, 52, 53, 54, 55, and 56 is applicable to the vehicle control system 7000 in the application example depicted in FIG. 58. For example, the multi-camera 11 in the image display system 10 (400) corresponds to at least part of the imaging section 7410. Furthermore, the content server 12, the home server 13 (delivery server 401, network 402, reproducing device 403), and the conversion device 14 are integrated and correspond to the microcomputer 7610 and the storage section 7690 in the integrated control unit 7600. The head mounted display 15 corresponds to the display section 7720. In a case of applying the image display system 10 (400) to the vehicle control system 7000, then the camera 13A, the marker 15A, and the gyro sensor 15B are not provided, and the visual line direction and the viewing location of the viewer are input by operating the input section 7800 by the occupant who is the viewer. Applying the image display system 10 (400) to the vehicle control system 7000 in the application example depicted in FIG. 58 as described so far makes it possible to generate the display image with the high image quality using the omnidirectional image.

Moreover, at least part of the constituent elements of the image display system 10 (400) described with reference to FIGS. 1, 2, 3, 4A, 4B, 5, 6A, 6B, 7, 8A, 8B, 9, 10, 11, 12A, 12B, 12C, 13A, 13B, 13C, 14A, 14B, 15, 16A, 16B, 17, 18, 19, 20, 21A, 21B, 22, 23A, 23B, 24A, 24B, 25A, 25B, 26, 27, 28, 29, 30A, 30B, 31, 32, 33, 34, 35, 36, 37, 38, 39, 40, 41, 42, 43, 44, 45, 46, 47, 48A, 48B, 49, 50, 51A, 51B, 51C, 52, 53, 54, 55, and 56 may be realized in a module (for example, an integrated circuit module configured with one die) for the integrated control unit 7600 depicted in FIG. 58. Alternatively, the image display system 10 (400) described with reference to FIGS. 1, 2, 3, 4A, 4B, 5, 6A, 6B, 7, 8A, 8B, 9, 10, 11, 12A, 12B, 12C, 13A, 13B, 13C, 14A, 14B, 15, 16A, 16B, 17, 18, 19, 20, 21A, 21B, 22, 23A, 23B, 24A, 24B, 25A, 25B, 26, 27, 28, 29, 30A, 30B, 31, 32, 33, 34, 35, 36, 37, 38, 39, 40, 41, 42, 43, 44, 45, 46, 47, 48A, 48B, 49, 50, 51A, 51B, 51C, 52, 53, 54, 55, and 56 may be realized by a plurality of control units in the vehicle control system 7000 depicted in FIG. 58.

In the present specification, the system means a collection of a plurality of constituent elements (apparatuses, modules (components), and the like), regardless of whether or not all the constituent elements are provided in the same casing. Therefore, a plurality of apparatuses accommodated in different casings and connected to one another via a network and one apparatus in which a plurality of modules is accommodated in one casing can be each referred to as "system."

Furthermore, the effects described in the present specification are given as an example only, and the effects are not limited to those described in the present specification and may contain other effects.

Moreover, the embodiments of the present disclosure are not limited to the embodiments described above and various changes can be made without departing from the spirit of the present disclosure.

For example, the present disclosure can have a cloud computing configuration for causing a plurality of apparatuses to process one function in a sharing or cooperative fashion.

Furthermore, each step described in the above flowcharts can be not only executed by one apparatus but also executed by a plurality of apparatuses in a sharing fashion.

Moreover, in a case in which one step includes a plurality of processes, the plurality of processes included in the one step can be not only executed by one apparatus but also executed by a plurality of apparatuses in a sharing fashion.

It is noted that the technique according to the present disclose can be configured as follows.

(1) An image processing apparatus including:
a receiving section that receives depth image data in which a depth image transmitted together with a texture image is stored in a Y component in a YCbCr format and auxiliary information is stored in CbCr components in the YCbCr format; and
an auxiliary information utilization section that executes a predetermined image process using the auxiliary information on at least one of the texture image or the depth image, in which
a value that can be taken on by the auxiliary information for each pixel of the texture image has N patterns, and
a gradation value out of N×N gradation values into which a combination of the auxiliary information regarding two pixels is converted is stored in the CbCr components.

(2) The image processing apparatus according to (1), in which
the receiving section receives texture image data regarding the texture image and the depth image data of a first layer and texture image data regarding the texture image and the depth image data of a second layer, and
the auxiliary information utilization section executes the predetermined image process using the auxiliary information on at least one of the texture image or the depth image for each of the first layer and the second layer.

(3) The image processing apparatus according to (1) or (2), in which
the YCbCr format includes a YCbCr420 format in which a Cr component and a Cb component are shared among 2×2, that is, four pixels.

(4) The image processing apparatus according to any one of (1) to (3), in which
the auxiliary information includes segment information for identifying a segment.

(5) The image processing apparatus according to any one of (1) to (4), in which
the auxiliary information includes region information for identifying a region.

(6) The image processing apparatus according to any one of (1) to (5), in which
the auxiliary information includes edge information indicating whether or not a portion is an edge portion.

(7) The image processing apparatus according to any one of (1) to (6), in which
the auxiliary information includes information indicating an alpha value for alpha blending.

(8) The image processing apparatus according to any one of (1) to (7), in which
the auxiliary information includes information indicating a layer number.

(9) The image processing apparatus according to any one of (1) to (8), in which
the auxiliary information includes information indicating whether a triangle patch is valid or invalid.

(10) An image processing method including steps of:
causing an image processing apparatus to receive depth image data in which a depth image transmitted together with a texture image is stored in a Y component in a YCbCr format and auxiliary information is stored in CbCr components in the YCbCr format; and
causing an image processing apparatus to execute a predetermined image process using the auxiliary information on at least one of the texture image or the depth image, in which
a value that can be taken on by the auxiliary information for each pixel of the texture image has N patterns, and
a gradation value out of N×N gradation values into which a combination of the auxiliary information regarding two pixels is converted is stored in the CbCr components.

(11) An image processing apparatus including:
an image data generation section that generates depth image data in which a depth image transmitted together with a texture image is stored in a Y component in a YCbCr format and auxiliary information utilized in a process of at least one of the texture image or the depth image is stored in CbCr components in the YCbCr format, in which
a value that can be taken on by the auxiliary information for each pixel of the texture image has N patterns, and
the image data generation section stores a gradation value out of N×N gradation values into which a combination of the auxiliary information regarding two pixels is converted in the CbCr components.

(12) The image processing apparatus according to (11), in which
the image data generation section generates the depth image data regarding each of the depth image of a first layer and the depth image of a second layer.

(13) The image processing apparatus according to (11) or (12), in which
the YCbCr format includes a YCbCr420 format in which a Cr component and a Cb component are shared among 2×2, that is, four pixels.

(14) The image processing apparatus according to any one of (11) to (13), in which
the image data generation section encodes the depth image data in the YCbCr420 format, and in a case in which it is determined that the gradation value stored in the CbCr components is not lossless before and after encoding, the image data generation section raises a bitrate of the depth image data in which the depth image and the auxiliary information are stored and compresses and encodes the depth image data in the YCbCr420 format again.

(15) The image processing apparatus according to (14), in which in a case of raising the bitrate of the depth image data in which the depth image and the auxiliary information are stored, the image data generation section lowers a bitrate of texture image data in which the texture image is stored and compresses and encodes the texture image data again.

(16) The image processing apparatus according to any one of (11) to (13), in which the image data generation section encodes the depth image data in the YCbCr420 format, and in a case in which it is determined that the gradation value stored in the CbCr components is not lossless before and after encoding, the image data generation section changes a value of the N indicating types of the value that can be taken on by the auxiliary information for each pixel of the texture image to a value smaller than a current value of the N and compresses and encodes the depth image data in the YCbCr420 format again.

(17) The image processing apparatus according to any one of (11) to (16), in which the auxiliary information includes segment information for identifying a segment.

(18) The image processing apparatus according to any one of (11) to (17), in which the auxiliary information includes region information for identifying a region.

(19) The image processing apparatus according to any one of (11) to (18), in which the auxiliary information includes edge information indicating whether or not a portion is an edge portion.

(20) An image processing method including a step of:

causing an image processing apparatus to generate depth image data in which a depth image transmitted together with a texture image is stored in a Y component in a YCbCr format and auxiliary information utilized in a process of at least one of the texture image or the depth image is stored in CbCr components in the YCbCr format, in which a value that can be taken on by the auxiliary information for each pixel of the texture image has N patterns, and a gradation value out of N×N gradation values into which a combination of the auxiliary information regarding two pixels is converted is stored in the CbCr components.

REFERENCE SIGNS LIST

12: Content server
13: Home server
34: High resolution image processing section
50: First layer generation section
53: Second layer generation section
231: Receiving section
235 to 237: ML 3D model generation section
239: Rendering section
262: 3D model generation section
601: Auxiliary information generation section
602, 603: Encoder
641: YCbCr420 conversion section
642: Depth encoding section
651, 652: Decoder
671: Auxiliary information utilization section
501: CPU
502: ROM
503: RAM
506: Input section
507: Output section
508: Storage section
509: Communication section
510: Drive

The invention claimed is:

1. An image processing apparatus, comprising:
a receiving section configured to receive depth image data and a texture image, wherein
the depth image data includes:
a depth image in a Y component in a YCbCr format; and
for each of two pixels of the texture image, auxiliary information in CbCr components in the YCbCr format,
the auxiliary information for a first pixel of the two pixels indicates that the first pixel corresponds to one of a foreground pixel or a background pixel, and
the auxiliary information for a second pixel of the two pixels indicates that the second pixel corresponds to one of the foreground pixel or the background pixel; and
an auxiliary information utilization section configured to execute a specific image process on at least one of the texture image or the depth image, wherein
the specific image process is executed based on the auxiliary information associated with each of the first pixel and the second pixel,
the auxiliary information for each of the first pixel and the second pixel of the texture image further includes N types of gradation values,
N×N gradation values indicate a combination of the auxiliary information associated with the first pixel and the auxiliary information associated with the second pixel, and
the CbCr components further includes a gradation value out of the N×N gradation values.

2. The image processing apparatus according to claim 1, wherein
the receiving section is further configured to:
receive first texture image data associated with the texture image and the depth image data of a first layer; and
receive second texture image data associated with the texture image and the depth image data of a second layer, and
the auxiliary information utilization section is further configured to execute the specific image process on at least one of the texture image or the depth image for each of the first layer and the second layer.

3. The image processing apparatus according to claim 1, wherein the YCbCr format includes a YCbCr420 format in which a Cr component and a Cb component are shared among 2×2, that is, four pixels.

4. The image processing apparatus according to claim 1, wherein the auxiliary information, for each of the first pixel and the second pixel, further includes region information to identify a region associated with the texture image.

5. The image processing apparatus according to claim 1, wherein
the auxiliary information, for each of the first pixel and the second pixel, further includes edge information that indicates a portion of the texture image, and
the portion of the texture image is an edge portion.

6. The image processing apparatus according to claim 1, wherein the auxiliary information, for each of the first pixel and the second pixel, further includes information that indicates an alpha value for alpha blending on the texture image.

7. The image processing apparatus according to claim 1, wherein the auxiliary information, for each of the first pixel and the second pixel, further includes information that indicates a layer number associated with the texture image.

8. The image processing apparatus according to claim 1, wherein the auxiliary information, for each of the first pixel and the second pixel, further includes information that indicates validity of a triangle patch on the texture image.

9. An image processing method, comprising:
    causing an image processing apparatus to receive depth image data and a texture image, wherein
        the depth image data includes:
            a depth image in a Y component in a YCbCr format,
            for each of two pixels of the texture image, auxiliary information in CbCr components in the YCbCr format;
        the auxiliary information for a first pixel of the two pixels indicates that the first pixel corresponds to one of a foreground pixel or a background pixel, and
        the auxiliary information for a second pixel of the two pixels indicates that the second pixel corresponds to one of the foreground pixel or the background pixel; and
    causing the image processing apparatus to execute a specific image process on at least one of the texture image or the depth image, wherein
        the specific image process is executed based on the auxiliary information associated with each of the first pixel and the second pixel,
        the auxiliary information for each of the first pixel and the second pixel of the texture image further includes N type of gradation value,
        N×N gradation values indicate a combination of the auxiliary information associated with the first pixel and the auxiliary information associated with the second pixel, and
        the CbCr components further includes a gradation value out of the N×N gradation values.

10. An image processing apparatus, comprising:
    an image data generation section configured to:
        generate depth image data that includes:
            a depth image of an omnidirectional image in a Y component in a YCbCr format, and
            for each of two pixels of a texture image of the omnidirectional image, auxiliary information in CbCr components in the YCbCr format, wherein
                for each of two pixels of the texture image, the auxiliary information is utilized in a process of at least one of the texture image or the depth image,
                the auxiliary information for a first pixel of the two pixels indicates that the first pixel corresponds to one of a foreground pixel or a background pixel,
                the auxiliary information for a second pixel of the two pixels indicates that the second pixel corresponds to one of the foreground pixel or the background pixel, and
                the auxiliary information for each of the first pixel and the second pixel of the texture image further includes N types of gradation values; and
        store a gradation value out of N×N gradation values in the CbCr components, wherein the N×N gradation values indicate a combination of the auxiliary information associated the first pixel and the auxiliary information associated with the second pixel.

11. The image processing apparatus according to claim 10, wherein the image data generation section is further configured to generate the depth image data associated with each of first depth image of a first layer and second depth image of a second layer.

12. The image processing apparatus according to claim 10, wherein the YCbCr format includes a YCbCr420 format in which a Cr component and a Cb component are shared among 2×2, that is, four pixels.

13. The image processing apparatus according to claim 12, wherein the image data generation section is further configured to:
    encode the depth image data in the YCbCr420 format;
    determine that the gradation value before and after encoding is not lossless;
    increase a bitrate of the depth image data based on the determination; and
    compress and encode the depth image data in the YCbCr420 format based on the increased bitrate.

14. The image processing apparatus according to claim 13, wherein based on the increased bitrate of the depth image data, the image data generation section is further configured to:
    lower a bitrate of texture image data in which the texture image is stored; and
    compress and encode the texture image data.

15. The image processing apparatus according to claim 12, wherein the image data generation section is further configured to:
    encode the depth image data in the YCbCr420 format,
    determine that the gradation value before and after the encoding is not lossless,
    change a value of types of the gradation values for each pixel of the texture image, wherein the changed value of the types of the gradation values is smaller than a value of the N types of the gradation values, and
    compress and encode the depth image data in the YCbCr420 format again.

16. The image processing apparatus according to claim 10, wherein the auxiliary information further includes region information to identify a region associated with the texture image.

17. The image processing apparatus according to claim 10, wherein
    the auxiliary information further includes edge information that indicates a portion of the texture image, and
    the portion of the texture image is an edge portion.

18. An image processing method, comprising:
    causing an image processing apparatus to generate depth image data that includes:
        a depth image of an omnidirectional image in a Y component in a YCbCr format; and
        for each of two pixels of a texture image of the omnidirectional image, auxiliary information in CbCr components in the YCbCr format, wherein
            for each of two pixels of a texture image, the auxiliary information is utilized in a process of at least one of the texture image or the depth image,
            the auxiliary information for a first pixel of the two pixels indicates that the first pixel corresponds to one of a foreground pixel or a background pixel,
            the auxiliary information for a second pixel of the two pixels indicates that the second pixel corresponds to one of the foreground pixel or the background pixel, and the auxiliary information for each of the first pixel and the second pixel of the texture image further includes N types of gradation values, and causing the image processing apparatus to store a gradation value out of N×N gradation values in the CbCr components, wherein the N×N gradation values indicates a combination of the auxiliary information associated with the first pixel and the auxiliary information associated with the second pixel.

\* \* \* \* \*